(12) United States Patent
Gondal et al.

(10) Patent No.: US 12,534,386 B1
(45) Date of Patent: Jan. 27, 2026

(54) LANTHANUM-BASED PEROVSKITE OXIDE ELECTRODE MATERIAL FOR ELECTROCHEMICAL ENERGY STORAGE APPLICATIONS

(71) Applicant: King Fahd University of Petroleum and Minerals, Dhahran (SA)

(72) Inventors: Muhammad Ashraf Gondal, Dhahran (SA); Mujahid Mustaqeem, Dhahran (SA); Ahmar Ali, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/310,876

(22) Filed: Aug. 26, 2025

(51) Int. Cl.
  *C01G 55/00* (2006.01)
  *C09D 1/00* (2006.01)
  (Continued)

(52) U.S. Cl.
  CPC .......... *C01G 55/002* (2013.01); *C09D 1/00* (2013.01); *C09D 5/24* (2013.01); *H01G 11/30* (2013.01); *C01P 2002/34* (2013.01); *C01P 2002/54* (2013.01); *C01P 2002/60* (2013.01); *C01P 2002/72* (2013.01); *C01P 2002/82* (2013.01); *C01P 2002/85* (2013.01); *C01P 2004/03* (2013.01); *C01P 2004/04* (2013.01); *C01P 2004/32* (2013.01); *C01P 2006/40* (2013.01)

(58) Field of Classification Search
  CPC .......... C01G 55/002; C09D 1/00; C09D 5/24; H01G 11/30; C01P 2002/34; C01P 2002/54; C01P 2002/60; C01P 2002/72; C01P 2002/82; C01P 2002/85; C01P 2004/03; C01P 2004/04; C01P 2004/32; C01P 2006/40
  See application file for complete search history.

(56) References Cited

U.S. PATENT DOCUMENTS

| | | |
|---|---|---|
| 2004/0238861 A1 | 12/2004 | Hwang et al. |
| 2022/0106232 A1 | 4/2022 | Syvertsen-Wiig et al. |
| 2022/0355275 A1 | 11/2022 | Komateedi et al. |

FOREIGN PATENT DOCUMENTS

| | | | | |
|---|---|---|---|---|
| CN | 118908301 A | * | 11/2024 | ............... C25B 1/04 |
| CN | 119118666 A | | 12/2024 | |

(Continued)

OTHER PUBLICATIONS

"A Mini-Review on Lanthanum-Nickel-Based Perovskite-Derived Catalysts for Hydrogen Production via the Dry Reforming of Methane (DRM)," Georgiadis et al., Oct. 10, 2023 (Year: 2023).*

(Continued)

*Primary Examiner* — Timothy J. Dole
*Assistant Examiner* — Daniel M Dubuisson
(74) *Attorney, Agent, or Firm* — Oblon, McClelland, Maier & Neustadt, L.L.P.

(57) ABSTRACT

A perovskite with a formula $LaMn_xRu_yNi_{1-(x+y)}O_3$ is disclosed, where x is from 0.02 to 0.08 and y is from 0.08 to 0.02. The perovskite has a morphology of spherical particles with an oxidation state of Mn and Ru both as +3. The perovskite can be used as a coating on the electrode. The resulting perovskite-coated electrode exhibits excellent electrochemical properties in an asymmetric supercapacitor, proving that the perovskite is an ideal electrode material.

19 Claims, 36 Drawing Sheets

(51) Int. Cl.
*C09D 5/24* (2006.01)
*H01G 11/30* (2013.01)

(56) References Cited

FOREIGN PATENT DOCUMENTS

EP         3587622 B1     9/2023
KR       20250097287 A  *  6/2025   ............. C01B 3/047

OTHER PUBLICATIONS

Wei Zhang, et al., "Exsolved NiRu bimetallic nanoparticles induced by Ru doping in LaBaMn$_{1.6}$Ni$_{0.3}$Ru$_{0.1}$)$_{5+\alpha}$ as a coking resistant anode catalyst layer for direct-methane solid oxide fuel cells", International Journal of Hydrogen Energy, vol. 81, Sep. 4, 2024, pp. 1163-1171 (8 pgs., excerpts only).

Bo Yuan, et al., "Effect of A, B-site cation on the catalytic activity of La$_{1-x}$A$_x$Mn$_{1-y}$B$_y$O$_3$ (A=Ce, B=Ni) perovskite-type oxides for toluene oxidation", Environmental Science and Pollution Research, vol. 30, Dec. 24, 2022, pp. 36993-37003.

Jörg Schöpf, et al., "Tuning the interlayer coupling in La$_{0.7}$Sr$_{0.3}$Mn$_{0.95}$Ru$_{0.05}$O$_3$/LaNiO$_3$ multilayers with perpendicular magnetic anisotropy", Physical Review Materials, vol. 8, Sep. 24, 2024, pp. 36993-37003.

* cited by examiner

EDS Layered Image 1

La Lα1

LANTHANUM-BASED PEROVSKITE OXIDE ELECTRODE MATERIAL FOR ELECTROCHEMICAL ENERGY STORAGE APPLICATIONS

CROSS-REFERENCE TO RELATED APPLICATION

The present disclosure claims the benefit of Saudi Patent Application No. 1020255981 filed on Aug. 14, 2025, with the Saudi Authority for Intellectual Property Office, which is incorporated herein by reference in its entirety.

STATEMENT OF ACKNOWLEDGEMENT

Support provided by the King Fahd University of Petroleum and Minerals (KFUPM), Saudi Arabia through the project H2FC2305 and the King Abdullah City for Atomic and Renewable Energy (K.A.CARE) are gratefully acknowledged.

BACKGROUND

Technical Field

The present disclosure relates to the field of electrochemical energy storage and electrode material design. More specifically, the present disclosure pertains to manganese and ruthenium co-doped perovskite oxide compositions suitable for use as electrode materials in asymmetric supercapacitor systems.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present invention.

The rising demand for sustainable and efficient energy storage solutions has driven significant advancements in electrochemical device development. Electrochemical energy storage devices, particularly batteries and supercapacitors, have received considerable attention in this context due to their scalability, design flexibility, and relevance to next-generation power applications. Among these devices, supercapacitors are distinguished by rapid charge-discharge kinetics, extended cycle life, and superior cyclic stability. Electrochemical supercapacitors can be classified into electrochemical double-layer capacitors (EDLCs) and pseudocapacitors, both of which rely heavily on the physicochemical properties of the electrode material.

Perovskite oxides with a general structural formula ABO3 have emerged as promising candidates for electrode materials in supercapacitor devices. In a typical perovskite structure, the A-site is generally occupied by lanthanide or alkali metals, including La, Ce, Sr, Nd, Y, Gd, Li, and Na, while the B-site is generally occupied by transition metal ions such as Ni, Fe, Mn, Co, and Zn. The perovskite frameworks exhibit advantageous properties for energy storage applications, including high ionic conductivity, variable oxidation states, stable redox activity, and reliable electrical conductivity. Perovskite-based oxides such as $LaNiO_3$, $LaMnO_3$, and $LaFeO_3$ have demonstrated considerable potential for pseudocapacitor applications, with $LaNiO_3$ frequently noted for its redox behaviour, electrochemical stability, and compatibility with dopants. In particular, $LaNiO_3$-based hollow spheres have demonstrated Csp values as high as 422 F/g at 1 A/g current density, while Sr-doped LaNiO3 has been reported to yield 115.88 mAh/g with cyclic performance exceeding 104% retention over 16,000 cycles.

Transition metal-based oxides belong to another promising candidate as electrode materials, among which nickel oxide (NiO) has been extensively investigated due to its high theoretical specific capacitance (Csp), natural abundance, variable valency, and low toxicity, making it a low-cost and efficient material for energy storage. Furthermore, nanocomposites including both perovskite and transition metal-based oxides, such as $LaNiO_3$/NiO and Sr-doped $LaNiO_3$ nanofibers, have demonstrated capacitance values of 326.8 F/g and 719 F/g, respectively, with excellent cycle stability.

The high valency flexibility of Ni within the perovskite matrix supports multiple redox transitions, enabling the efficient charge storage required in pseudocapacitor electrodes. Studies have also explored doping $LaNiO_3$ with other metal ions such as Cr, Mn, Fe, and Nd to enhance redox behavior and physicochemical stability. Co-doped systems, particularly La-based perovskites modified with multiple B-site transition metals, have demonstrated promise in magnetic, optical, and catalytic domains, which are increasingly relevant to energy storage functionality.

Despite the foregoing advances, $LaNiO_3$-based systems continue to face challenges, notably low electronic conductivity, which impedes rate capability and overall energy efficiency in practical electrochemical storage applications. Conventional doping strategies have provided incremental improvements; however, the requirement for further enhancement in electrochemical performance remains unresolved.

Accordingly, one object of the present disclosure is to provide an asymmetric supercapacitor incorporating a perovskite, that may circumvent the above specified drawbacks and limitation of the materials and methods known in the art.

SUMMARY

In an exemplary embodiment, a perovskite is disclosed. The perovskite has a formula of $LaMn_xRu_yNi_{1-(x+y)}O_3$, where x is from 0.02 to 0.08 and y is from 0.08 to 0.02.

In some embodiments, the perovskite has a hexagonal host crystal structure based on a hexagonal $LaNiO_3$ perovskite crystal, where Mn and Ru are doped at a plurality of Ni sites in the hexagonal host crystal structure.

In some embodiments, the perovskite is in the form of particles, having an average crystallite size of 10 to 15 nm.

In some embodiments, x is from 0.01 to 0.03 and y is from 0.07 to 0.09 and the perovskite is in the form of porous non-agglomerated particles.

In some embodiments, the perovskite is in the form of spherical nanoparticles.

In some embodiments, the perovskite exhibits a Mn oxidation state of +3 and a Ru oxidation state of +3.

In some embodiments, the perovskite is in the form of particles, where the particles have a plurality of alkyne groups and hydroxyl groups on the surface.

In some embodiments, the perovskite is obtained by a process which includes forming an aqueous salt solution of lanthanum nitrate, manganese nitrate, ruthenium nitrate, nickel nitrate and citric acid, where lanthanum nitrate, manganese nitrate, ruthenium nitrate, nickel nitrate has a molar ratio corresponding to 1:x:y:1−(x+y). The process further includes heating the salt solution, followed by adding ethylene glycol and adjusting pH by ammonia to form a sol, heating the sol to form a gel, drying the gel by heat, followed by grinding to form a powder, and calcinating the powder to form the perovskite having the formula $LaMn_xRu_yNi_{1-(x+y)}O_3$. In another exemplary embodiment, a $LaMn_xRu_yNi_{1-(x+y)}O3$ electrode is described. The electrode includes a nickel foam and a perovskite coating. The perovskite coating has a formula of $LaMn_xRu_yNi_{1-(x+y)}O_3$, where x is from 0.02 to 0.08 and y is from 0.08 to 0.02. The perovskite coating is present on a surface of the nickel foam.

In some embodiments, the electrode exhibits a peak potential of 0.110 to 0.125 V in a cyclic voltammetry test. The cyclic voltammetry test is conducted in a three-electrode setup of the $LaMn_xRu_yNi_{1-(x+y)}O_3$ electrode, a platinum counter electrode and a Ag/AgCl reference electrode.

In some embodiments, the electrode exhibits a specific capacitance of 700 to 1000 F/g in the cyclic voltammetry test.

In some embodiments, the specific capacitance includes a capacitive-controlled capacitance and a diffusion-controlled capacitance. The capacitive-controlled capacitance is at a percentage of 10 to 37%, and the diffusion-controlled capacitance is at a percentage of 63 to 95%, based on a total of the capacitive-controlled capacitance and the diffusion-controlled capacitance.

In some embodiments, the electrode exhibits a double-layer capacitance of 120 to 250 $mF/cm^2$ in the cyclic voltammetry test.

In some embodiments, the electrode exhibits a specific capacitance of 340 to 550 F/g, an energy density of 15 to 30 Wh/kg and a power density of 1100 to 1200 W/kg in a galvanostatic charge/discharge test. The galvanostatic charge/discharge test is conducted in a three-electrode setup of the $LaMn_xRu_yNi_{1-(x+y)}O_3$ electrode, a platinum counter electrode and a Ag/AgCl reference electrode.

In some embodiments, the electrode exhibits a series resistance of 0.7 to 1.0Ω and a charge transfer resistance of 1.5 to 2.0Ω in an electrochemical impedance analysis.

In yet another exemplary embodiment, an asymmetric supercapacitor is described. The asymmetric supercapacitor includes an anode with a layer of a perovskite coated on an anode copper foil substrate. The perovskite has a formula of $LaMn_xRu_yNi_{1-(x+y)}O_3$, where x is from 0.02 to 0.08 and y is from 0.08 to 0.02. The asymmetric supercapacitor further includes a cathode with a layer of an activated carbon coated on a cathode copper foil substrate and an electrolyte. The electrolyte contains 1-Methyl-1-propylpiperidinium bis(trifluoromethylsulfonyl) imide. The anode and the cathode are separated by a membrane containing the electrolyte.

In some embodiments, the asymmetric supercapacitor exhibits a specific capacitance of 80 to 100 F/g.

In some embodiments, the asymmetric supercapacitor exhibits an energy density of 80 to 100 Wh/kg.

In some embodiments, the asymmetric supercapacitor exhibits a power density of 1300 to 1500 W/kg.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
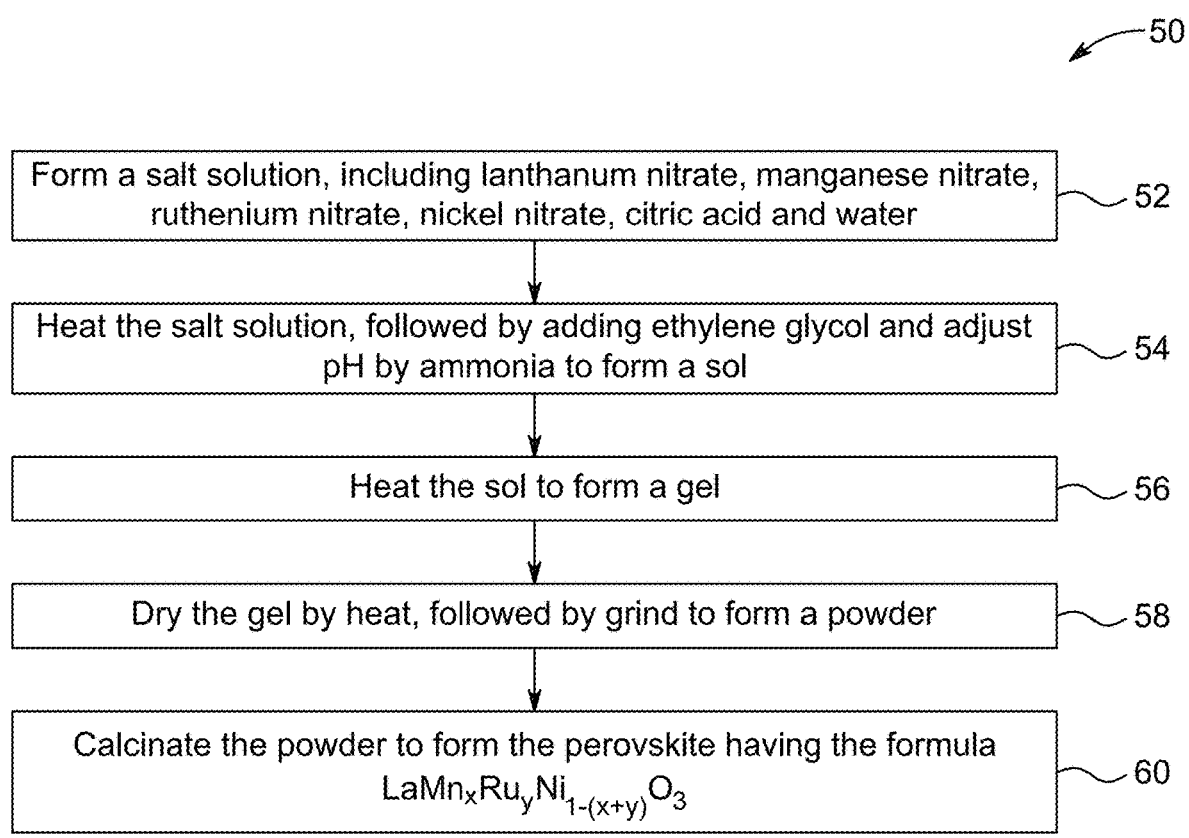
FIG. 1A illustrates a flow chart of a method of making a perovskite with a formula of $LaMn_xRu_yNi_{1-(x+y)}O_3$, where x is from 0.02 to 0.08 and y is from 0.08 to 0.02, according to certain embodiments.

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

In the drawings, like reference numerals designate identical or corresponding parts throughout the several views. Further, as used herein, the words 'a', 'an' and 'the' like generally carry a meaning of 'one or more', unless stated otherwise.

Furthermore, the terms 'approximately', 'approximate', 'about', and similar terms generally refer to ranges that include the identified value within a margin of 20%, 10%, or preferably 5%, and any values therebetween.

As used herein, the term 'room temperature' refers to a temperature range of 25 degrees Celsius (° C.)±3° C. in the present disclosure.

As used herein, the term 'asymmetric supercapacitor' refers to a supercapacitor including two electrodes made of different materials, typically combining a pseudocapacitive electrode and an electric double-layer capacitor (EDLC) electrode.

As used herein, the term 'electric double-layer capacitor (EDLC)' refers to a capacitor that stores energy through electrostatic separation of charge at the interface between a high surface area electrode and an electrolyte.

As used herein, the term 'electrode' refers to a conductive component within an electrochemical device that participates in charge storage or transfer.

As used herein, the term 'electrolyte' refers to a medium containing ions that enables ionic conductivity between electrodes in an electrochemical system.

As used herein, the term 'hydroxyl group' refers to the functional group with the chemical formula —OH and composed of one oxygen atom covalently bonded to one hydrogen atom.

As used herein, the term 'sol' refers to a colloidal suspension of solid particles dispersed in a liquid.

As used herein, the term 'gel' refers to a semi-solid material consisting of a network of interconnected particles or polymers within a liquid.

As used herein, the term 'cyclic voltammetry test' refers to an electrochemical technique where the potential of an electrode is cyclically varied to study redox processes.

As used herein, the term 'specific capacitance' refers to the capacitance per unit mass or volume of a material.

As used herein, the term 'capacitive-controlled capacitance' refers to the portion of capacitance arising from surface charge storage without diffusion limitations.

As used herein, the term 'diffusion-controlled capacitance' refers to the portion of capacitance influenced by ion diffusion within the electrode material.

As used herein, the term 'double-layer capacitance' refers to the capacitance due to charge separation at the electrode/electrolyte interface.

As used herein, the term 'energy density' refers to the amount of energy stored per unit mass or volume.

As used herein, the term 'galvanostatic charge/discharge test' refers to an electrochemical test applying constant current to charge and discharge an electrode.

As used herein, the term 'three-electrode set up' refers to an electrochemical cell configuration using a working, reference, and counter electrode.

As used herein, the term 'charge transfer resistance' refers to the resistance to electron transfer at the electrode/electrolyte interface.

As used herein, the term 'electrochemical impedance analysis' refers to a technique measuring the impedance of an electrochemical system over a range of frequencies.

As used herein, the term 'anode' refers to the electrode where oxidation occurs during electrochemical reactions.

As used herein, the term 'cathode' refers to the electrode where reduction occurs during electrochemical reactions.

As used herein, the term 'power density' refers to the rate of energy delivery per unit mass or volume.

As used herein, the term 'perovskite' refers to a class of crystalline materials that share the same crystal structure as calcium titanate ($CaTiO_3$), generally represented by the formula $ABX_3$, where 'A' and 'B' are cations of differing sizes and 'X' is an anion, typically oxygen or a halide.

One aspect of the present disclosure includes a perovskite having a formula $LaMn_xRu_yNi_{1-(x+y)}O_3$, where X is from 0.02 to 0.08 and y is from 0.08 to 0.02. The perovskite is in the form of porous non-agglomerated particles where X is from 0.01 to 0.03 and y is from 0.07 to 0.09. The perovskite has a hexagonal host crystal structure based on a hexagonal $LaNiO_3$ perovskite crystal, in which Mn and Ru are doped at a plurality of Ni sites. The perovskite exhibits a Mn oxidation state of +3 and a Ru oxidation state of +3. The perovskite is in the form of particles having an average crystallite size of 10 to 15 nanometers (nm). The geometry of the nanoparticles may include, but are not limited to, a circular, polygonal, triangular, and rectangular. The nanoparticles may exist in various morphological shapes, such as nanosheets, nanorods, nanospheres, nanowires, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, etc. and mixtures thereof. In a preferred embodiment, the particles are spherical. In a preferred embodiment, the particles have a plurality of alkyne groups and hydroxyl groups on the surface.

FIG. 1A illustrates a flow chart of a method 50 of making the perovskite. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes forming a salt solution, including lanthanum nitrate, manganese nitrate, ruthenium nitrate, nickel nitrate, citric acid and water. Lanthanum nitrate, manganese nitrate, ruthenium nitrate, nickel nitrate has a molar ratio corresponding to 1:x:y:1−(x+y).

At step 54, the method 50 includes heating the salt solution, followed by adding ethylene glycol and adjusting pH by ammonia to form a sol. In some embodiments, the heating may be performed using heating appliances such as ovens, microwaves, autoclaves, hot plates, heating mantles and tapes, oil baths, salt baths, sand baths, air baths, hot-tube furnaces, and hot-air guns.

At step 56, the method 50 includes heating the sol to form a gel.

At step 58, the method 50 includes drying the gel by heat, followed by grinding to form a powder. The grinding may be carried out using any suitable means, for example, ball milling, blending, etc., using manual method (e.g., mortar) or machine-assisted methods such as using a mechanical blender, or any other apparatus known to those of ordinary skill in the art.

At step 60, the method 50 includes calcinating the powder to form the perovskite having the formula $LaMn_xRu_yNi_{1-(x+y)}O_3$. The calcination is carried out by heating it to a high temperature under a restricted supply of ambient oxygen. This is performed to remove impurities or volatile substances and to incur thermal decomposition. Typically, the calcination is carried out in a furnace, preferably equipped with a temperature control system, which may provide a heating rate of up to 50° C./min, preferably up to 40° C./min, preferably up to 30° C./min, preferably up to 20° C./min, preferably up to 10° C./min, preferably up to 5° C./min, and preferably up to 1° C./min.

Another aspect of the present disclosure includes a $LaMn_xRu_yNi_{1-(x+y)}O_3$ electrode comprising a nickel foam and a perovskite coating having a formula of $LaMn_xRu_yNi_{1-(x+y)}O_3$, where X is from 0.02 to 0.08 and y is from 0.08 to 0.02. The perovskite coating is present on a surface of the nickel foam.

The $LaMn_xRu_yNi_{1-(x+y)}O_3$ electrode exhibits a peak potential of 0.110 to 0.125 volts (V) in a cyclic voltammetry test. The $LaMn_xRu_yNi_{1-(x+y)}O_3$ electrode exhibits a specific capacitance of 700 to 1000 faraday per gram (F/g) in a cyclic voltammetry test. The specific capacitance includes a capacitive-controlled capacitance and a diffusion-controlled capacitance. The capacitive-controlled capacitance is at a percentage of 10 to 37%, and the diffusion-controlled capacitance is at a percentage of 63 to 95%, based on a total of the capacitive-controlled capacitance and the diffusion-controlled capacitance. When x=0 and y=0, the capacitive-controlled contribution increases from 15% at 5 mV/s to 53% at 50 mV/s, while the diffusion-controlled contribution decreases from 85% to 47%. When x=0.02 and y=0.08, capacitive-controlled ranges from 15% to 37% and diffusion-controlled from 85% to 63%. When x=0.05 and y=0.05, capacitive-controlled increases from 7% to 20% and diffusion-controlled decreases from 93% to 80%. When x=0.08 and y=0.02, capacitive-controlled rises from 10% to 26% and diffusion-controlled falls from 90% to 74% as scan rate increases from 5 to 50 mV/s.

The $LaMn_xRu_yNi_{1-(x+y)}O_3$ electrode exhibits a double-layer capacitance of 120 to 250 millifarads per square centimeter ($mF/cm^2$), preferably 121 to 249 $mF/cm^2$, preferably 122 to 248 $mF/cm^2$, preferably 123 to 247 $mF/cm^2$, preferably 124 to 246 $mF/cm^2$, preferably 125 to 245 $mF/cm^2$, preferably 126 to 244 $mF/cm^2$, preferably 127 to 243 $mF/cm^2$, preferably 128 to 242 $mF/cm^2$, preferably 129 to 241 $mF/cm^2$, preferably 130 to 240 $mF/cm^2$, preferably 131 to 239 $mF/cm^2$, preferably 132 to 238 $mF/cm^2$, preferably 133 to 237 $mF/cm^2$, preferably 134 to 236 $mF/cm^2$, preferably 135 to 235 $mF/cm^2$, preferably 232 $mF/cm^2$ in a cyclic voltammetry test. The $LaMn_xRu_yNi_{1-(x+y)}O_3$ electrode exhibits a specific capacitance of 340 to 550 F/g, an energy density of 15 to 30 watt hour per kilogram (Wh/kg) and a power density of 1100 to 1200 watt per kilogram (W/kg) in a galvanostatic charge/discharge test having a three-electrode set up.

The $LaMn_xRu_yNi_{1-(x+y)}O_3$ electrode (x=0.00, y=0.00) shows a specific capacitance of 349.10 F/g, power density of 1132.40 W/kg, and energy density of 14.66 Wh/kg. The $LaMn_xRu_yNi_{1-(x+y)}O_3$ electrode with x=0.02 and y=0.08 achieves the highest specific capacitance (632.72 F/g) and energy density (26.58 Wh/kg), indicating significant improvement due to doping. The $LaMn_xRu_yNi_{1-(x+y)}O_3$ electrode (x=0.05, y=0.05 and x=0.08, y=0.02) also show enhanced performance compared to the undoped material, though not as high as the x=0.02, y=0.08 composition.

The three-electrode set up includes the $LaMn_xRu_yNi_{1-(x+y)}O_3$ electrode, a counter electrode, and a reference electrode. As used herein, the term 'reference electrode' refers to an electrode with a stable and well-known electrode potential. The reference electrode is a silver/silver chloride (Ag/AgCl) chloride. In some embodiments, the reference electrode may include, but is not limited to, standard hydrogen electrode (SHE), calomel electrode (saturated calomel electrode, SCE), copper/copper sulfate electrode (Cu/$CuSO_4$), standard calomel electrode (SCE), Luggin capillary. The counter-electrode refers to the electrode used in an electrochemical cell for voltammetric analysis or other reactions in which an electric current is expected to flow. An outer surface of the counter electrode may include an inert, electrically conducting chemical substance, such as platinum, gold, or carbon. The carbon may be in the form of graphite or glassy carbon. The counter electrode is a platinum rod. In one embodiment, the counter electrode may be a wire, a rod, a cylinder, a tube, a scroll, a sheet, a piece of foil, a woven mesh, a perforated sheet, or a brush. The counter electrode material should thus be sufficiently inert to withstand the chemical conditions in the electrolyte solution, such as acidic or basic pH values, without substantially degrading during the electrochemical reaction. In addition, the counter electrode should preferably not leach out any chemical substance that interferes with the electrochemical reaction or might lead to undesirable electrode contamination. In some embodiments, the reference electrode and the counter-electrode may be connected through electrical interconnects that allow for the passage of current between the electrodes when a potential is applied between them. In an embodiment, the reference electrode and the counter-electrode can have the same or different dimensions. The reference electrode and the counter-electrode may be arranged as obvious to a person of ordinary skill in the art.

The $LaMn_xRu_yNi_{1-(x+y)}O_3$ electrode exhibits a series resistance of 0.7 to 1.0 ohm ($\Omega$) and a charge transfer resistance of 1.5 to 2.0$\Omega$ in an electrochemical impedance analysis. An asymmetric supercapacitor includes an anode, having a layer of a perovskite coated on an anode copper foil substrate. The perovskite has a formula of $LaMn_xRu_yNi_{1-(x+y)}O_3$. X is from 0.02 to 0.08 and y is from 0.08 to 0.02. For the $LaMn_xRu_yNi_{1-(x+y)}O_3$ electrode with x=0.00 and y=0.00, the series resistance is 0.93$\Omega$ and the charge transfer resistance is 1.92$\Omega$. When x=0.02 and y=0.08, these resistances decrease to 0.82$\Omega$ and 1.60$\Omega$, respectively. For x=0.05 and y=0.05, the series resistance is 0.72$\Omega$ and the charge transfer resistance is 1.66$\Omega$. Finally, at x=0.08 and y=0.02, the values are 0.85$\Omega$ for the series resistance and 1.8$\Omega$ for the charge transfer resistance.

A cathode has a layer of an activated carbon coated on a cathode copper foil substrate. An electrolyte includes 1-Methyl-1-propylpiperidinium bis(trifluoromethylsulfonyl)imide. In some embodiments, the electrolyte may include, but is not limited to, 1-Methyl-1-propylpiperidinium bis(trifluoromethylsulfonyl)imide, 1-Ethyl-1-methylpiperidinium bis(trifluoromethylsulfonyl)imide, 1-Butyl-1-methylpyrrolidinium bis(trifluoromethylsulfonyl)imide, 1-Ethyl-3-methylimidazolium bis(trifluoromethylsulfonyl)

imide, 1-Propyl-3-methylimidazolium bis(fluorosulfonyl) imide, N-Methyl-N-propylpyrrolidinium bis(fluorosulfonyl) imide, 1-Hexyl-3-methylimidazolium tetrafluoroborate.

The anode and the cathode are separated by a membrane containing the electrolyte. In some embodiments, the membrane may be a cellulose membrane saturated with the electrolyte. The membrane may be selected from a group including polypropylene (PP) membrane, glass fiber, and cellulose fiber. In some embodiments, the membrane may include bacterial cellulose fiber, a polyolefin such as polyethylene (PE), or a combination of PP and PE. The membrane may be present between the anode and the cathode, and the electrolyte is present in and on the membrane.

The asymmetric supercapacitor exhibits a specific capacitance of 80 to 100 F/g, preferably 80.1 to 99 F/g, preferably 80.2 to 98 F/g, preferably 80.3 to 97 F/g, preferably 80.4 to 96 F/g, preferably 80.5 to 95 F/g, preferably 80.6 to 94 F/g, preferably 80.7 to 93 F/g, preferably 80.8 to 92 F/g, preferably 80.9 to 91 F/g, preferably 81.0 to 90 F/g, preferably 81.1 to 89 F/g, preferably 81.2 to 88 F/g, preferably 81.3 to 87 F/g, preferably 81.4 to 86 F/g, preferably 81.5 to 85 F/g, preferably 81.48 F/g. The asymmetric supercapacitor exhibits an energy density of 80 to 100 Wh/kg, preferably 80.1 to 99 F/g, preferably 80.2 to 98 F/g, preferably 80.3 to 97 F/g, preferably 80.4 to 96 F/g, preferably 80.5 to 95 F/g, preferably 80.6 to 94 F/g, preferably 80.7 to 93 F/g, preferably 80.8 to 92 F/g, preferably 80.9 to 91 F/g, preferably 81.0 to 90 F/g, preferably 81.1 to 89 F/g, preferably 81.2 to 88 F/g, preferably 81.3 to 87 F/g, preferably 81.4 to 86 F/g, preferably 81.5 to 85 F/g, preferably 81.6 to 84 F/g, preferably 81.7 to 83 F/g, preferably 82.5 F/g. The asymmetric supercapacitor exhibits a power density of 1300 to 1500 W/kg, preferably 1301 to 1359 W/kg, preferably 1302 to 1358 W/kg, preferably 1303 to 1357 W/kg, preferably 1304 to 1356 W/kg, preferably 1305 to 1355 W/kg, preferably 1306 to 1354 W/kg, preferably 1307 to 1353 W/kg, preferably 1308 to 1352 W/kg, preferably 1309 to 1351 W/kg, preferably 1350 W/kg.

EXAMPLES

The following examples demonstrate a perovskite, an electrode, and an asymmetric supercapacitor having the perovskite. The examples are provided solely for illustration and are not to be construed as limitations of the present disclosure, as many variations thereof are possible without departing from the spirit and scope of the present disclosure.

Example 1: Materials

The initial precursor materials included lanthanum nitrate hexahydrate ($La(NO_3)_3 \cdot 6H_2O$), manganese nitrate tetrahydrate ($Mn(NO_3)_2 \cdot 4H_2O$), ruthenium nitrate hexahydrate ($Ru(NO_3)_2 \cdot 6H_2O$), nickel nitrate hexahydrate ($Ni(NO_3)_3 \cdot 6H_2O$), ammonia solution ($NH_3 \cdot H_2O$), ethylene glycol ($C_2H_6O_2$), and citric acid. All chemicals were procured from Sigma-Aldrich Co., Ltd. and were used as received, without any additional purification.

Example 2: Preparation of Un-Doped and Mn—Ru Co-Doped $LaNiO_3$ Electrode Materials A series of $LaMn_xRu_yN_{1-(x+y)}O_3$ compositions were synthesized using a sol-gel method, with target stoichiometries of (x=0, y=0), (x=0.02, y=0.08), (x=0.05, y=0.05), and (x=0.08, y=0.02) [See: D. Navas, S. Fuentes, A. Castro-Alvarez, and E. Chavez-Angel, "*Review on sol-gel synthesis of perovskite and oxide nanomaterials,*" Gels, vol. 7, no. 4, p. 275, 2021; L. Yafarova, I. Chislova, I. Zvereva, T. Kryuchkova, V. Kost, and T. Sheshko, "*Sol-gel synthesis and investigation of catalysts on the basis of perovskite-type oxides GdMO 3 (M=Fe, Co),*" Journal of Sol-Gel Science and Technology, vol. 92, pp. 264-272, 2019; and J. Chen, M. Shen, X. Wang, J. Wang, Y. Su, and Z. Zhao, "*Catalytic performance of NO oxidation over $LaMeO_3$ (Me=Mn, Fe, Co) perovskite prepared by the sol-gel method,*" Catalysis Communications, vol. 37, pp. 105-108, 2013, incorporated herein by reference in its entirety]. For each composition, stoichiometric quantities of lanthanum nitrate hexahydrate, manganese nitrate tetrahydrate, ruthenium nitrate, and nickel nitrate hexahydrate were dissolved in 30 milliliters of deionized water. Citric acid (3.0 g) was added as a chelating agent. The resulting mixture was magnetically stirred at 90° C. until a homogeneous, clear solution without any visible precipitate was obtained. Subsequently, 2 milliliters of ethylene glycol were introduced into the solution as a cross-linking agent. Ammonia solution was then incrementally added to adjust the pH of the sol to approximately 7, in order to prevent unwanted precipitation and maintain solution stability. The temperature was gradually increased to 100° C. to initiate evaporation of the solvent and promote gel formation. The resulting gel underwent spontaneous combustion at approximately 200° C., yielding a lightweight, porous powder.

Figure 1B:
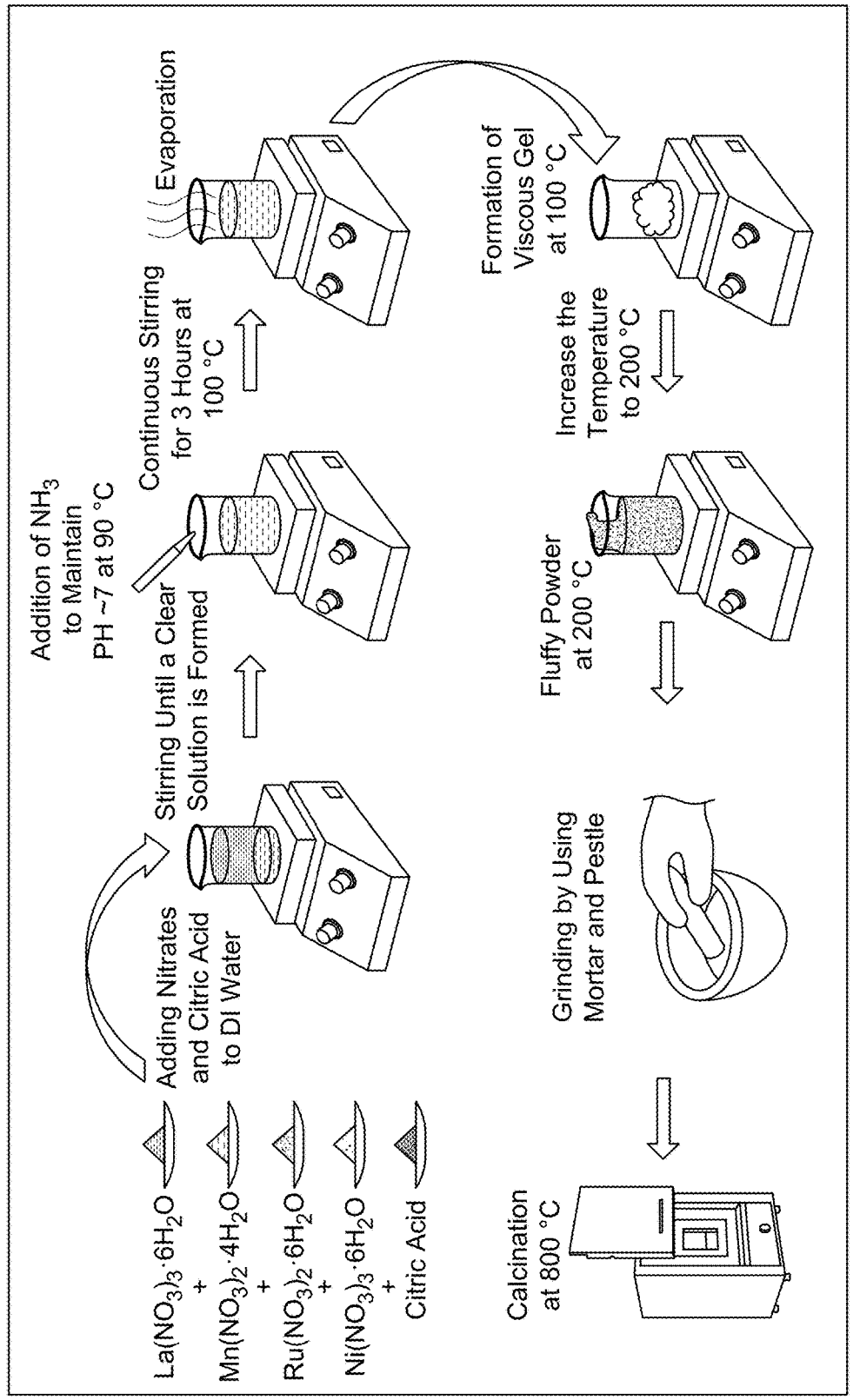
FIG. 1B illustrates a schematic diagram of an exemplary method of preparation the perovskite $LaMn_xRu_yNi_{1-(x+y)}O_3$ using a sol-gel synthetic route, according to certain embodiments.

The obtained powder was finely ground and subjected to calcination in a muffle furnace at 800° C. for a duration of 12 hours to promote crystallization and formation of the desired perovskite phase. The aforementioned synthetic route was consistently applied to prepare all compositions of the Mn—Ru co-doped $LaNiO_3$ series. A schematic representation of the preparation process is illustrated in FIG. 1B, according to certain embodiments.

Example 3: Evaluation of Electrochemical Behavior

Electrochemical properties of $LaMn_xRu_yN_{1-(x+y)}O_3$ compositions were evaluated using both three-electrode and two-electrode configurations. In the initial investigation, the electrochemical performance of the synthesized compositions was examined in a three-electrode setup comprising a working electrode (composed of the active material coated onto nickel foam), a counter electrode (platinum wire), and a reference electrode (Ag/AgCl) [See: A. Manohar, V. Vijayakanth, S. P. Vattikuti, and K. H. Kim, "*Electrochemical energy storage and photoelectrochemical performance of Ni1-XZnXFe2O4 nanoparticles,*" Materials Science in Semiconductor Processing, vol. 157, p. 107338, 2023, incorporated herein by reference in its entirety].

Following the preliminary evaluation, a full device was assembled using the optimized $LaMn_xRu_yNi_{1-(x+y)}O_3$ composition as the positive electrode in an asymmetric supercapacitor configuration. Cyclic voltammetry (CV) measurements were conducted to assess the redox behavior and capacitance characteristics. The CV curve represents a plot of current (I) as a function of potential (V), with the scan rate (s) defined as the rate of potential sweep during the measurement, typically expressed in millivolts per second (mV/s).

The specific capacitance (Csp), in farads per gram (F/g), was determined from the CV data using the mathematical relation expressed in Equation 1 [See: B. Bashir et al., "*Copper substituted nickel ferrite nanoparticles anchored onto the graphene sheets as electrode materials for super-*

*capacitors fabrication,"* Ceramics International, vol. 45, no. 6, pp. 6759-6766, 2019, incorporated herein by reference in its entirety]:

$$C_{sp} = \frac{c}{m} = \frac{1}{ms\Delta V}\int I dt \quad (1)$$

where I is the current in Ampere (A), s is the scan rate, $\Delta V$ is the potential window, and m indicates the mass of the active material.

A galvanostatic charge discharge (GCD) curve plots the potential (V) versus time (t) during a charge-discharge cycle at a constant current (I). The slope of the discharge curve is an important parameter for calculating the capacitance. The capacitance C can be calculated using the relationship in equation 2:

$$C = \frac{1}{\text{Slope}} = \frac{I\Delta t}{\Delta V} \quad (2)$$

where I is the charge/discharge current (constant), $\Delta V$ is the change in potential (V) during the charge/discharge, and $\Delta t$ is the corresponding discharging time (s). To find the specific capacitance ($C_{sp}$), normalize the capacitance by the mass of the active material. The equation for the calculation of the specific capacitance $C_{sp}$ (F/g) from GCD in equation 3 [See: G. Nabi et al., *"Role of cerium-doping in CoFe2O4 electrodes for high performance supercapacitors,"* Journal of Energy Storage, vol. 29, p. 101452, 2020, incorporated herein by reference in its entirety]:

$$C_{sp} = \frac{C}{m} = \frac{I\Delta t}{m\Delta V} \quad (3)$$

where m indicates the mass of the active material. Whereas the energy density Ed (W/kg) and power density Pd (Wh/kg) for supercapacitors can be calculated by relations expressed in equation 4 and equation 5 [See: S. Omokafe, A. Adeniyi, E. Igbafen, S. Oke, and P. Olubambi, *"Fabrication of activated carbon from coconut shells and its electrochemical properties for supercapacitors,"* International Journal of Electrochemical Science, vol. 15, no. 11, pp. 10854-10865, 2020, incorporated herein by reference in its entirety], provided hereinafter:

$$E_d = \frac{1}{2}C_{sp}\Delta V^2 \quad (4)$$

$$P_d = \frac{E_d}{\Delta t} \quad (5)$$

The crystal structure of manganese- and ruthenium-co-doped lanthanum nickelate ($LaMn_xRu_yNi_{1-(x+y)}O_3$) was examined using X-ray diffraction (XRD). Compositions analysed included x=0, y=0; x=0.08, y=0.02; x=0.05, y=0.05; and x=0.02, y=0.08. XRD measurements were performed using a Cu-K$\alpha$ radiation source with a wavelength of 1.5406 Å. XRD was utilized to characterize atomic positions and crystallographic arrangements within the unit cell [See: N. Pappas, *"Calculating retained austenite in steel post magnetic processing using X-ray diffraction,"* BS Undergr. Maths Exch, vol. 4, pp. 8-14, 2006, incorporated herein by reference in its entirety].

Figure 2A:
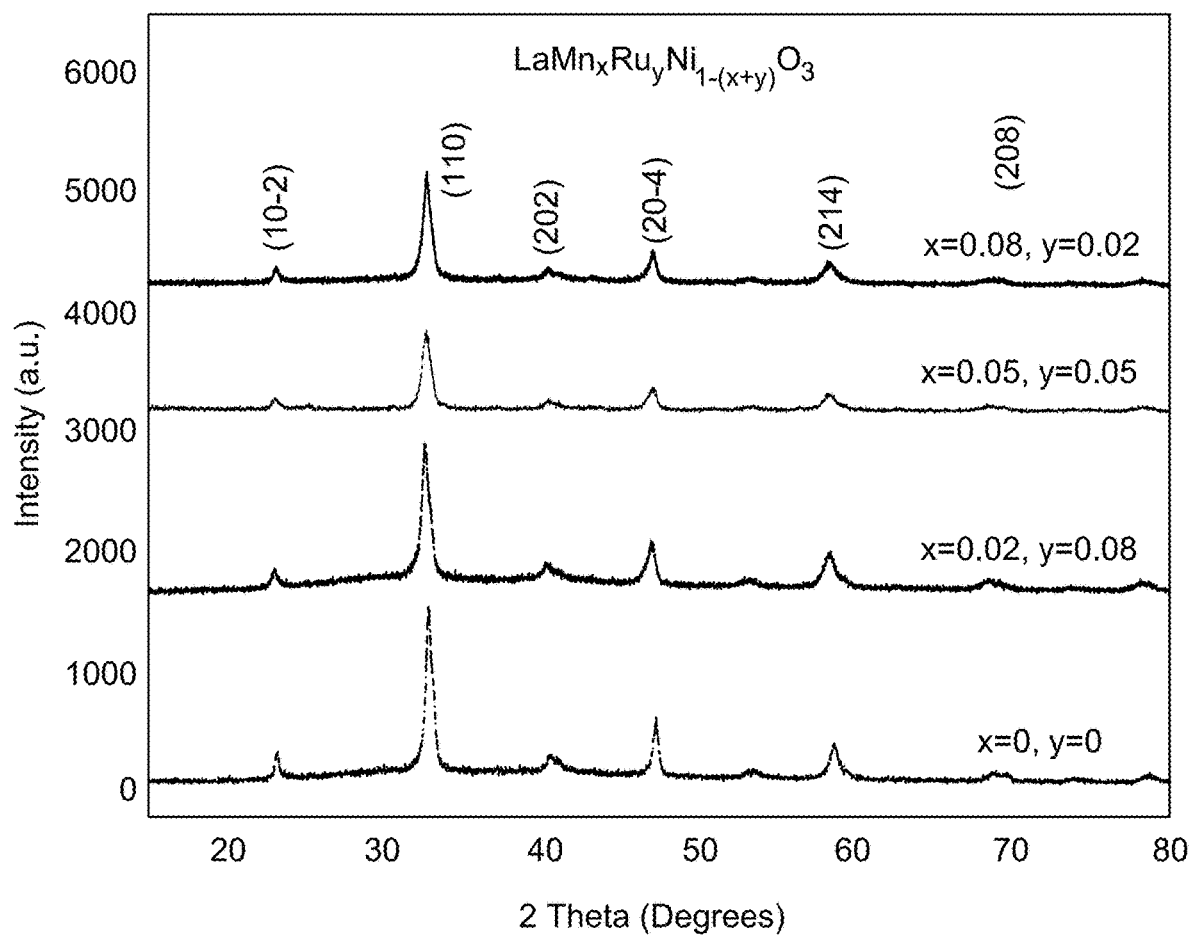
FIG. 2A illustrates an X-ray diffraction (XRD) pattern of the perovskite $LaMn_xRu_yNi_{1-(x+y)}O_3$ for various doping ratios between Mn and Ru, according to certain embodiments.

The diffraction peaks of all compositions agreed with the standard reference pattern JCPDS: 96-100-0311. The analysis confirmed a hexagonal phase structure for the undoped and co-doped LaNiO3 samples [See: J. Kiely and J. Houston, *"Nanomechanical properties of Au (111), (001), and (110) surfaces,"* Physical Review B, vol. 57, no. 19, p. 12588, 1998, incorporated herein by reference in its entirety]. Assigned Miller indices for the prominent diffraction planes include (1 0-2), (1 1 0), (2 0 2), (2 0-4), (2 1 4), and (2 0 8), corresponding to Bragg angles at 23.4°, 32.9°, 40.9°, 47.3°, 58.6°, and 69°, respectively, as shown in FIG. 2A.

Figure 2B:
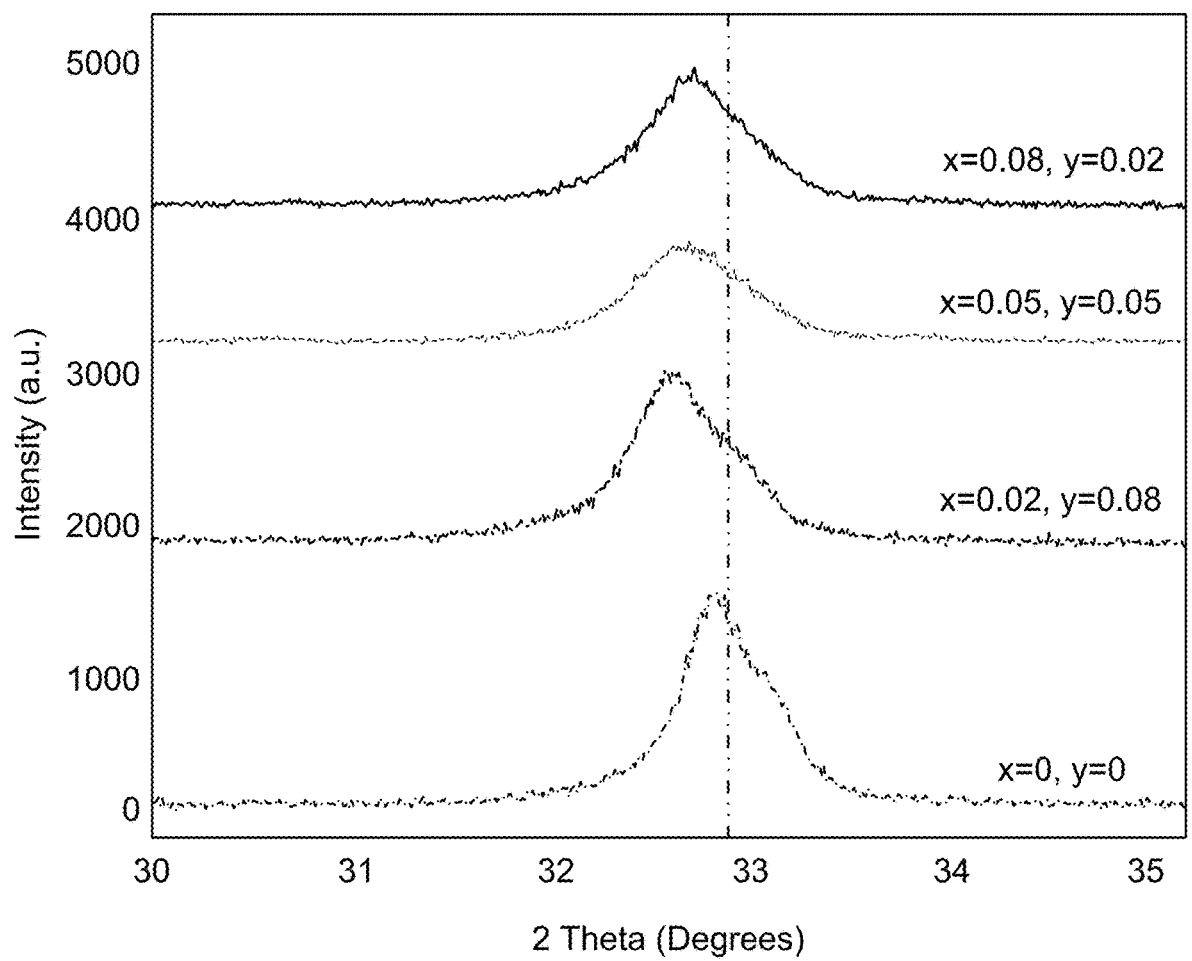
FIG. 2B illustrates a magnified view of diffraction peak observed in the XRD pattern of the perovskite $LaMn_xRu_yNi_{1-(x+y)}O_3$ at a 2θ rage of 30 to 35 degrees, according to certain embodiments.
Figure 3A:
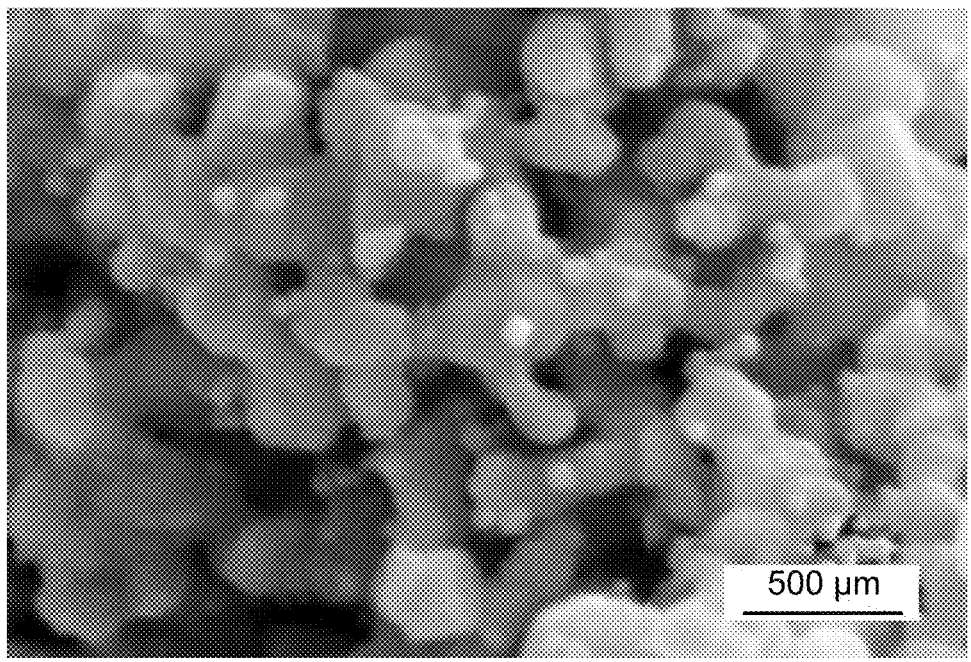
FIG. 3A illustrates a high-scale bar field emission scanning electron microscopy (FESEM) image of the perovskite $LaMn_xRu_yNi_{1-(x+y)}O_3$ with (x, y)=(0, 0) at a scale bar of 500 nanometres (nm), indicating the base morphology of the un-doped perovskite sample, according to certain embodiments.
Figure 3B:
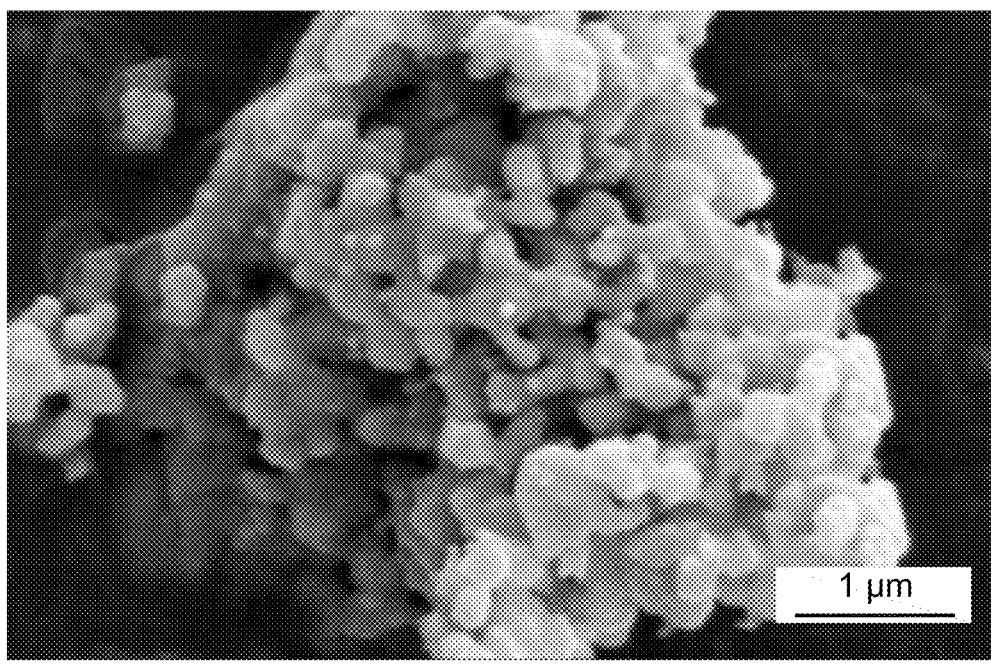
FIG. 3B illustrates a low-scale bar FESEM image of the perovskite $LaMn_xRu_yNi_{1-(x+y)}O_3$ with (x, y)=(0, 0) at a scale bar of 1 micrometer (μm), according to certain embodiments.
Figure 3C:
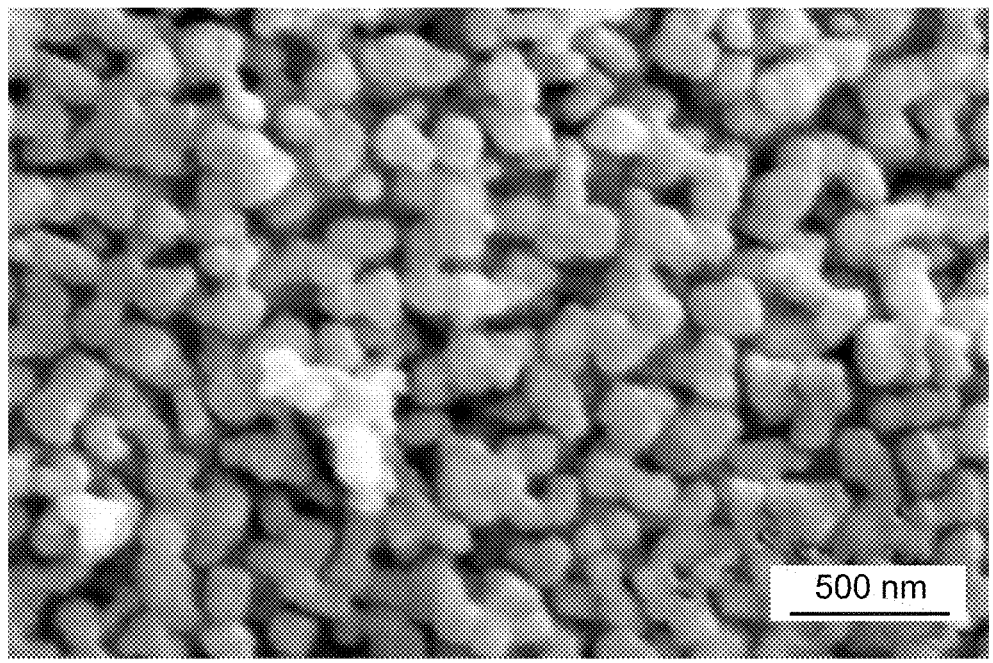
FIG. 3C illustrates a high-scale bar FESEM image of the perovskite $LaMn_xRu_yNi_{1-(x+y)}O_3$ with (x, y)=(0.02, 0.08) at a scale bar of 500 nm, according to certain embodiments.
Figure 3D:
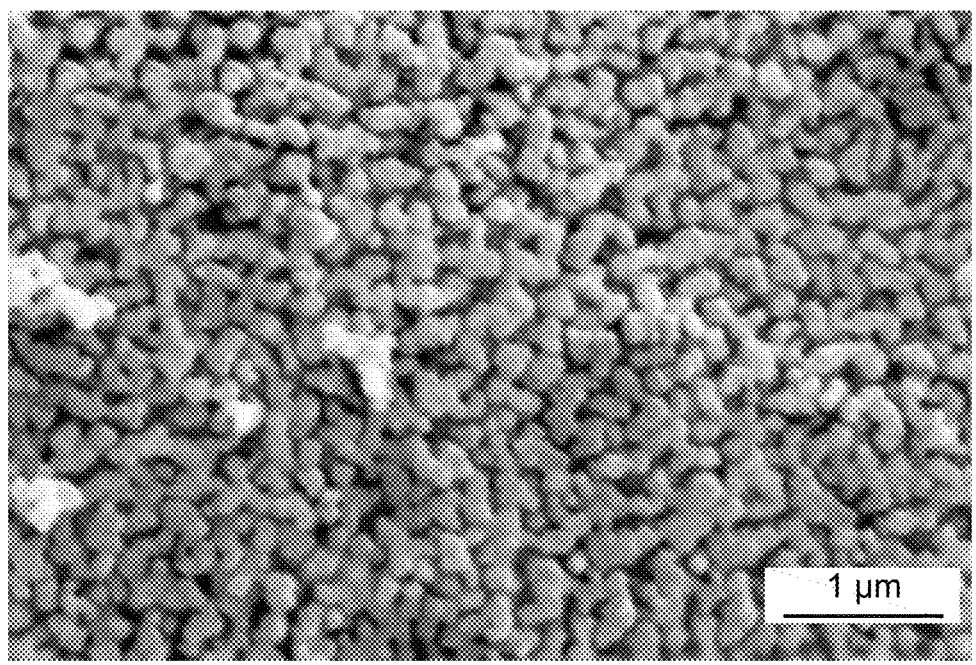
FIG. 3D illustrates a low-scale bar FESEM image of the perovskite $LaMn_xRu_yNi_{1-(x+y)}O_3$ with (x, y)=(0.02, 0.08) at a scale bar of 1 μm, according to certain embodiments.
Figure 3E:
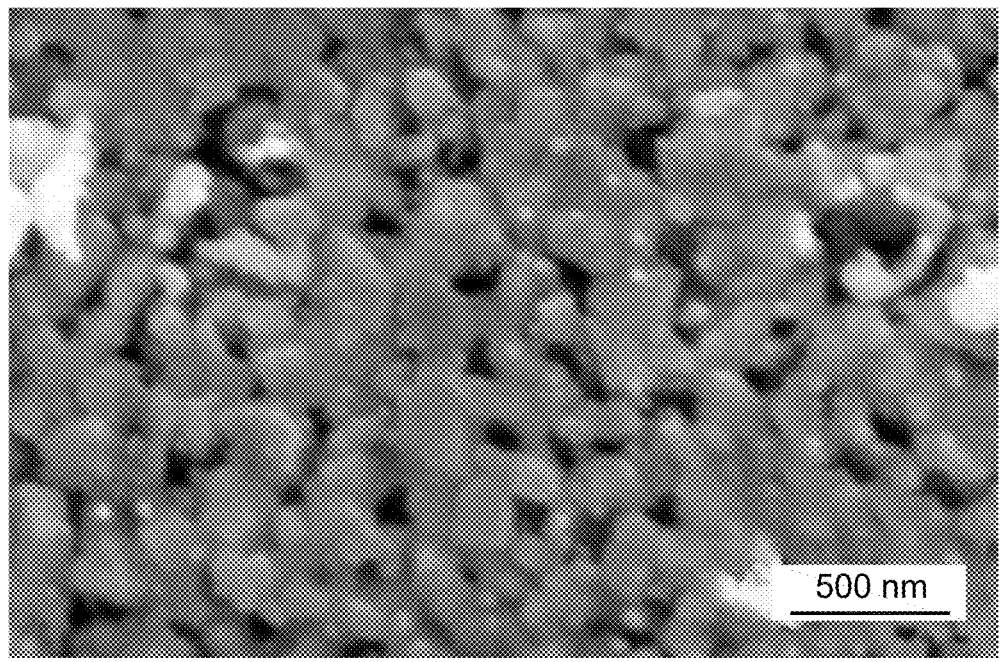
FIG. 3E illustrates a high-scale bar FESEM image of the perovskite $LaMn_xRu_yNi_{1-(x+y)}O_3$ with (x, y)=(0.05, 0.05) at a scale bar of 500 nm, according to certain embodiments.
Figure 3F:
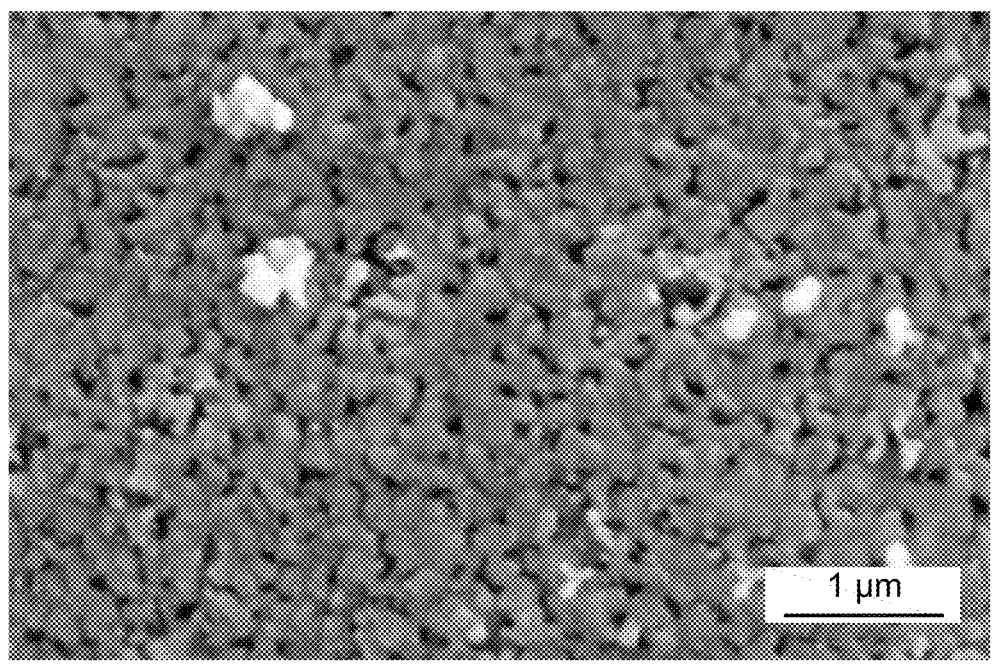
FIG. 3F illustrates a low-scale bar FESEM image of the perovskite $LaMn_xRu_yNi_{1-(x+y)}O_3$ with (x, y)=(0.05, 0.05) at a scale bar of 1 μm, according to certain embodiments.
Figure 3G:
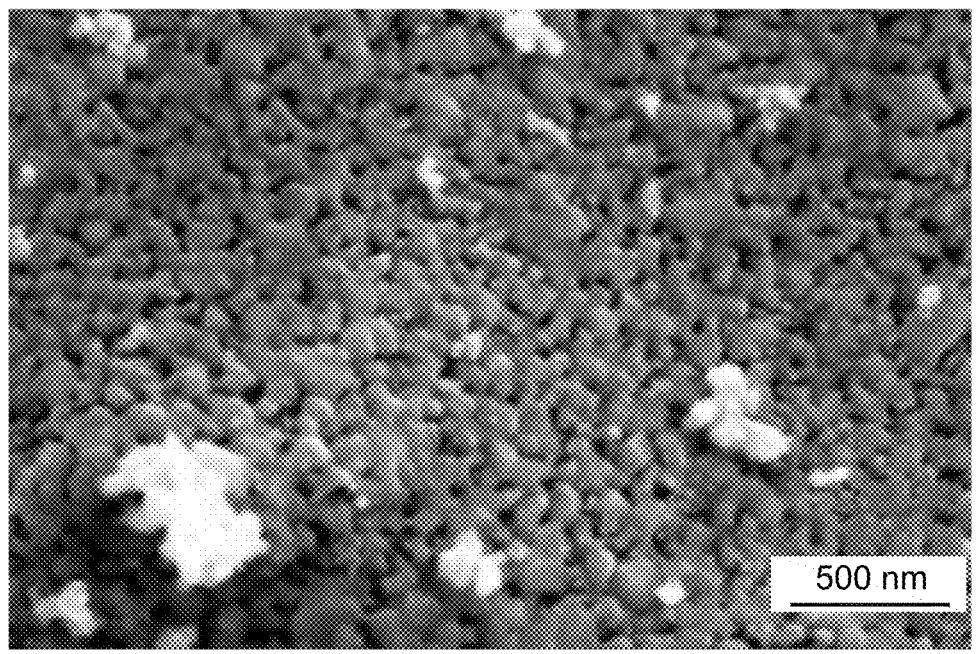
FIG. 3G illustrates a high-scale bar FESEM image of the perovskite $LaMn_xRu_yNi_{1-(x+y)}O_3$ with (x, y)=(0.08, 0.02) at a scale bar of 500 nm, according to certain embodiments.
Figure 3H:
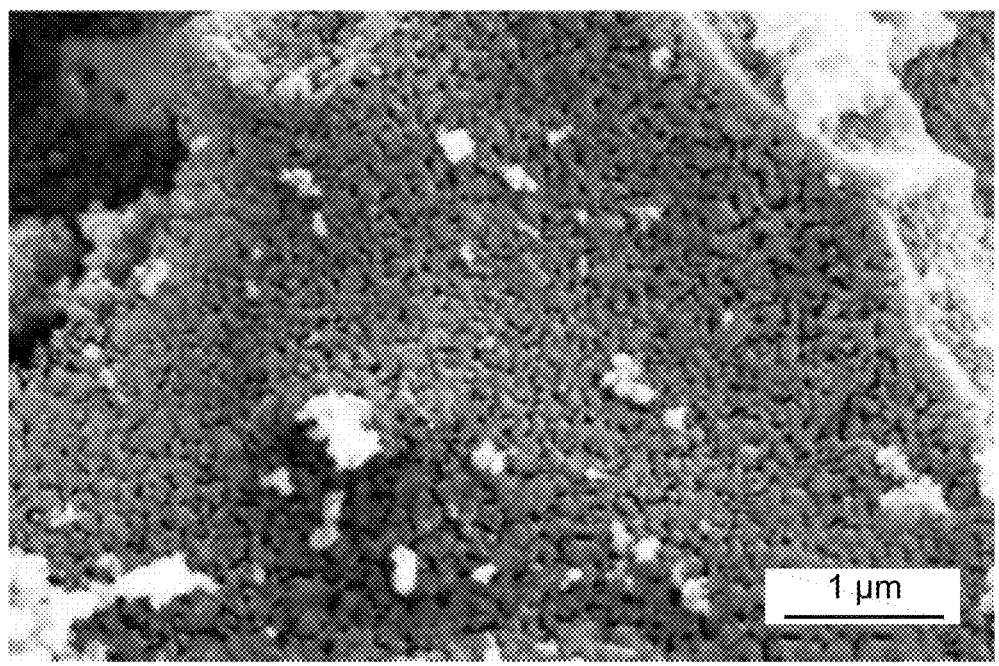
FIG. 3H illustrates a low-scale bar FESEM image of the perovskite $LaMn_xRu_yNi_{1-(x+y)}O_3$ with (x, y)=(0.08, 0.02) at a scale bar of 1 μm, according to certain embodiments.
Figure 3I:
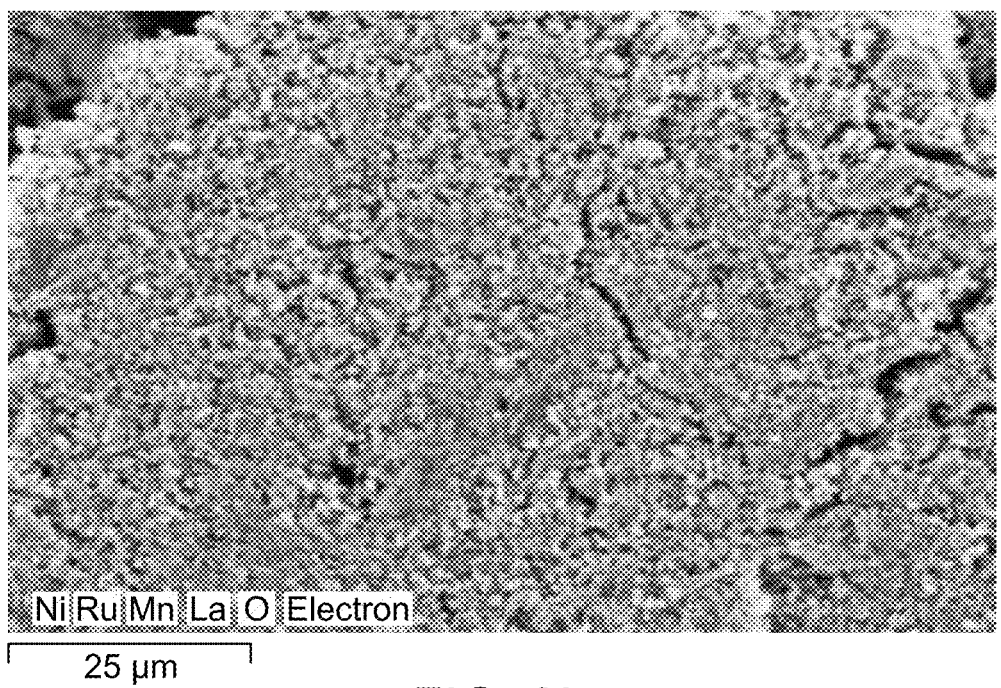
FIG. 3I illustrates an energy-dispersive X-ray spectroscopy (EDX) image of the perovskite $LaMn_xRu_yNi_{1-(x+y)}O_3$ with (x, y) (0.08, 0.02) at a scale bar of 25 μm, according to certain embodiments.
Figure 3J:
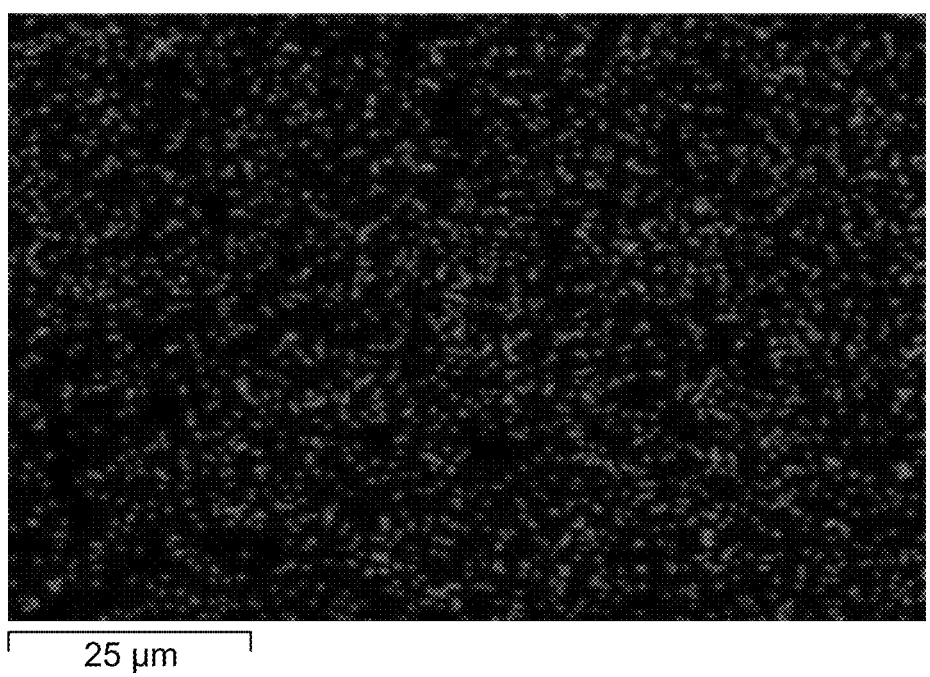
FIG. 3J illustrates an elemental mapping of lanthanum (La) using the EDX image, showing a homogenous distribution of La in the perovskite $LaMn_xRu_yNi_{1-(x+y)}O_3$, according to certain embodiments.
Figure 3K:
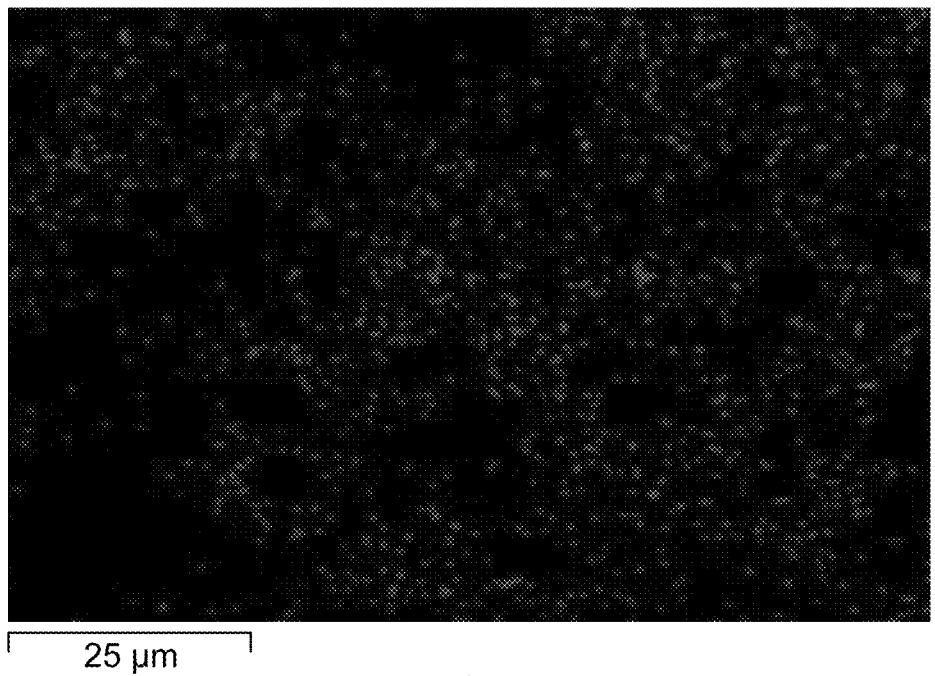
FIG. 3K illustrates an elemental mapping of oxygen (O) using the EDX image, showing a homogenous distribution of O in the perovskite $LaMn_xRu_yNi_{1-(x+y)}O_3$, according to certain embodiments.
Figure 3L:
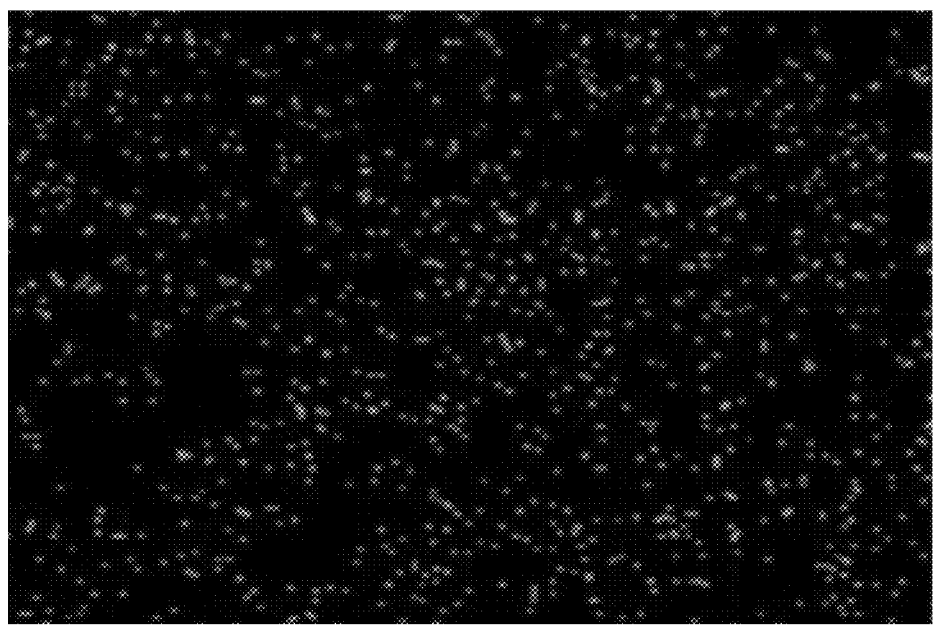
FIG. 3L illustrates an elemental mapping of nickel (Ni) using the EDX image, showing a homogenous distribution of Ni in the perovskite $LaMn_xRu_yNi_{1-(x+y)}O_3$, according to certain embodiments.
Figure 3M:
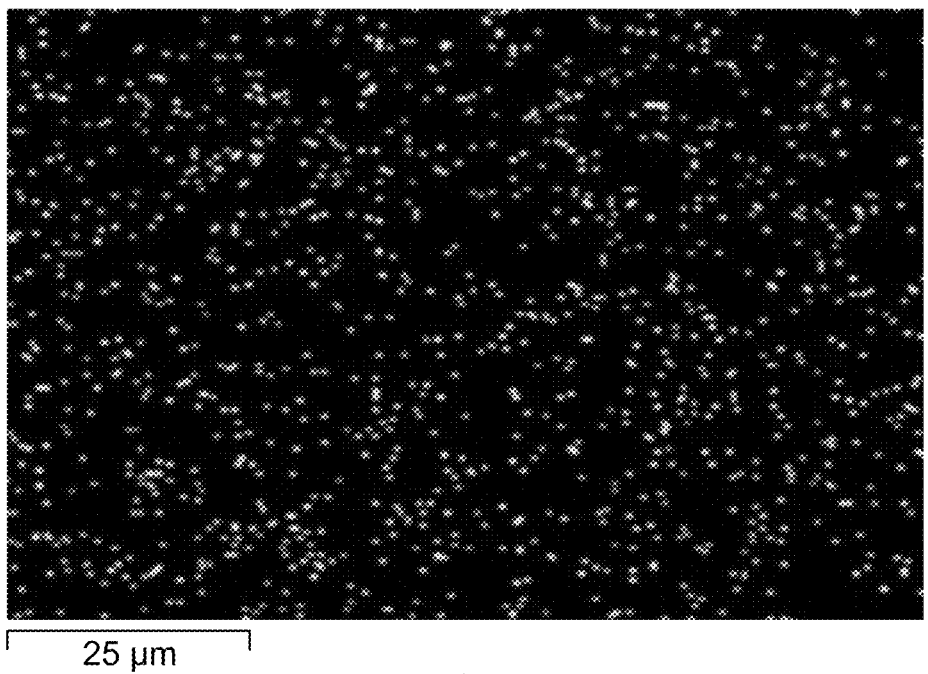
FIG. 3M illustrates an elemental mapping of manganese (Mn) using the EDX image, showing a homogenous distribution of Mn in the perovskite $LaMn_xRu_yNi_{1-(x+y)}O_3$, according to certain embodiments.
Figure 3N:
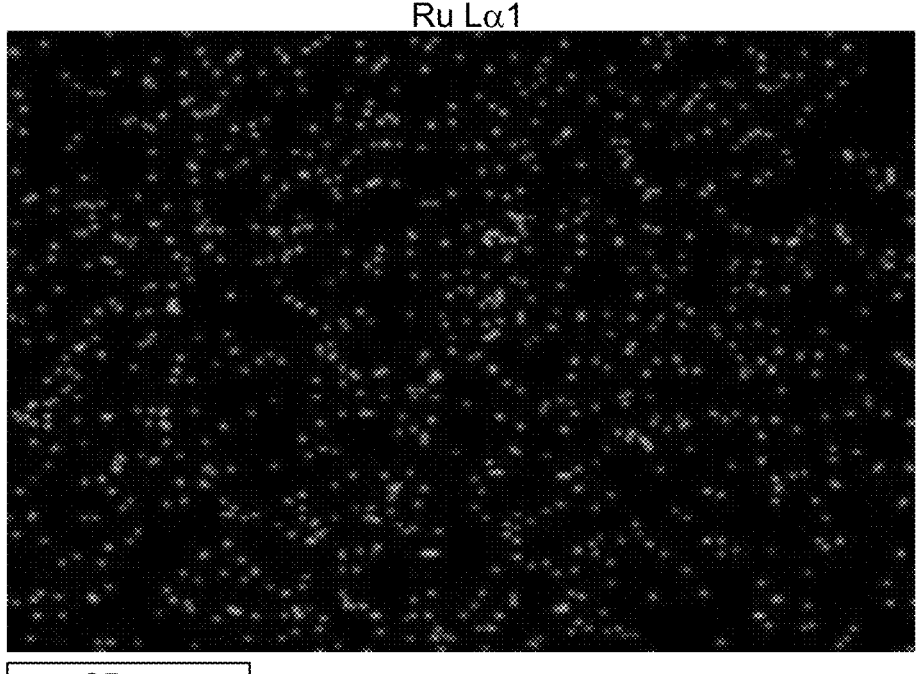
FIG. 3N illustrates an elemental mapping of ruthenium (Ru) using the EDX image, showing a homogenous distribution of Ru in the perovskite $LaMn_xRu_yNi_{1-(x+y)}O_3$, according to certain embodiments.
Figure 3O:
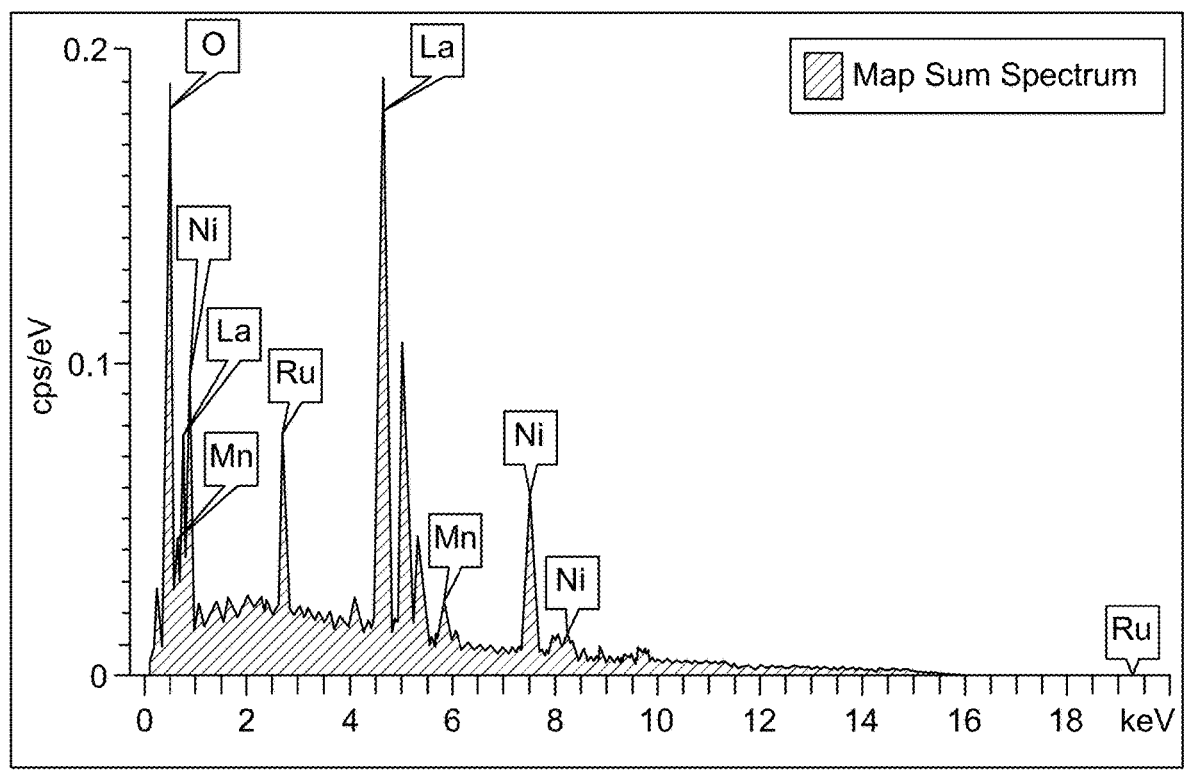
FIG. 3O illustrates an EDX analysis confirming the elemental composition of La, O, Ni, Mn, and Ru in the perovskite $LaMn_xRu_yNi_{1-(x+y)}O_3$, according to certain embodiments.

The absence of secondary diffraction peaks in the XRD profiles of Mn—Ru co-doped $LaNiO_3$ indicated successful incorporation of manganese and ruthenium ions into the $LaNiO_3$ lattice without phase segregation. Peak shifting was observed in the most intense (110) plane, with a notable shift to lower angles in the composition having x=0.02 and y=0.08, as illustrated in FIG. 2B. The observed shift is attributed to lattice distortion resulting from the larger ionic radius of ruthenium, which induces internal crystal strain [See: M. S. Amulya, H. Nagaswarupa, M. A. Kumar, C. Ravikumar, S. Prashantha, and K. Kusuma, *"Sonochemical synthesis of $NiFe_2O_4$ nanoparticles: Characterization and their photocatalytic and electrochemical applications,"* Applied Surface Science Advances, vol. 1, p. 100023, 2020, incorporated herein by reference in its entirety].

In order to further analyze structural characteristics, parameters such as crystallite size, lattice constants, and unit cell volume were determined from the XRD data. The Debye-Scherrer equation was applied to calculate average crystallite size, as represented in equation 6 [See: D. Kumar, A. Singh, N. Kaur, A. Thakur, and R. Kaur, *"Tailoring structural and optical properties of ZrO 2 with nickel doping,"* SN Applied Sciences, vol. 2, pp. 1-8, 2020, incorporated herein by reference in its entirety]:

$$D = \frac{k\lambda}{\beta\cos\theta} \quad (6)$$

where $\lambda$ is the wavelength of Cu-k$\alpha$ (X-ray source) is 1.5406 Å, k is the shape factor, which is 0.9, $\beta$ represents full-width half maximum (FWHM) of peaks and $\theta$ is the Bragg's diffraction angle. The crystalline size decreased by increasing the Ru concentration, as shown in Table 1, due to the large FWHM value (broadening of peak). In turn, the crystallinity of the material decreases [See: U. K. Chime and coworkers, *"Recent progress in nickel oxide-based electrodes for high-performance supercapacitors,"* Current Opinion in Electrochemistry, vol. 21, pp. 175-181, 2020, incorporated herein by reference in its entirety]. To find the lattice parameters, interplanar spacing ($d_{hkl}$) was calculated using Bragg's law provided in equation 7:

$$2d_{hkl}\sin\theta = n\lambda \quad (7)$$

where n represents the order of reflection. In order to find the lattice parameters of the Hexagonal crystal structure, the relation provided in equation 8 was used:

$$\frac{1}{d_{hkl}} = \frac{4}{3}\left(\frac{h^2+hk+k^2}{a^2}\right) + \frac{l^2}{c^2} \quad (8)$$

where a and c are the lattice parameters and (hkl) are the Miller indices. The results show that the crystalline size decreases with an increase in Ruthenium (Ru) concentration, and the unit cell volume increases. The aforementioned observation is due to the higher atomic radii of Ru with respect to Manganese (Mn), resulting in peaks shifting to lower angles [See: A. Sinha and A. Dutta, "*Structural, optical, and electrical transport properties of some rare-earth-doped nickel ferrites: A study on effect of ionic radii of dopants,*" Journal of Physics and Chemistry of Solids, vol. 145, p. 109534, 2020, incorporated herein by reference in its entirety]. Moreover, the lattice parameters a and c increase with increasing Ru content. Such expansion is due to the larger atomic radii of Ru compared to Mn, which leads to an overall enlargement in the lattice parameters presented in Table 1. The induced strains (F) in the crystal lattice due to the incorporation of doping elements can be calculated from the Stokes-Wilson formula in equation 9 [See: S. K. Sen et al., "*Influence of total absorbed dose of Co-60 γ-radiation on the properties of h-MoO3 thin films,*" Thin Solid Films, vol. 693, p. 137700, 2020, incorporated herein by reference in its entirety]:

$$\varepsilon = \frac{\beta}{4\tan\theta} \quad (9)$$

The dislocation density (δ) is calculated by using the following equation 10:

$$\delta = \frac{1}{D^2} \quad (10)$$

TABLE 1

XRD parameters of $LaMn_xRu_yNi_{1-(x+y)}O_3$ (x = 0.00, y = 0.00), (x = 0.02, y = 0.08), (x = 0.05, y = 0.05), (x = 0.08, y = 0.02)

| $LaMn_xRu_yNi_{1-(x+y)}O_3$ | 2θ (degree) | Lattice Parameters | Crystallite Size (nm) | Volume (Å$^3$) | Lattice Strain (ε) | Dislocation density (δ) 1/nm$^2$ |
|---|---|---|---|---|---|---|
| (0, 0) | 32.8677 | (5.446, 13.219) | 12.57 | 339.48 | 0.558469 | 0.006326 |
| (0.08, 0.02) | 32.7252 | (5.469, 13.315) | 11.66 | 344.84 | 0.604879 | 0.007361 |
| (0.05, 0.05) | 32.6959 | (5.473, 13.332) | 11.05 | 345.89 | 0.638766 | 0.008194 |
| (0.02, 0.08) | 32.6424 | (5.482, 13.348) | 10.31 | 347.41 | 0.685203 | 0.009399 |

Scanning electron microscopy (SEM) was performed to examine the surface morphology, particle structure, and dimensional characteristics of synthesized $LaMn_xRu_yNi_{1-(x+y)}O_3$ electrode materials. SEM micrographs at low and high scale bar are shown in FIGS. 3A-3H, representing various compositions with differing Mn and Ru doping ratios. All examined compositions exhibited nanostructured morphologies with interconnected porous networks. Variations in pore and particle diameter were observed across the doping series. Minor agglomeration was detected in some samples, attributed to the relatively higher surface energy of manganese compared to ruthenium [See: T.-W. Chen and coworkers, "*Developing low-cost, high performance, robust and sustainable perovskite electrocatalytic materials in the electrochemical sensors and energy sectors: "An overview",*" Catalysts, vol. 10, no. 8, p. 938, 2020, incorporated herein by reference in its entirety]. The sample with a Mn to Ru ratio of x=0.02 and y=0.08 displayed minimal agglomeration and a highly porous surface structure. This composition is expected to offer enhanced electrochemical accessibility due to the larger effective surface area, which facilitates ion transport and electrolyte diffusion at active electrode interfaces.

Energy-dispersive X-ray spectroscopy (EDX) and elemental mapping were conducted at a scale bar scale of 25 m to assess elemental distribution and chemical composition. The results confirmed the presence of lanthanum (La), manganese (Mn), ruthenium (Ru), nickel (Ni), and oxygen (O) in all $LaMn_xRu_yNi_{1-(x+y)}O_3$ compositions. Elemental mapping indicated uniform spatial distribution of all constituent elements, with no detectable foreign impurities or compositional anomalies.

Figure 4A:
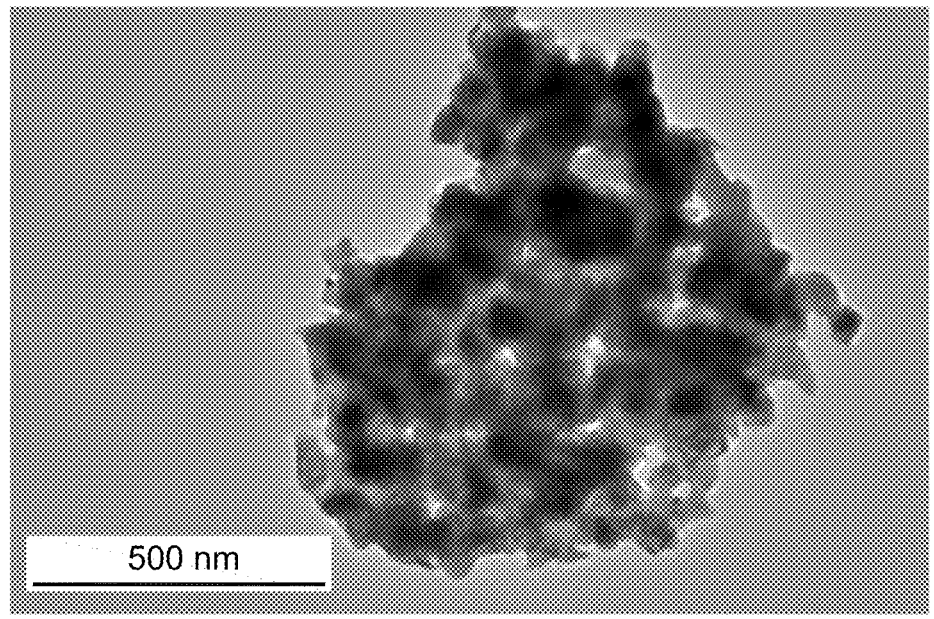
FIG. 4A illustrates a transmission electron microscopy (TEM) image of the perovskite $LaMn_{0.02}Ru_{0.08}Ni_{0.90}O_3$ at a scale bar of 500 nm, according to certain embodiments.
Figure 4B:
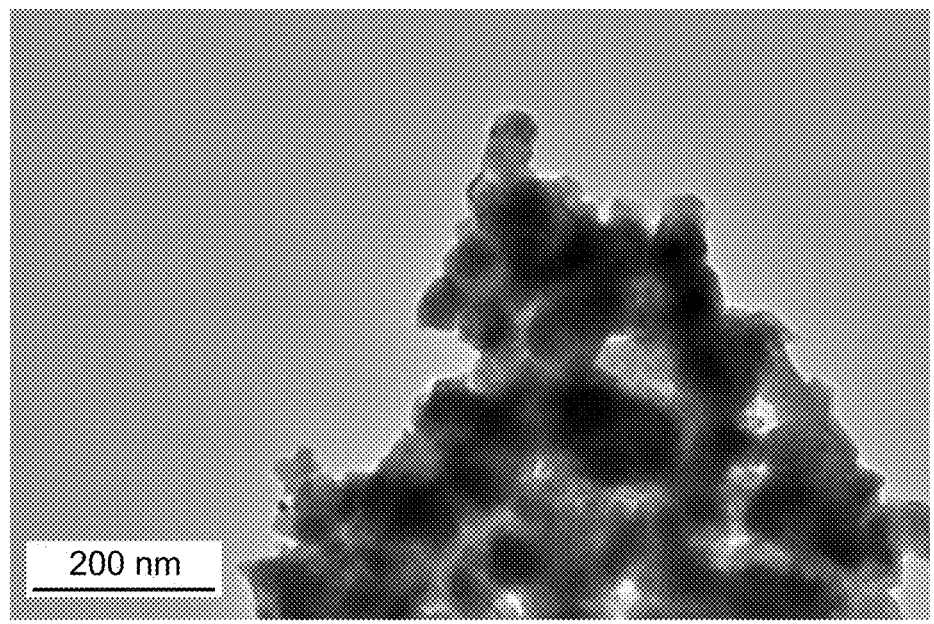
FIG. 4B illustrates a TEM image of the perovskite $LaMn_{0.02}Ru_{0.08}Ni_{0.90}O_3$ at a scale bar of 200 nm, according to certain embodiments.
Figure 4C:
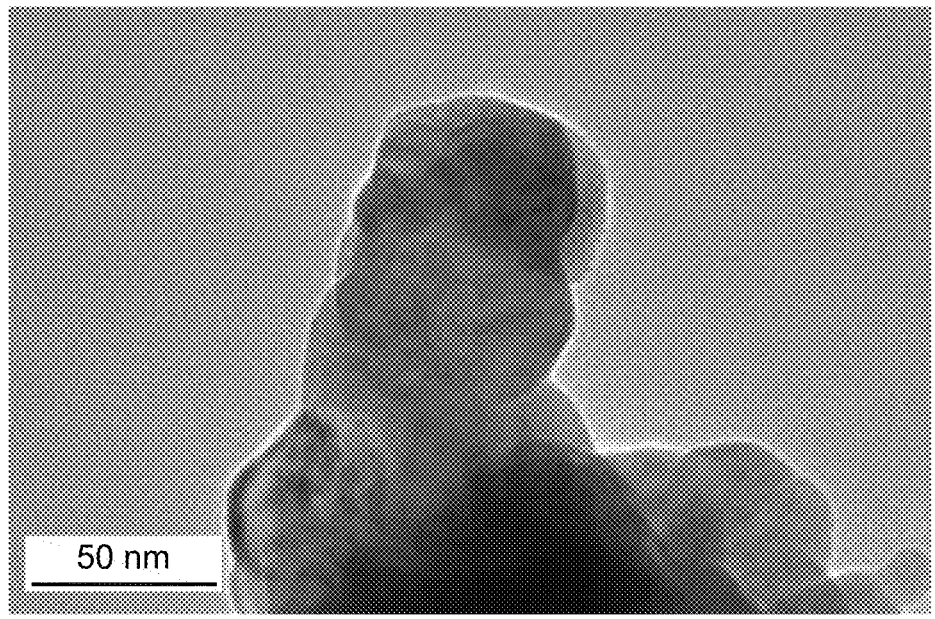
FIG. 4C illustrates a TEM image of the perovskite $LaMn_{0.02}Ru_{0.08}Ni_{0.90}O_3$ at a scale bar of 50 nm, according to certain embodiments.

Transmission electron microscopy (TEM) was conducted to examine the nanostructural features of the synthesized $LaMn_{0.02}Ru_{0.08}Ni_{0.90}O_3$ material. FIG. 4A presents a low-scale bar TEM image that reveals relatively uniform particle distribution with a consistent spherical morphology, which is favourable for achieving stable electrochemical performance in supercapacitor applications. Further, higher scale bar images of selected areas are shown in FIGS. 4B and 4C, confirming the spherical shape of the $LaMn_{0.02}Ru_{0.08}Ni_{0.90}O_3$ nanoparticles.

Figure 4D:
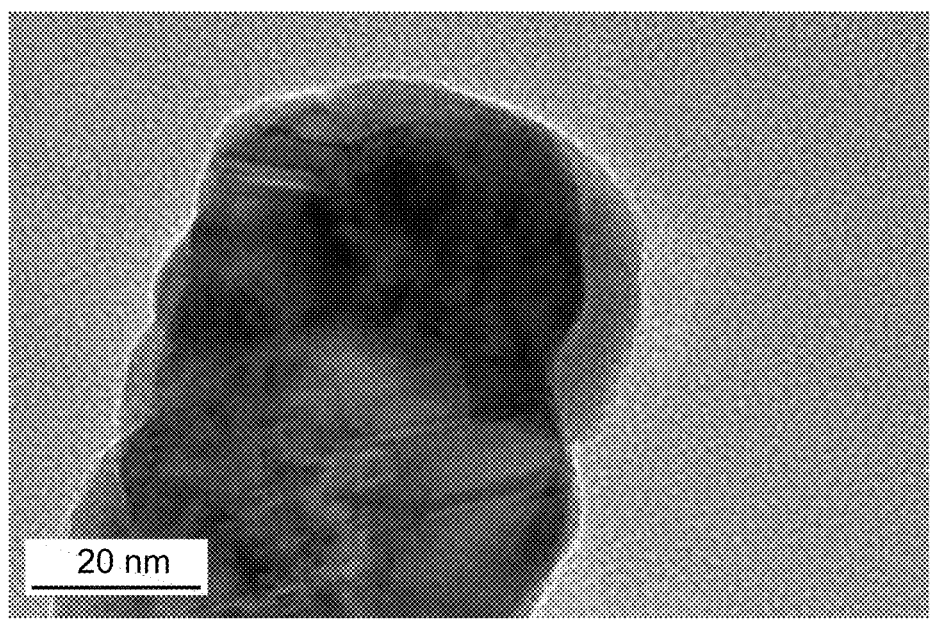
FIG. 4D illustrates a high-resolution transmission electron microscopy (HRTEM) image of the perovskite $LaMn_{0.02}Ru_{0.08}Ni_{0.90}O_3$ at a scale bar of 20 nm, according to certain embodiments.
Figure 4E:
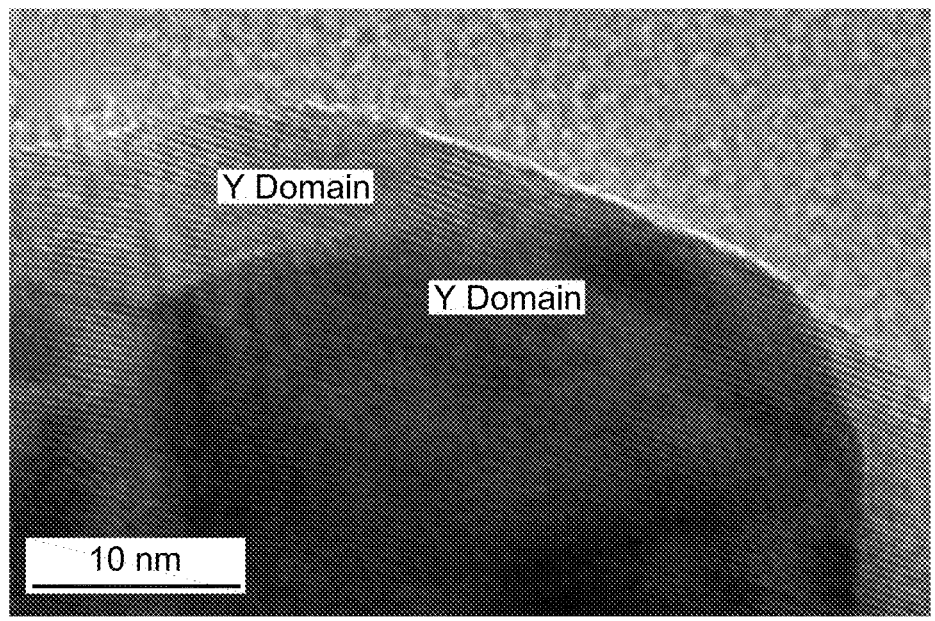
FIG. 4E illustrates an additional HRTEM image of the perovskite $LaMn_{0.02}Ru_{0.08}Ni_{0.90}O_3$ at a scale bar of 10 nm, according to certain embodiments.

High-resolution transmission electron microscopy (HR-TEM) images in FIGS. 4D and 4E illustrate well-resolved lattice fringes and crystalline domains, validating the phase purity and structural order of the synthesized material.

Figure 4F:
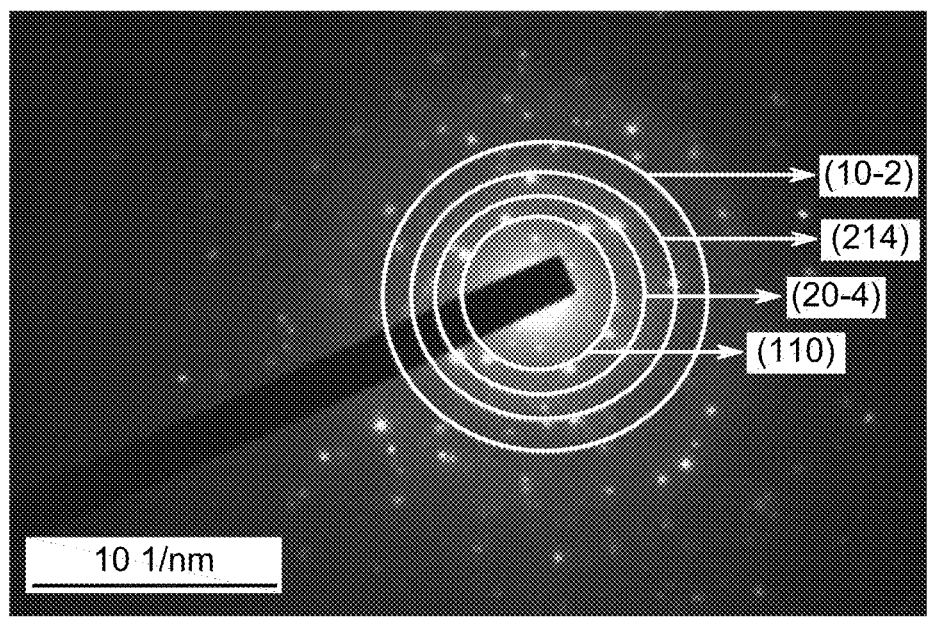
FIG. 4F illustrates a selected area electron diffraction (SAED) pattern of the perovskite $LaMn_{0.02}Ru_{0.08}Ni_{0.90}O_3$, according to certain embodiments.

The selected area electron diffraction (SAED) pattern shown in FIG. 4F further supports the crystalline nature of $LaMn_{0.02}Ru_{0.08}Ni_{0.90}O_3$. The sharp and continuous diffraction rings correspond to the (1 1 0), (2 0-4), (2 1 4), and (1 0-2) planes, which are characteristic of perovskite-type oxides. The observed diffraction pattern confirms the polycrystalline nature of the material and supports its structural integrity for use in energy storage systems.

Figure 5:
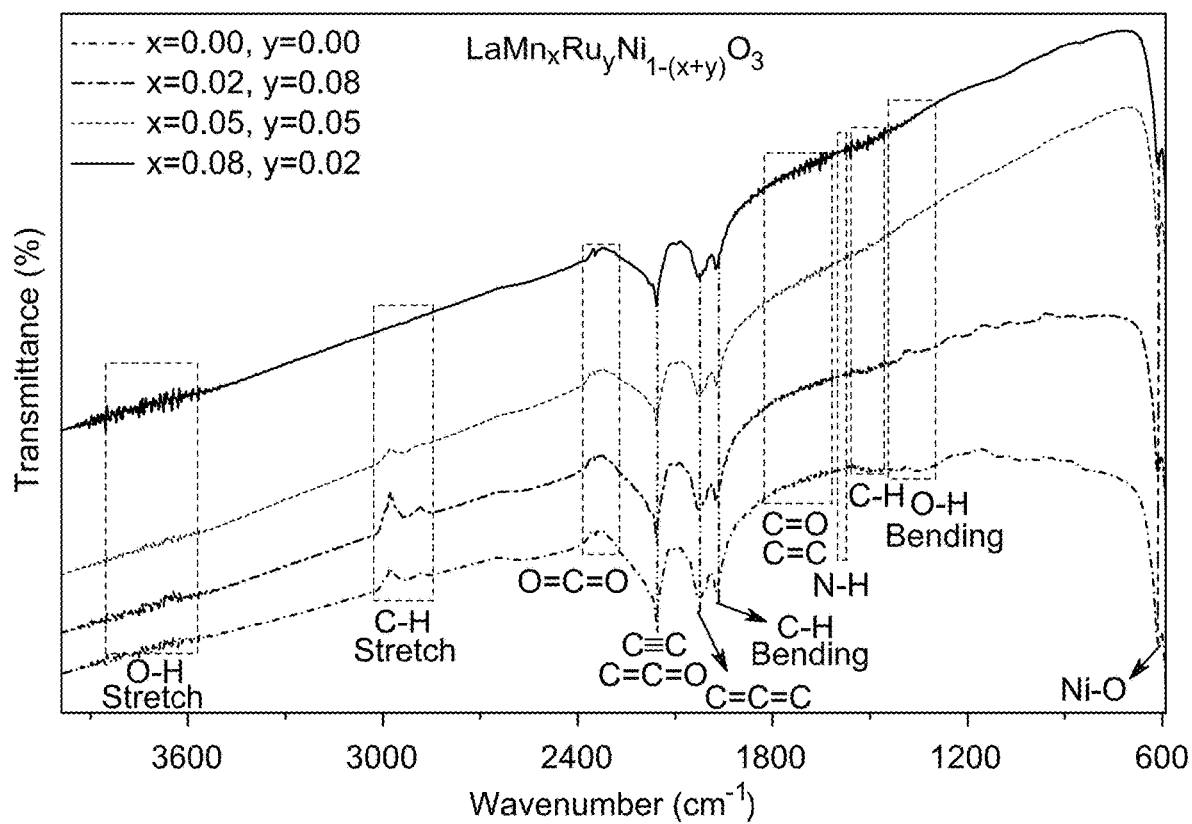
FIG. 5 illustrates Fourier-transform infrared (FTIR) spectrum of the perovskite $LaMn_xRu_yNi_{1-(x+y)}O_3$ compositions with (x, y)=(0.00, 0.00), (0.02, 0.08), (0.05, 0.05), and (0.08, 0.02), according to certain embodiments.

Fourier transform infrared (FTIR) spectroscopy was used to investigate the phase composition and bonding characteristics of both pure $LaNiO_3$ and Mn—Ru co-doped $LaNiO_3$ samples. The spectra were recorded in the 600 cm$^{-1}$ 4000 cm$^{-1}$ range, as shown in FIG. 5. A prominent absorption band centered around 600 cm$^{-1}$ was observed in all samples, corresponding to Ni—O—Ni stretching vibrations within the $NiO_6$ octahedral framework of the perovskite $ABO_3$ lattice [See: K. Rida, M. A. Pena, E. Sastre, and A. Martinez-Arias, "*Effect of calcination temperature on structural properties and catalytic activity in oxidation reactions of $LaNiO_3$ perovskite prepared by Pechini method,*" Journal of Rare Earths, vol. 30, no. 3, pp. 210-216, 2012/03/01/2012 and M. Khettab, S. Omeiri, D. Sellam, M. A. Ladjouzi, and M. Trari, "*Characterization of LaNiO$_3$ prepared by sol-gel: Application to hydrogen evolution under visible light,*" *Materials Chemistry and Physics*, vol. 132, no. 2, pp. 625-630, 2012/02/15/2012, incorporated herein by reference in its entirety]. The high symmetry and absence of impurity bands across all spectra were consistent with the X-ray diffraction (XRD) results.

An absorption band at approximately 2350 cm$^{-1}$ was assigned to the symmetric stretching mode of C=O bonds, likely originating from atmospheric carbon dioxide adsorption [See: A. Iskra, A. S. Gentleman, A. Kartouzian, M. J. Kent, A. P. Sharp, and S. R. Mackenzie, "*Infrared Spectroscopy of Gas-Phase M+(CO$_2$)n (M=Co, Rh, Ir) Ion-Molecule Complexes,*" *The Journal of Physical Chemistry A*, vol. 121, no. 1, pp. 133-140, 2017/01/12 2017, incorporated herein by reference in its entirety]. Additional peaks appearing in the 2000 cm$^{-1}$ to 2100 cm$^{-1}$ and near 3000 cm$^{-1}$ regions are not typically associated with LaNiO$_3$ systems. The mentioned features may indicate minor contamination from C≡C(alkyne groups) and O—H (hydroxyl groups), respectively [See: S. Mischler, S. Guerra, and R. Deschenaux, "*Design of liquid-crystalline gold nanoparticles by click chemistry,*" *Chemical Communications*, 10.1039/C2CC17375A vol. 48, no. 16, pp. 2183¬2185, 2012, incorporated herein by reference in its entirety].

Figure 6A:
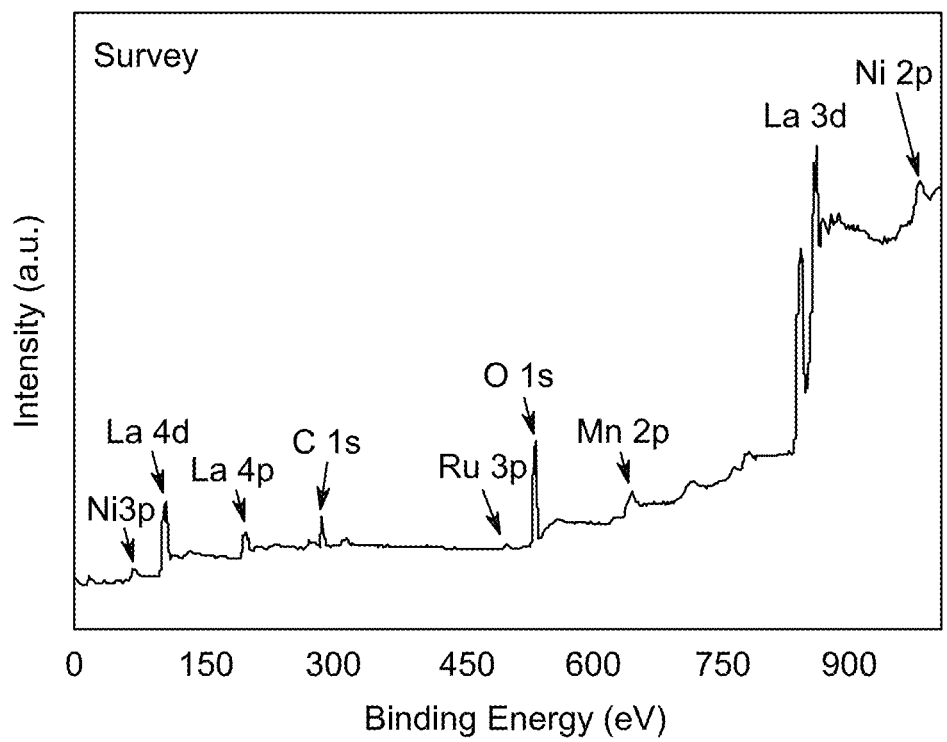
FIG. 6A illustrates an X-ray photoelectron spectroscopy (XPS) survey spectra of the perovskite $LaMn_{0.02}Ru_{0.08}Ni_{0.90}O_3$, according to certain embodiments.
Figure 6B:
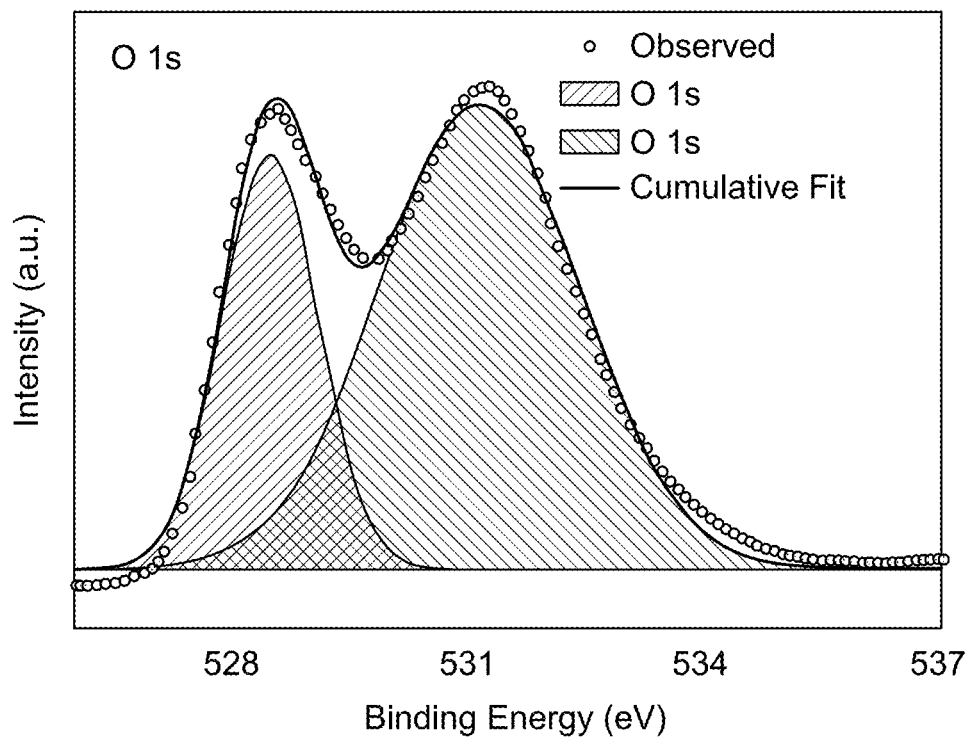
FIG. 6B illustrates the high-resolution XPS spectrum of the O 1s core level in the perovskite $LaMn_{0.02}Ru_{0.08}Ni_{0.90}O_3$, according to certain embodiments.
Figure 6C:
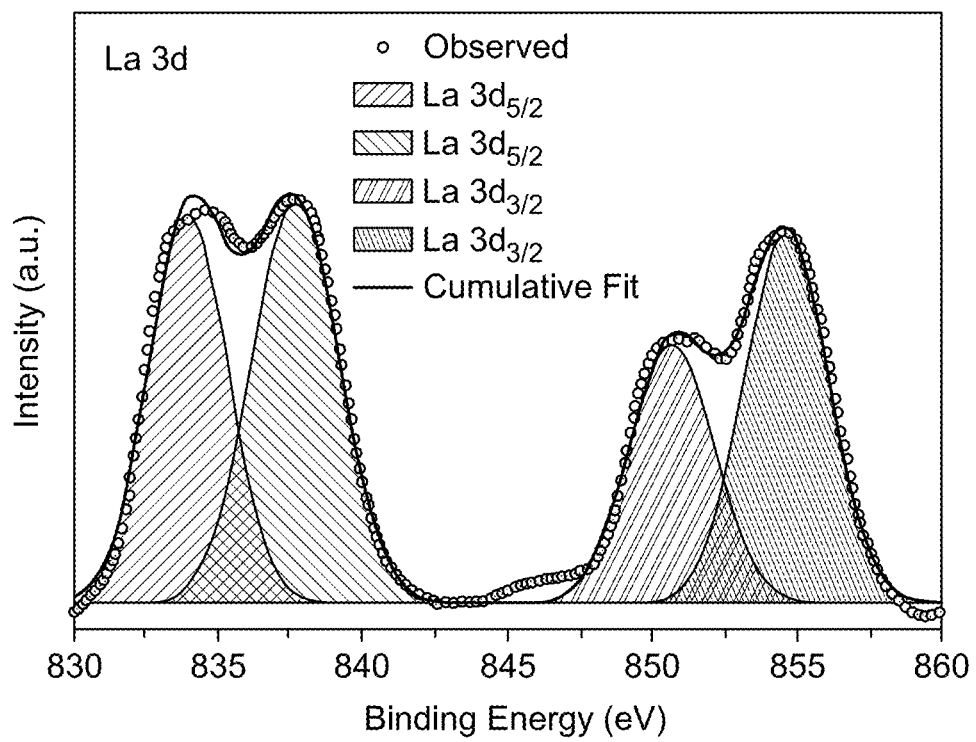
FIG. 6C illustrates the high-resolution XPS spectrum of La 3d in the perovskite $LaMn_{0.02}Ru_{0.08}Ni_{0.90}O_3$, according to certain embodiments.

X-ray photoelectron spectroscopy (XPS) was conducted on the LaMn$_x$Ru$_y$Ni$_{1-(x+y)}$O$_3$ composition with x=0.02 and y=0.08, identified as the sample exhibiting desirable electrochemical performance. The objective of XPS analysis was to determine elemental composition and the oxidation states of constituent elements. A full-scan XPS survey spectrum, shown in FIG. 6A, revealed the presence of all constituent elements including lanthanum (La), nickel (Ni), manganese (Mn), ruthenium (Ru), and oxygen (O). Binding energy calibration was performed with respect to the C is reference peak positioned at 284.5 eV. High-resolution core-level spectra for O 1s, La 3d, Mn 2p, Ni 2p, Ni 3p, Ru 3p, and Ru 3d are presented in FIGS. 6B-6I, respectively. Further, the O is spectrum, as shown in FIG. 6B, exhibited two deconvoluted peaks centered at binding energies of 528.5 eV and 531.5 eV, corresponding to lattice oxygen and surface oxygen or oxygen vacancy states, respectively. The La 3d spectrum, as shown in FIG. 6C displayed doublets at 854.6 eV and 851.3 eV (La 3d$_{3/2}$), and at 837.8 eV and 833.7 eV (La 3d$_{5/2}$), consistent with a +3 oxidation state for La [See: Y. Qiu and coworkers, "*Understanding the Enhancement Mechanism of A-Site-Deficient LaxNiO3 as an Oxygen Redox Catalyst,*" *Chemistry of Materials*, vol. 32, no. 5, pp. 1864-1875, 2020/03/10 2020, incorporated herein by reference in its entirety].

Figure 6D:
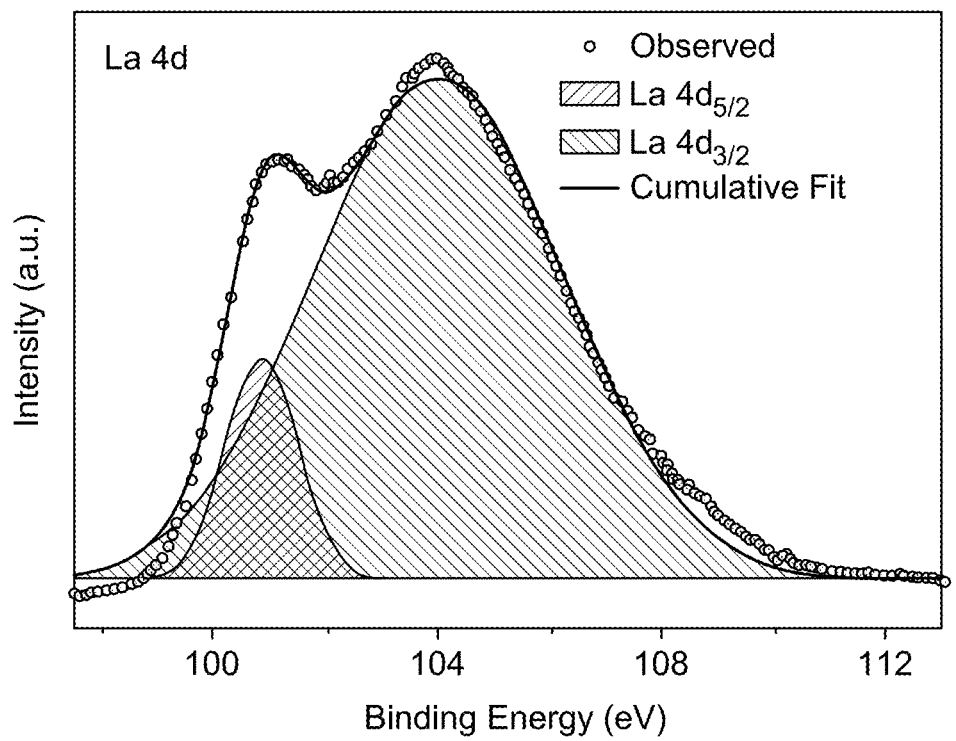
FIG. 6D illustrates the high-resolution XPS spectrum of La 4d in the perovskite $LaMn_{0.02}Ru_{0.08}Ni_{0.90}O_3$, according to certain embodiments.
Figure 6E:
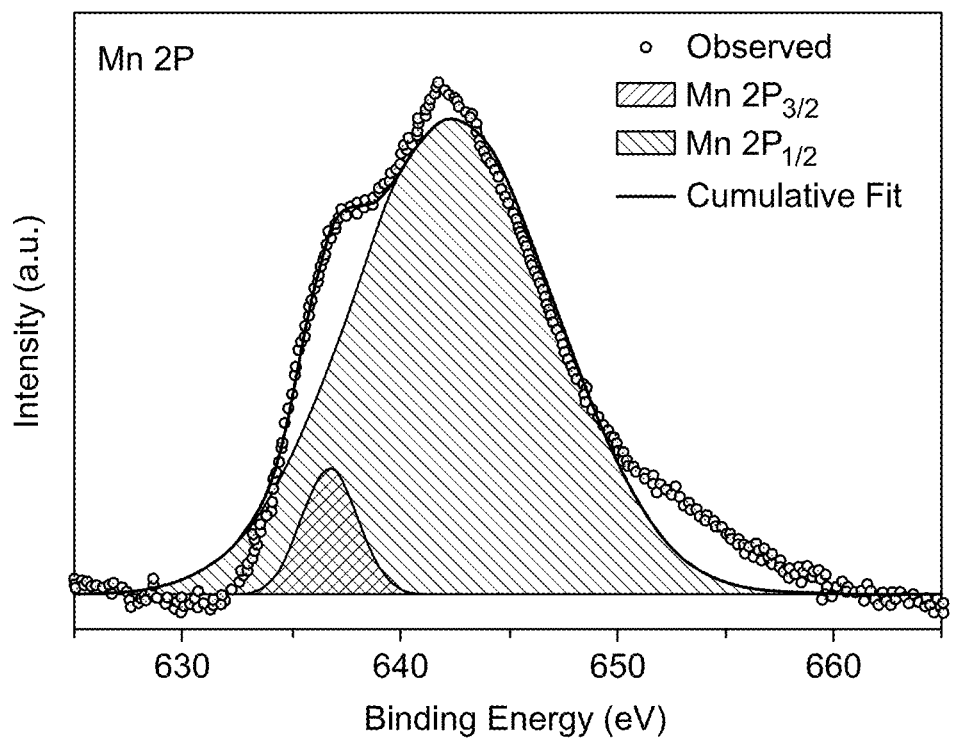
FIG. 6E illustrates the high-resolution XPS spectrum of Mn 2p in the perovskite $LaMn_{0.02}Ru_{0.08}Ni_{0.90}O_3$, according to certain embodiments.
Figure 6F:
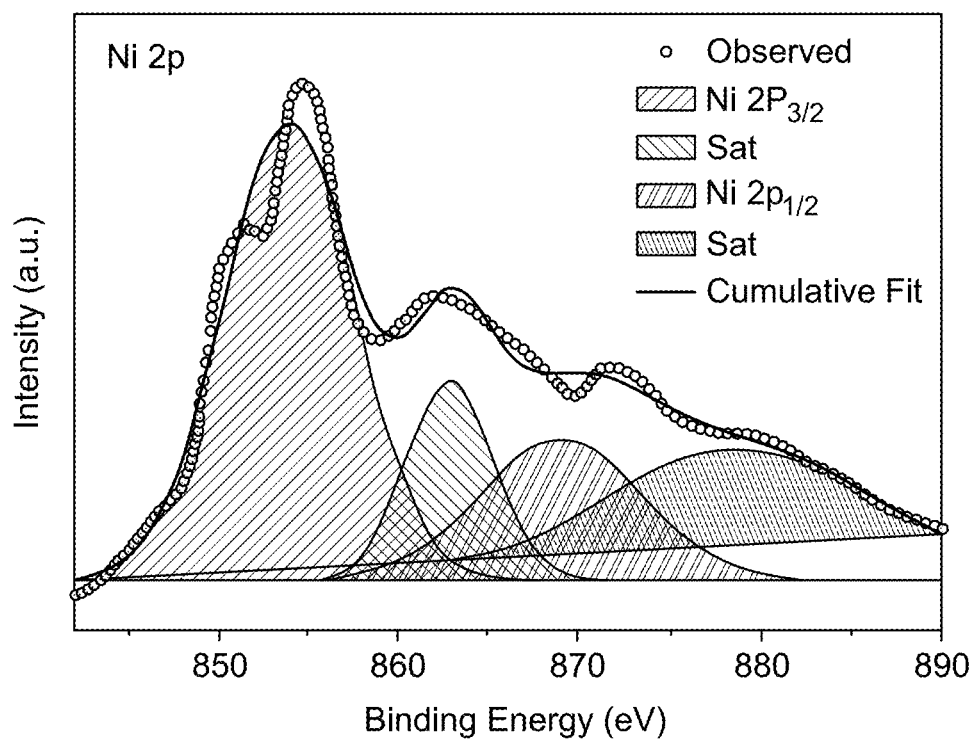
FIG. 6F illustrates the high-resolution XPS spectrum of Ni 2p in the perovskite $LaMn_{0.02}Ru_{0.08}Ni_{0.90}O_3$, according to certain embodiments.
Figure 6G:
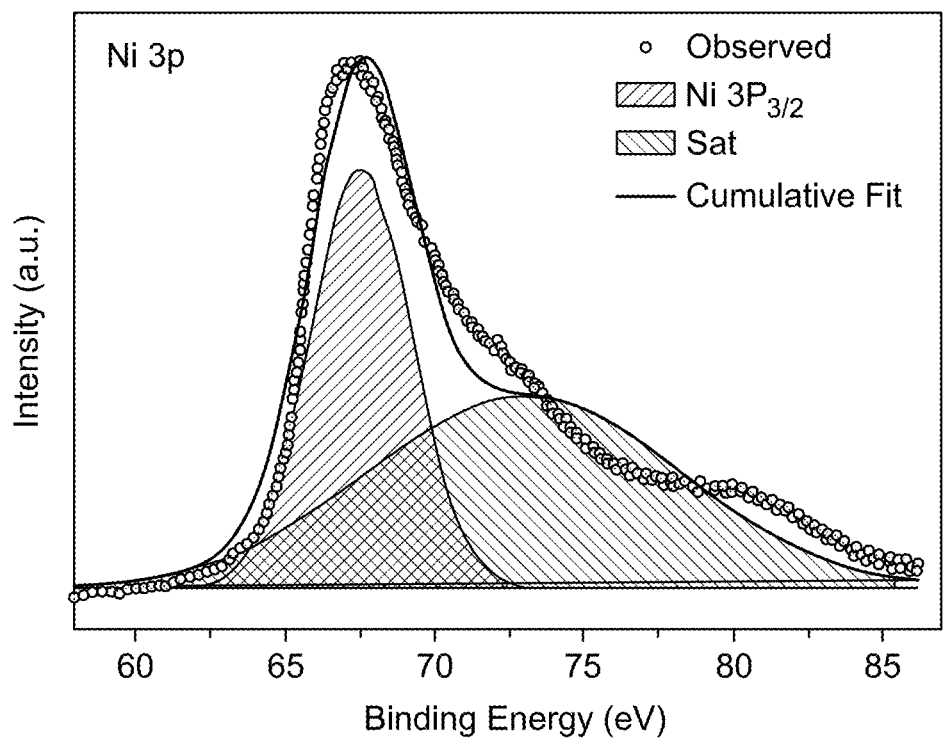
FIG. 6G illustrates the high-resolution XPS spectrum of Ni 3p in the perovskite $LaMn_{0.02}Ru_{0.08}Ni_{0.90}O_3$, according to certain embodiments.

The Ni 2p core-level spectrum, as shown in FIG. 6D, showed peaks at 869 eV (Ni$^2$p$_{1/2}$) and 853.5 eV (Ni$^2$p$_{3/2}$), along with satellite peaks at 878.5 eV and 862.5 eV, respectively, indicating the presence of Ni in a +3 oxidation state. The Mn 2p spectrum, as shown in FIG. 6E, showed 2p$_{1/2}$ and 2p$_{3/2}$ peaks at 636.5 eV and 641.5 eV, respectively, which are consistent with Mn in the +3 valence state for B-site substitution [See: J. Zheng and coworkers, "*Enhanced Electrochemical Performance of LaMnO$_3$ Nanoparticles by Ca/Sr Doping,*" vol. 14, no. 1, p. 20, 2024, incorporated herein by reference in its entirety].

Figure 6H:
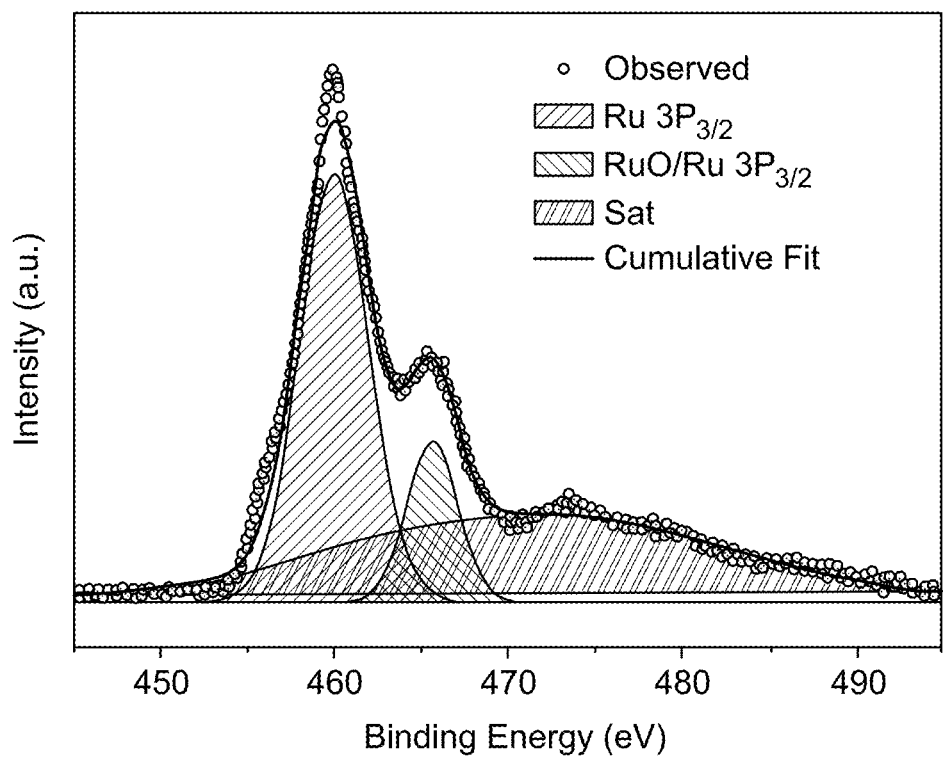
FIG. 6H illustrates the high-resolution XPS spectrum of Ru 3p in the perovskite $LaMn_{0.02}Ru_{0.08}Ni_{0.90}O_3$, according to certain embodiments.
Figure 6I:
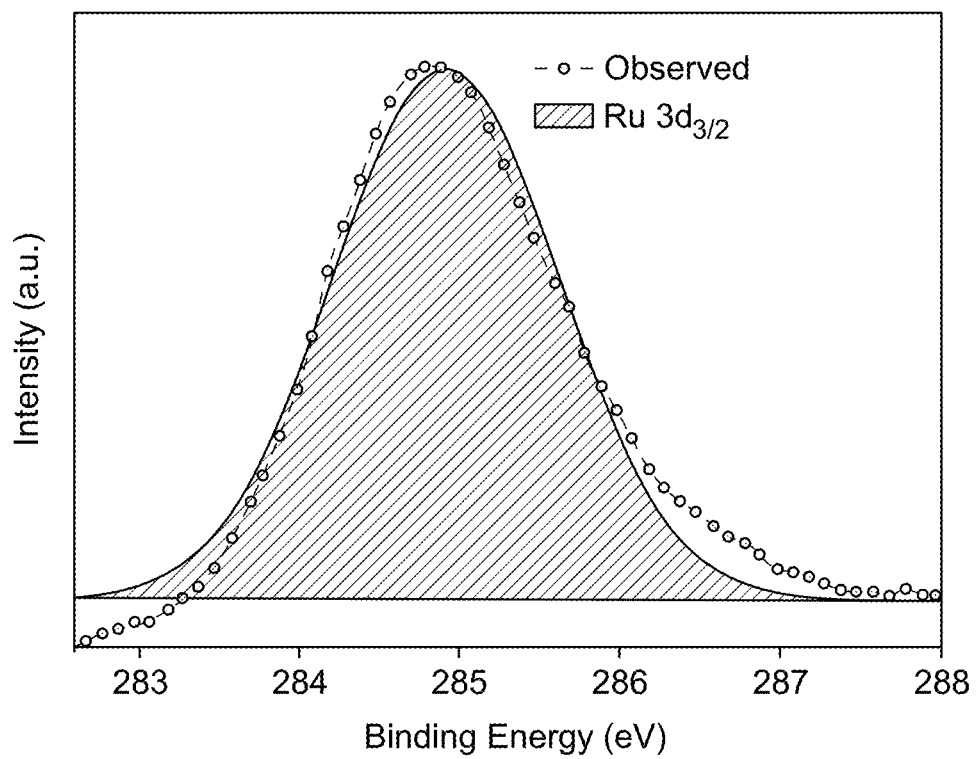
FIG. 6I illustrates the high-resolution XPS spectrum of Ru 3d in the perovskite $LaMn_{0.02}Ru_{0.08}Ni_{0.90}O_3$, according to certain embodiments.
Figure 7A:
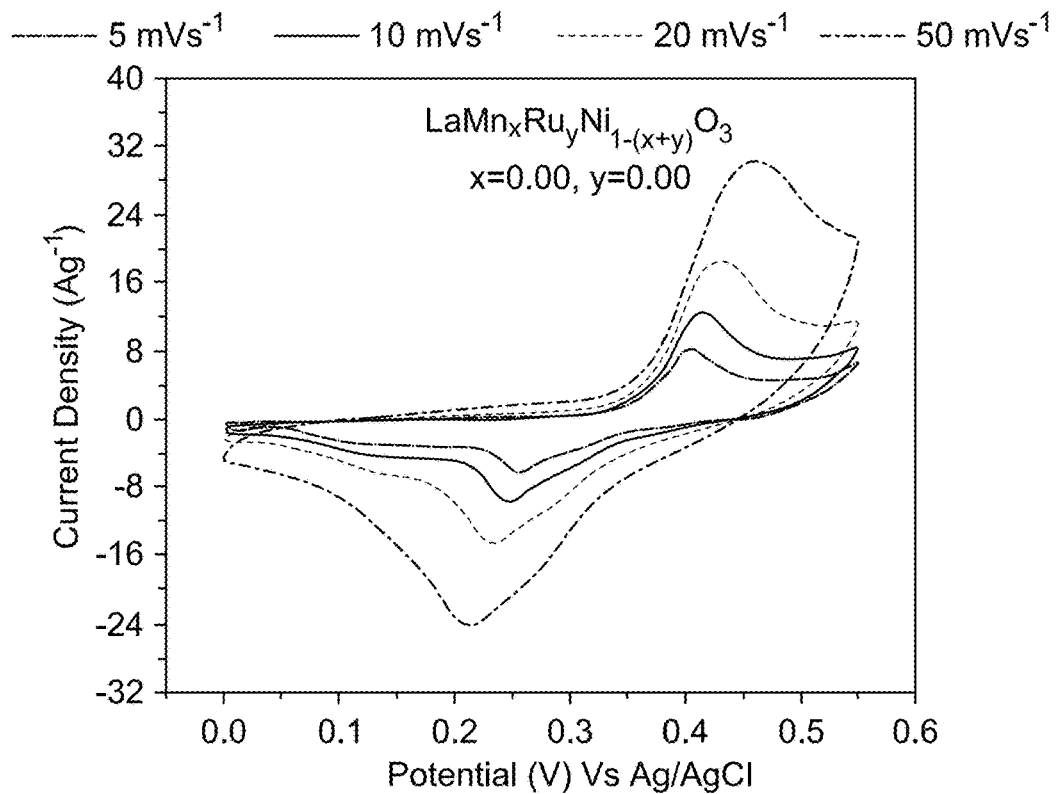
FIG. 7A illustrates cyclic voltammetry (CV) curves of a perovskite $LaMn_xRu_yNi_{1-(x+y)}O_3$ electrode with (x, y)=(0.00, 0.00) recorded at various scan rates, according to certain embodiments.
Figure 7B:
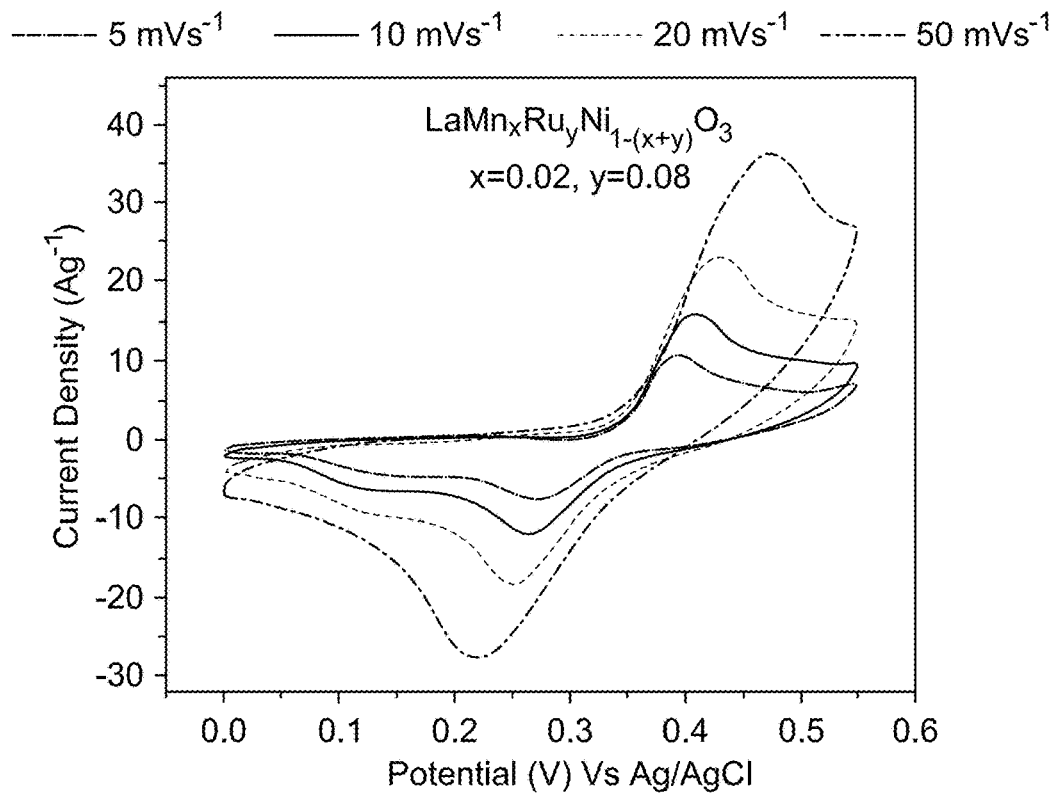
FIG. 7B illustrates CV curves of the perovskite $LaMn_xRu_yNi_{1-(x+y)}O_3$ electrode with (x, y)=(0.02, 0.08), according to certain embodiments.
Figure 7C:
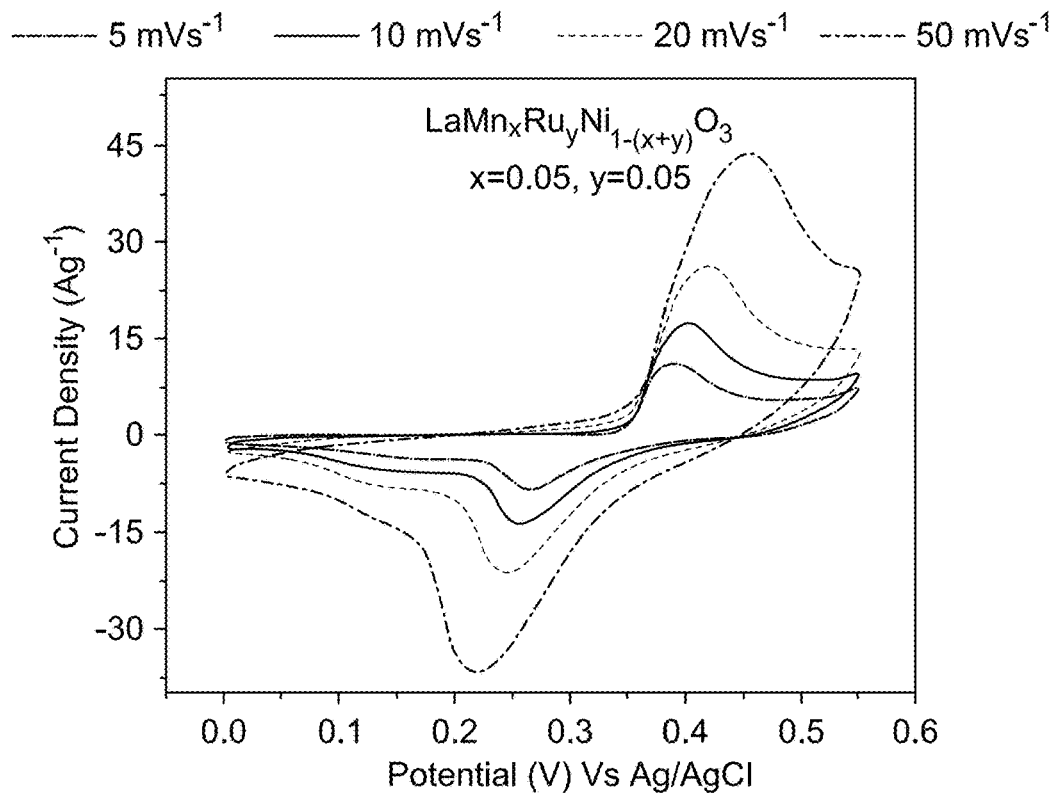
FIG. 7C illustrates CV curves of the perovskite $LaMn_xRu_yNi_{1-(x+y)}O_3$ electrode with (x, y)=(0.05, 0.05), according to certain embodiments.
Figure 7D:
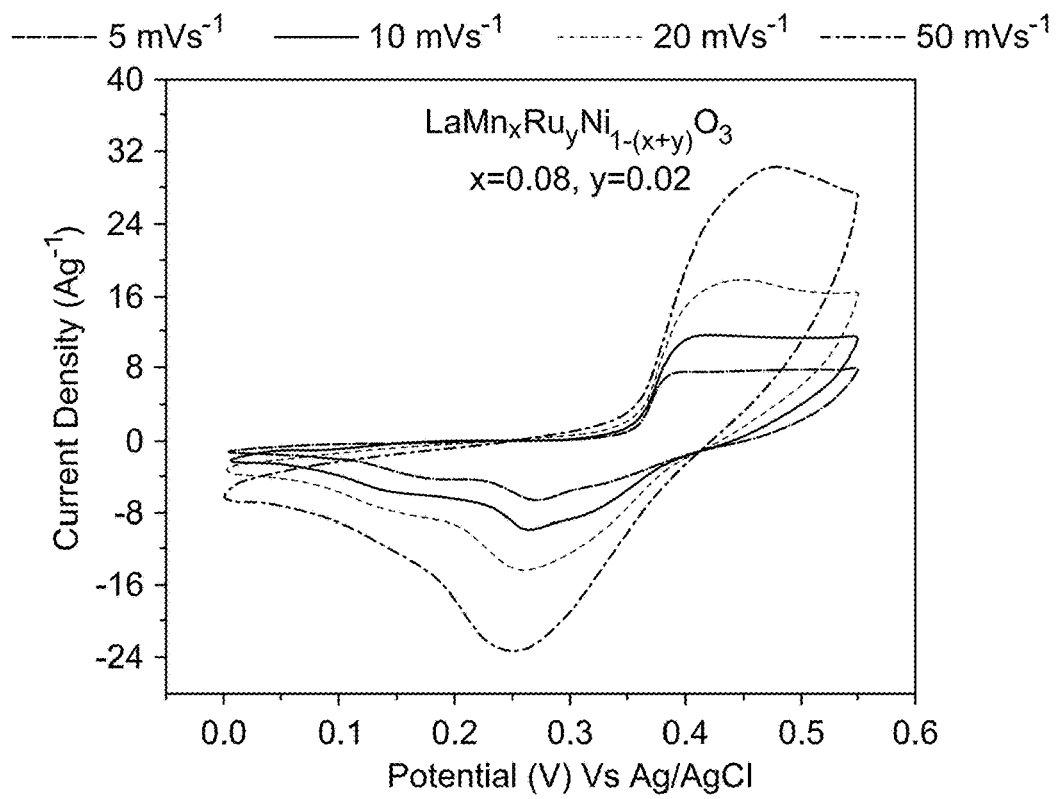
FIG. 7D illustrates CV curves of the perovskite $LaMn_xRu_yNi_{1-(x+y)}O_3$ electrode with (x, y)=(0.08, 0.02), according to certain embodiments.
Figure 8A:
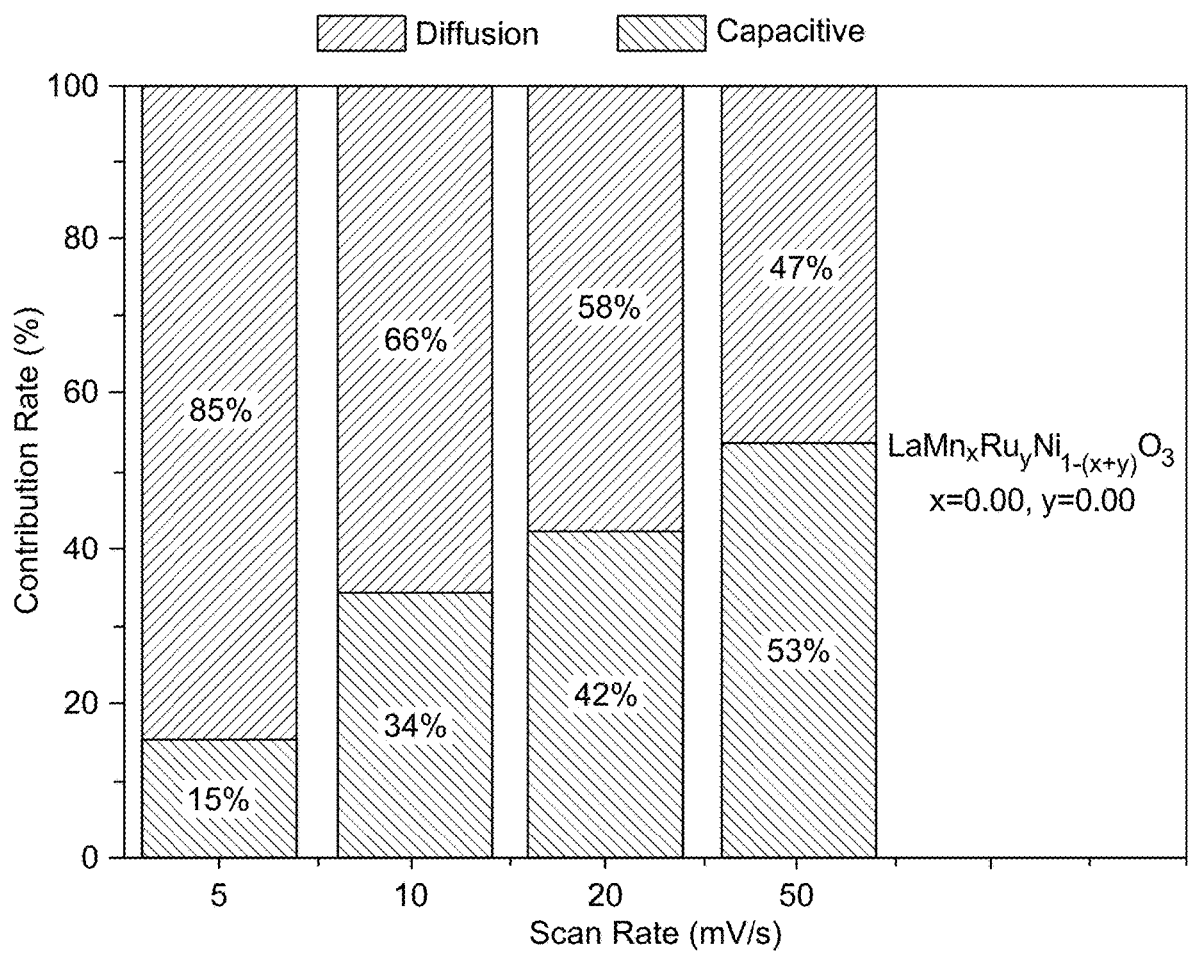
FIG. 8A illustrates capacitive and diffusion-controlled contributions for the perovskite $LaMn_xRu_yNi_{1-(x+y)}O_3$ electrode with (x, y)=(0, 0), as computed using Dunn's model, according to certain embodiments.
Figure 8B:
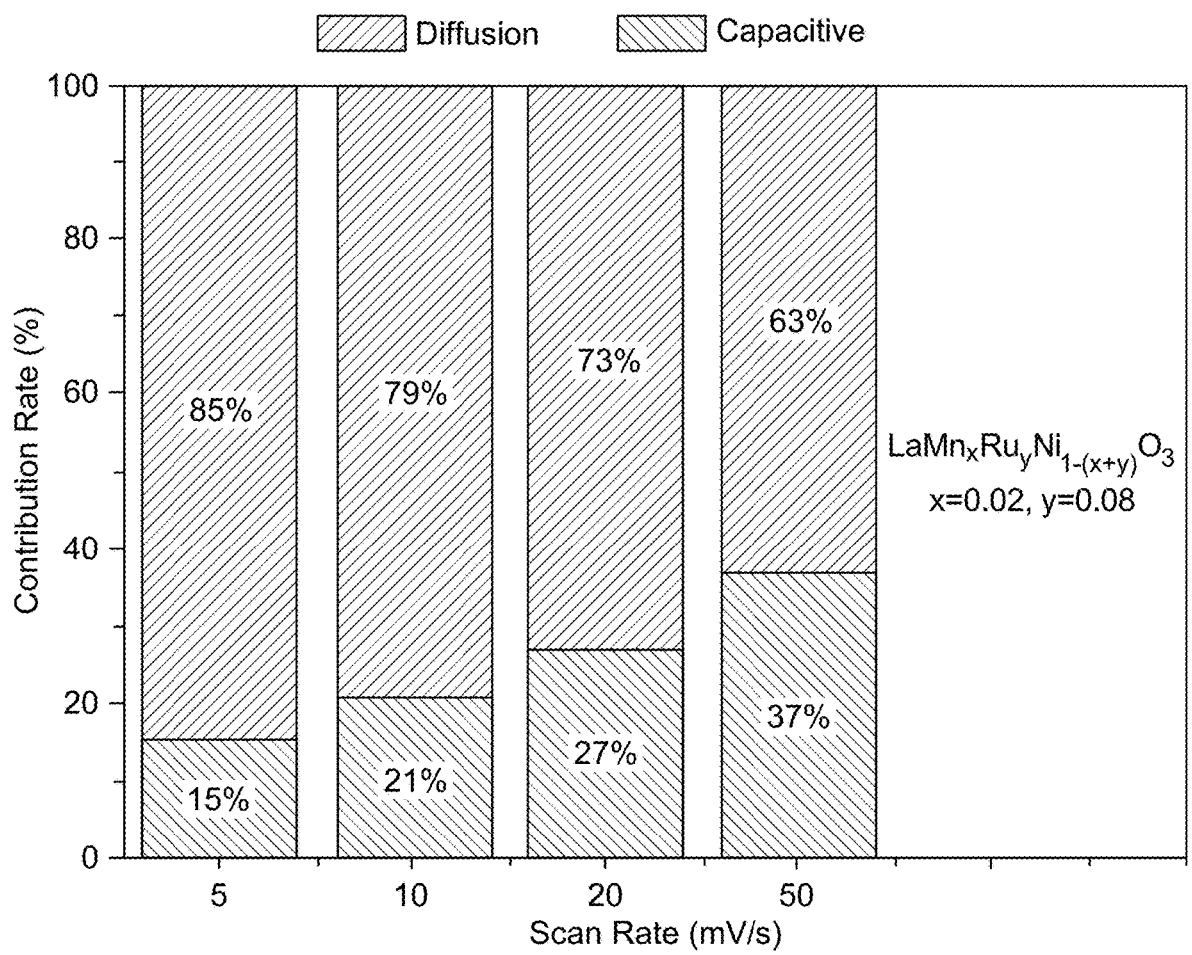
FIG. 8B illustrates capacitive and diffusion-controlled contributions for the perovskite $LaMn_xRu_yNi_{1-(x+y)}O_3$ electrode with (x, y)=(0.02, 0.08), according to certain embodiments.
Figure 8C:
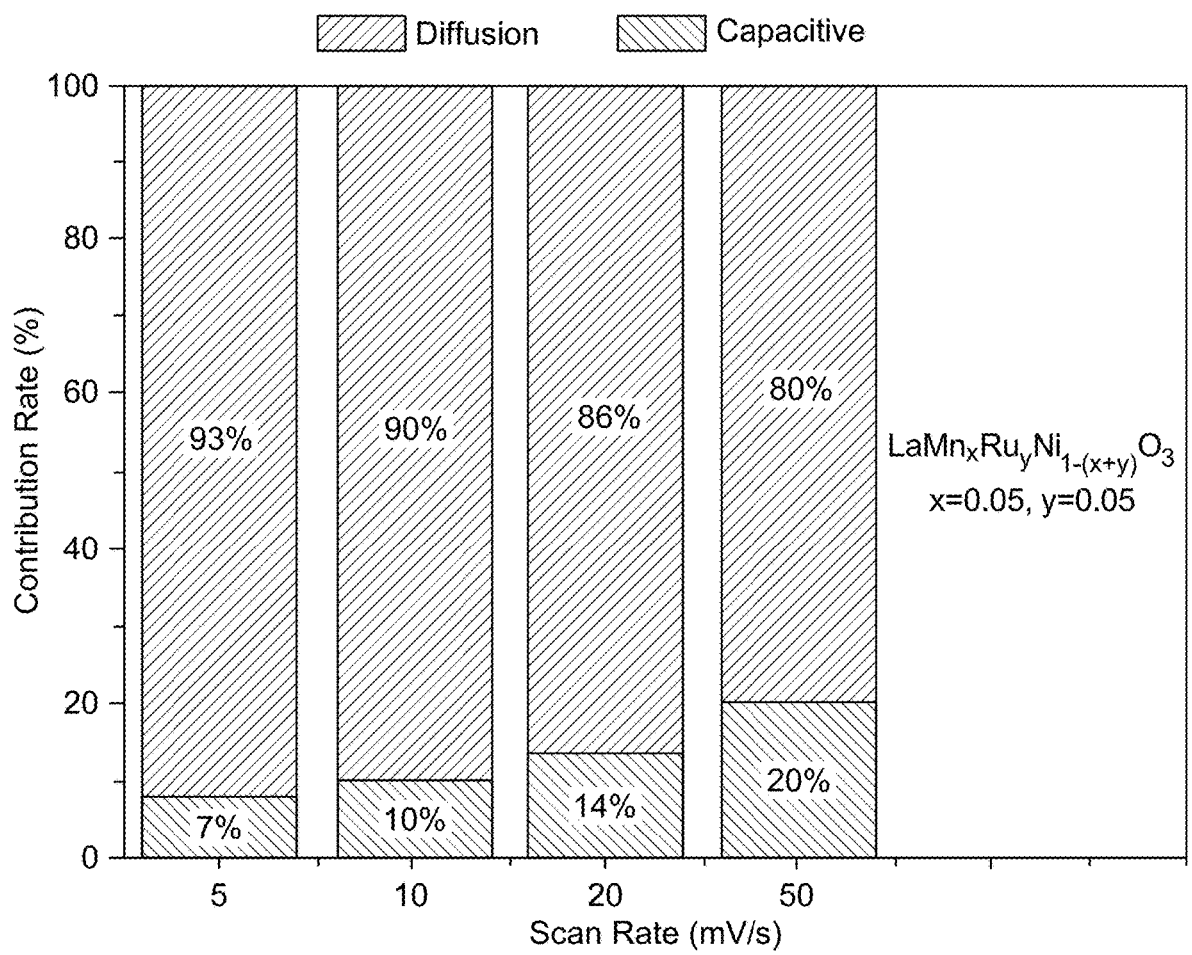
FIG. 8C illustrates capacitive and diffusion-controlled contributions for the perovskite $LaMn_xRu_yNi_{1-(x+y)}O_3$ electrode with (x, y)=(0.05, 0.05), according to certain embodiments.
Figure 8D:
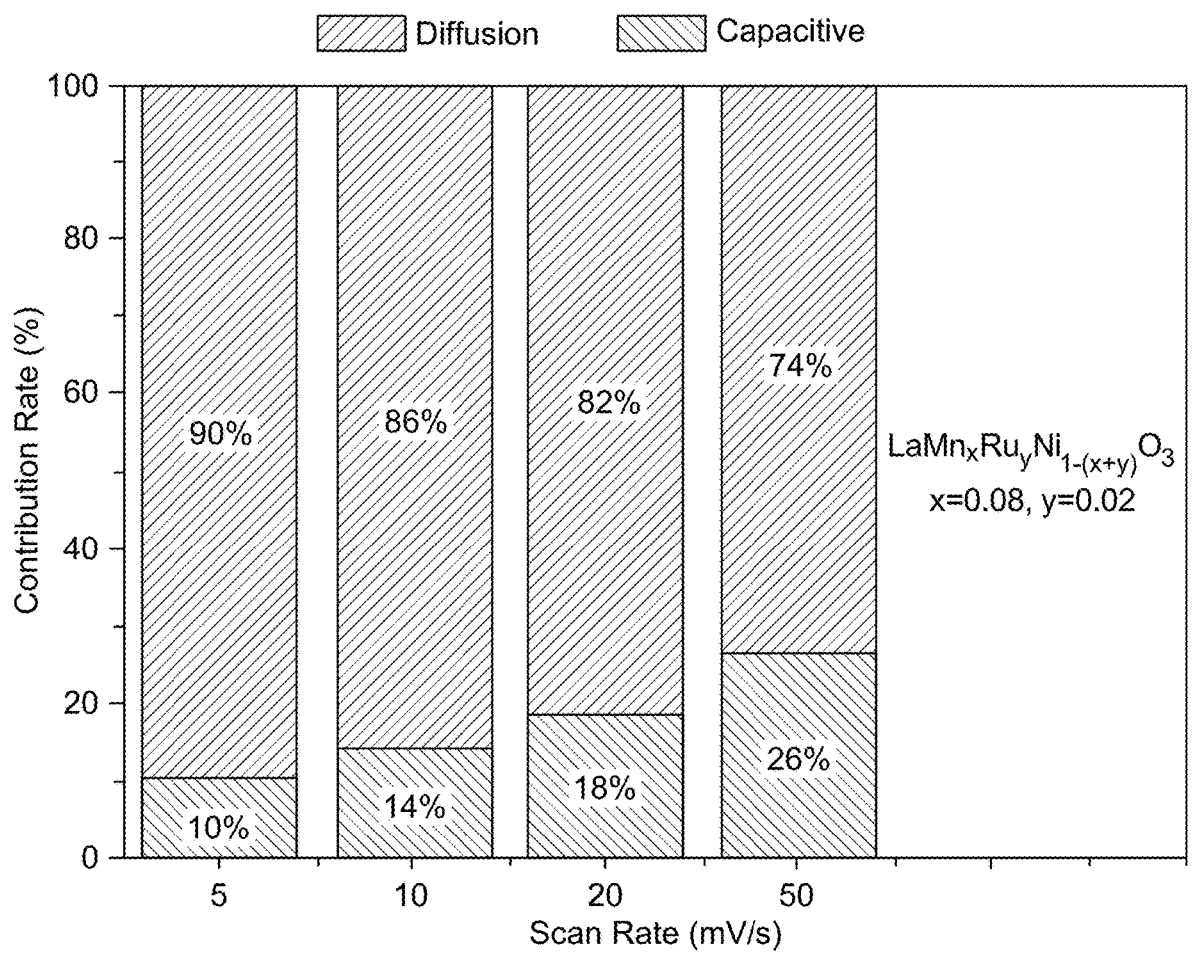
FIG. 8D illustrates capacitive and diffusion-controlled contributions for the perovskite $LaMn_xRu_yNi_{1-(x+y)}O_3$ electrode with (x, y)=(0.08, 0.02), according to certain embodiments.

The Ru 3p core-level spectrum, as shown in FIG. 6H, displayed a single prominent peak at 460.6 eV (3p$_{3/2}$), indicating the presence of Ru$^{3+}$ ions, analogous to those in LaRuO$_3$ systems [See: M. Abreu-Sepulveda and coworkers, "*Investigation of Oxygen Evolution Reaction at LaRuO3, La3.5Ru4O13, and La2RuO5,*" *Electrochimica Acta*, vol. 180, pp. 401-408, 2015/10/20/2015, incorporated herein by reference in its entirety]. The Ru 3d spectrum, as shown in FIG. 6I, showed a peak near 285 eV (3d$_{3/2}$), further confirming the oxidation state assignment. Lower binding energy components of O is spectra are associated with oxygen atoms bound to Ni ions, while higher energy features may be attributed to oxygen vacancies, introduced to maintain charge balance upon B-site substitution.

The electrochemical performance of LaMn$_x$Ru$_y$Ni$_{1-(x+y)}$O$_3$ compositions was evaluated using a three-electrode system. The working electrodes were fabricated by coating the synthesized compositions onto nickel foam substrates. All measurements were conducted in an aqueous 1 M KOH electrolyte. Cyclic voltammetry (CV) analysis was used to investigate the charge storage behaviour and electrochemical response of the prepared materials. CV curves were recorded in a potential window of 0 to 0.55 V at scan rates of 5 mV/s, 10 mV/s, 20 mV/s, and 50 mV/s, as illustrated in FIGS. 7A-7D. The observed semi-rectangular CV profiles with distinguishable redox peaks confirmed the pseudocapacitive nature of all tested electrodes. The redox peaks were attributed to Faradaic reactions arising from oxidation-state transitions of the B-site cations within the perovskite structure. The aforementioned transitions provided charge transfer processes at the electrode-electrolyte interface, which were enabled by the migration of oxygen vacancies. The presence and mobility of these vacancies were inferred to act as charge carriers contributing to enhanced specific capacitance ($C_{sp}$) and electrochemical activity.

The redox features observed in all electrodes also demonstrated mixed ionic-electronic conductivity. Variations in B-site doping affected the oxidation states of the constituent transition metals, thereby influencing both $C_{sp}$ and redox behavior. Among all tested compositions, LaMn$_x$Ru$_y$Ni$_{1-(x+y)}$O$_3$ with x=0.02 and y=0.08 exhibited the largest area under the CV curve, suggesting the highest specific capacitance.

Minimal distortion in the CV curve profiles at increased scan rates indicated good kinetic reversibility. Even at high scan speeds, pronounced redox peaks were retained, confirming excellent reaction kinetics suitable for energy storage applications. A rise in peak height with increasing scan rate, along with an increasing difference between anodic and cathodic peak potentials, was observed across all electrodes. This peak potential separation (ΔE) is an indicator of electron transfer kinetics. Smaller ΔE values signify fast electron transfer and reversible reactions, while larger separations are characteristic of quasi-reversible or irreversible mechanisms involving complex charge-transfer steps or slower redox reactions.

The peak potential differences (ΔE) for LaMn$_x$Ru$_y$Ni$_{1-(x+y)}$O$_3$ compositions at a scan rate of 5 mV/s were 0.145 V for (x=0.00, y=0.00), 0.110 V for (x=0.02, y=0.08), 0.120 V for (x=0.05, y=0.05), and 0.125 V for (x=0.08, y=0.02). The lowest ΔE value observed for the x=0.02, y=0.08 composition reflects the fastest electron transfer kinetics among the tested electrodes. Specific capacitance values, calculated from the CV curves using Equation 1, were found to be 704, 990, 945, and 925 F/g for (x=0.00, y=0.00), (x=0.02, y=0.08), (x=0.05, y=0.05), and (x=0.08, y=0.02), respectively. The highest $C_{sp}$ value for the x=0.02, y=0.08 composition is attributed to enhanced electrode-electrolyte interactions, increased lattice parameters, and a more porous morphology, which collectively improve electrolyte ion accommodation.

The decrease in specific capacitance with increasing scan rate was consistent across all compositions. At lower scan rates, electrolyte ions had sufficient time to undergo complete redox reactions and diffuse through the electrode matrix. At higher scan rates, limited ion-accessibility to active sites and insufficient adsorption/desorption time contributed to lower $C_{sp}$ values.

The enhanced electrochemical performance of the $LaMn_xRu_yNi_{1-(x+y)}O_3$ composition with x=0.02 and y=0.08 is thus attributed to a combination of factors: efficient $OH^-$ ion adsorption/desorption, facile intercalation/deintercalation dynamics, high surface area due to porous morphology, and effective electron-ion transport pathways. The described characteristics contribute to rapid and stable charge storage behavior, confirming the suitability of the composition for use in high-performance supercapacitor devices.

The specific capacitance of $LaMn_xRu_yNi_{1-(x+y)}O_3$ electrode materials arise from a combination of capacitive-controlled and diffusion-controlled charge storage mechanisms. Diffusion-controlled behaviour is characterized by ion transport limitations within the electrode material, where charge storage is governed by the rate of electrolyte ion diffusion to and from the electrode surface. In contrast, capacitive-controlled behavior involves electrostatic adsorption of electrolyte ions at the electrode-electrolyte interface, independent of ion diffusion kinetics.

The relative contributions of these two mechanisms were quantitatively analysed using Dunn's method, as expressed in equation 11:

$$I=k_1V+k_2V^{1/2} \quad (11)$$

where $k_1$ and $k_2$ are slope and intercept of $V^{1/2}$ vs $1/V^{1/2}$. $k_1V$ term is related to capacitance while $k_2V^{1/2}$ term relates to the diffusion-controlled behaviour. Table 2 shows the capacitive and diffusion-controlled capacitance at different scan rates. The capacitive behaviour of electrode materials is shown with a first shading while diffusion-controlled behavior is shown with a second shading in FIGS. 8A-8D. As can be seen from FIGS. 8A-8D, at a low scan rate, diffusion behaviour is more, which may be attributed to intercalation and deintercalation of electrolyte ions at low scan rates. Furthermore, distinct percentage contribution is shown in FIGS. 8A-8D.

demonstrated reduced Cdl values of 170 $mF \cdot cm^{-2}$ and 125 $mF \cdot cm^{-2}$, respectively. The reduction in electrochemical surface area for these compositions is likely associated with suboptimal surface morphology or diminished electronic conductivity, both of which can limit ion accessibility and interfacial charge transport.

The observed trend confirms that the electrochemical activity of $LaMn_xRu_yNi_{1-(x+y)}O_3$ is significantly influenced by the compositional ratio of B-site dopants. The foregoing findings highlight the importance of precise compositional tuning of perovskite-based electrode materials to optimize surface activity and maximize charge storage performance in energy storage applications.

Galvanostatic charge-discharge (GCD) measurements were carried out to further evaluate the electrochemical behaviour of $LaMn_xRu_yNi_{1-(x+y)}O_3$ perovskite oxide electrode materials. The GCD experiments were conducted under identical conditions to the cyclic voltammetry (CV) tests, using a three-electrode setup with 1 M KOH aqueous electrolyte. The GCD profiles for all synthesized compositions are shown in FIGS. 10A-10E. The obtained GCD curves exhibited non-linear triangular shapes characteristic of pseudocapacitive behaviour, corroborating the redox features observed in the CV results. The asymmetry between charge and discharge segments in the profiles was attributed to surface-coupled Faradaic reactions occurring at the electrode-electrolyte interface [See: H. Mo and coworkers, "Influence of calcium doping on performance of LaMnO3 supercapacitors," Ceramics International, vol. 44, no. 8, pp. 9733-9741, 2018, incorporated herein by reference in its entirety].

Figure 10A:
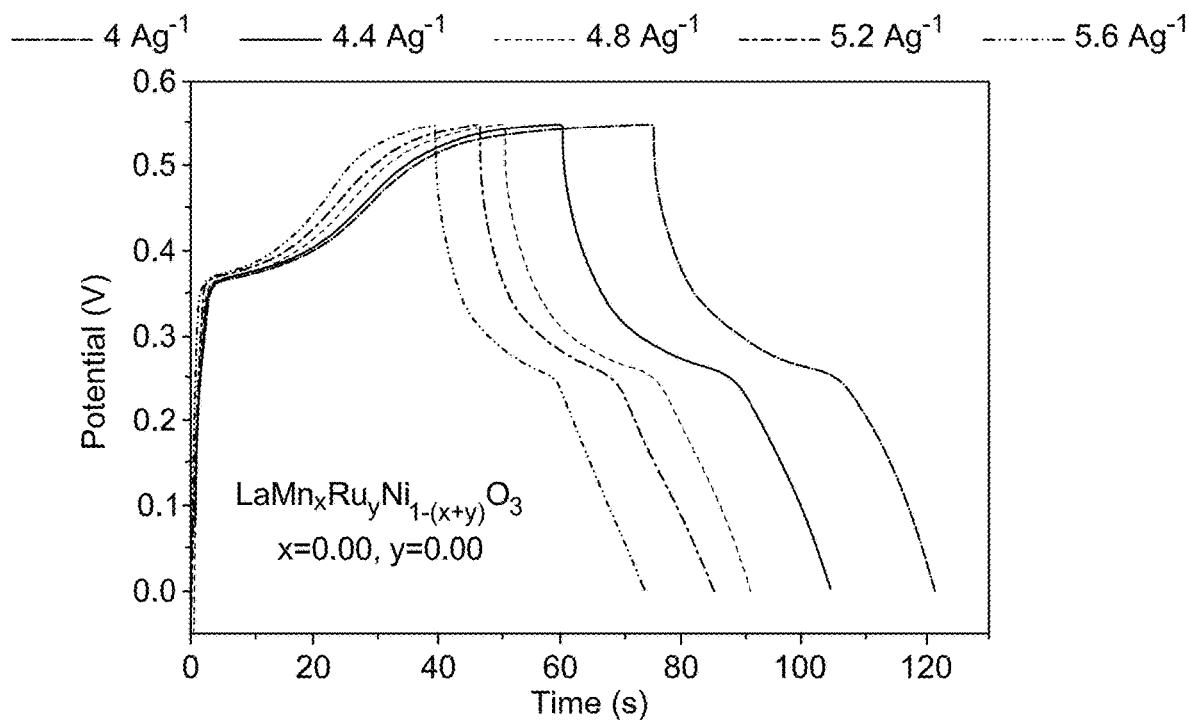
FIG. 10A illustrates a galvanostatic charge-discharge (GCD) profile of the perovskite $LaMn_xRu_yNi_{1-(x+y)}O_3$ electrode with (x, y)=(0, 0) at multiple current densities, according to certain embodiments.
Figure 10B:
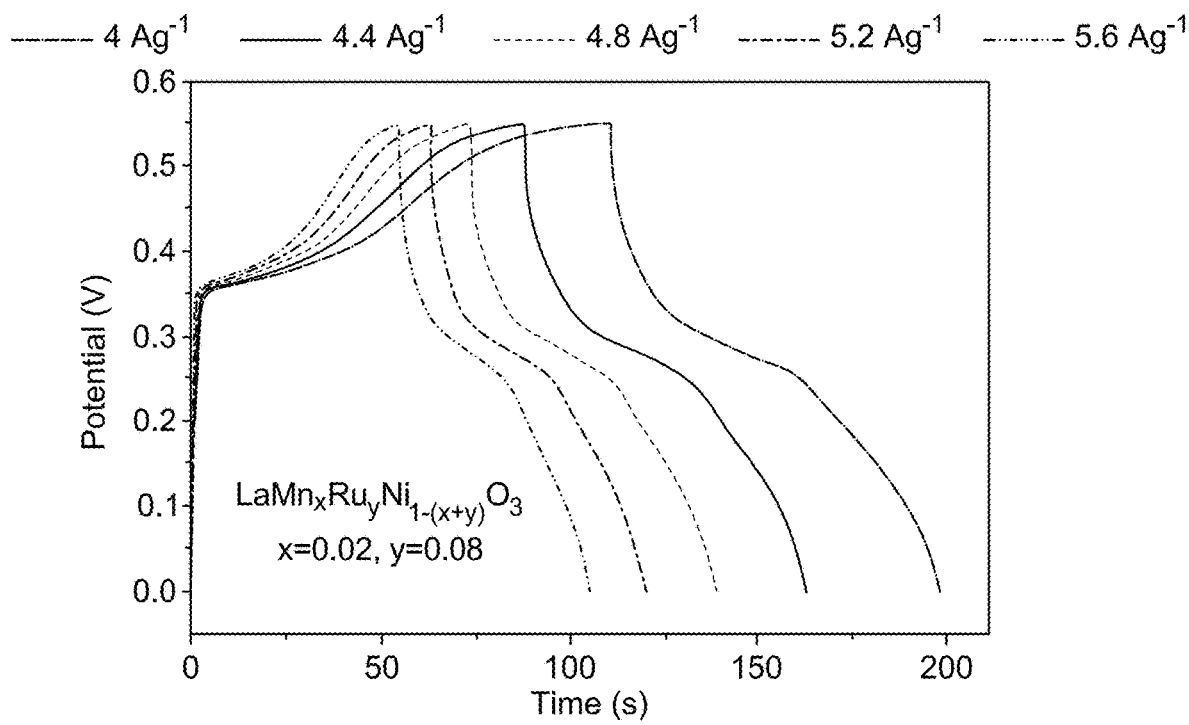
FIG. 10B illustrates a GCD profile of the perovskite $LaMn_xRu_yNi_{1-(x+y)}O_3$ electrode with (x, y)=(0.02, 0.08), according to certain embodiments.
Figure 10C:
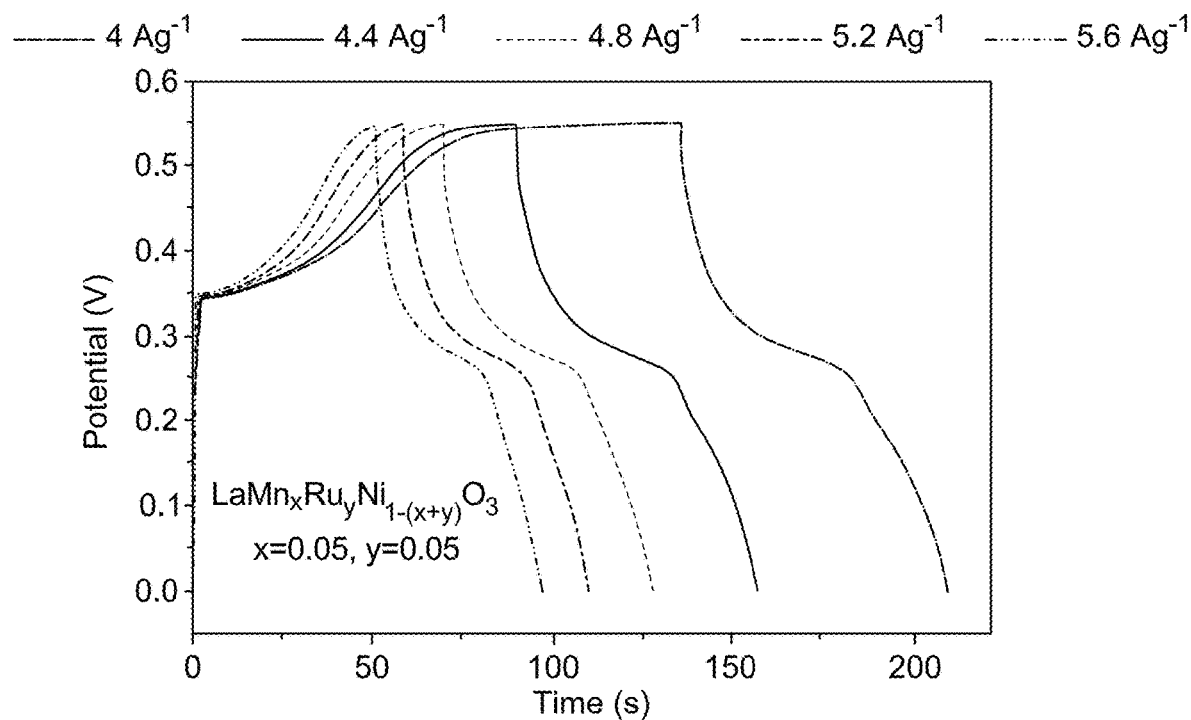
FIG. 10C illustrates a GCD profile of the perovskite $LaMn_xRu_yNi_{1-(x+y)}O_3$ electrode with (x, y)=(0.05, 0.05), according to certain embodiments.
Figure 10D:
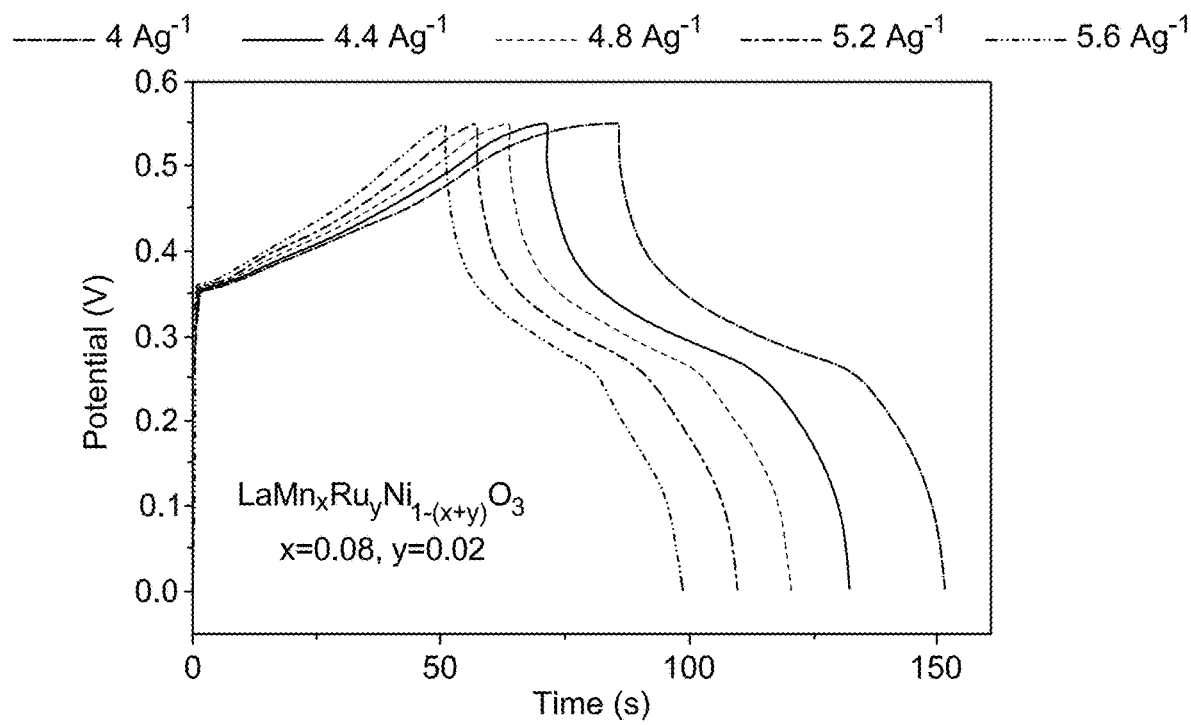
FIG. 10D illustrates a GCD profile of the perovskite $LaMn_xRu_yNi_{1-(x+y)}O_3$ electrode with (x, y)=(0.08, 0.02), according to certain embodiments.
Figure 10E:
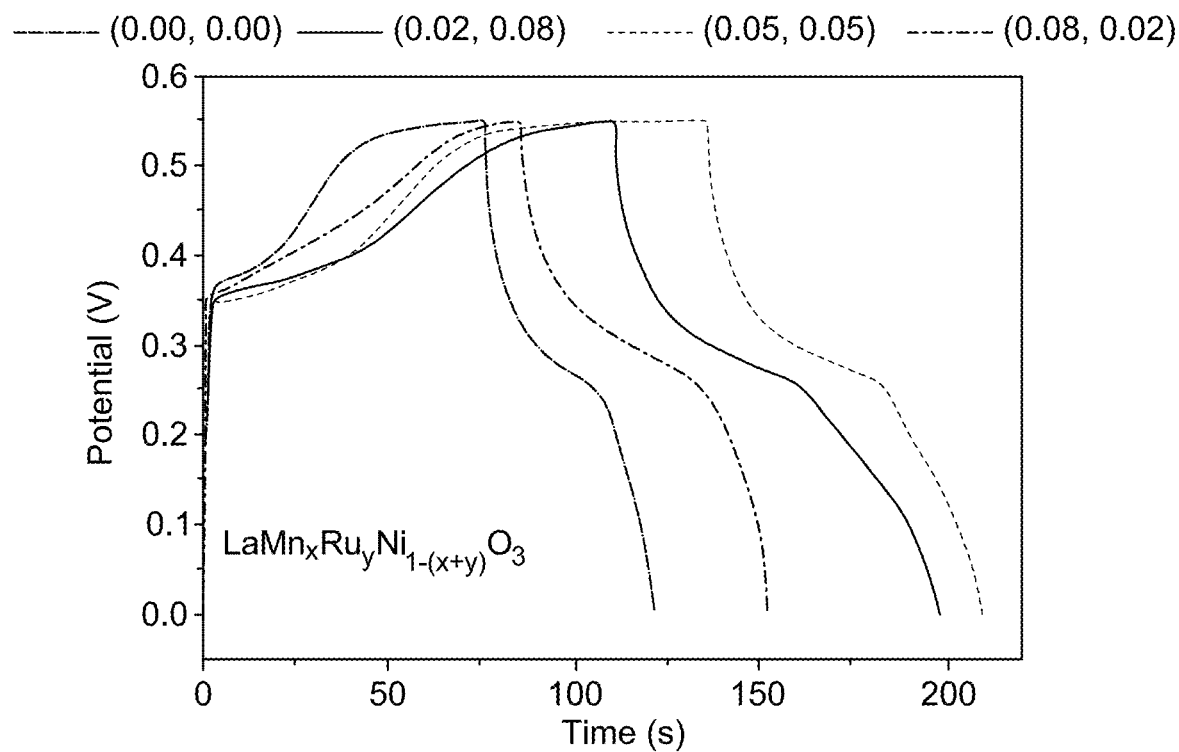
FIG. 10E illustrates a comparative GCD performance at a fixed current density of 4 A/g for all the perovskite $LaMn_xRu_yNi_{1-(x+y)}O_3$ electrodes, highlighting the highest discharge duration in the (x=0.02, y=0.08) sample, according to certain embodiments.

Among all tested compositions $LaMn_xRu_yNi_{1-(x+y)}O_3$ with x=0.02 and y=0.08 demonstrated the longest discharge time under identical current density conditions, as shown in FIG. 10B, indicating superior electrochemical performance. Specific capacitance values calculated from the discharge curves at a current density of 4 A/g are listed in Table 3 and were found to be 349.10 F/g for (x=0.00, y=0.00), 632.72

TABLE 2

Percentage Capacitive and diffusion contribution of LaMnxRuyNiO3 (x, y) = (0, 0), (0.02, 0.08), (0.05, 0.05), (0.08, 0.02)

| Scan rate | (x = 0.00, y = 0.00) | | (x = 0.02, y = 0.08) | | (x = 0.05, y = 0.05) | | (x = 0.08, y = 0.02) | |
|---|---|---|---|---|---|---|---|---|
| | % Capacitive | % Diffusion | % Capacitive | % Diffusion | % Capacitive | % Diffusion | % Capacitive | % Diffusion |
| 5 | 15 | 85 | 15 | 85 | 7 | 93 | 10 | 90 |
| 10 | 34 | 66 | 21 | 79 | 10 | 90 | 14 | 86 |
| 20 | 42 | 58 | 27 | 73 | 14 | 86 | 18 | 82 |
| 50 | 53 | 47 | 37 | 63 | 20 | 80 | 26 | 74 |

Figure 9:
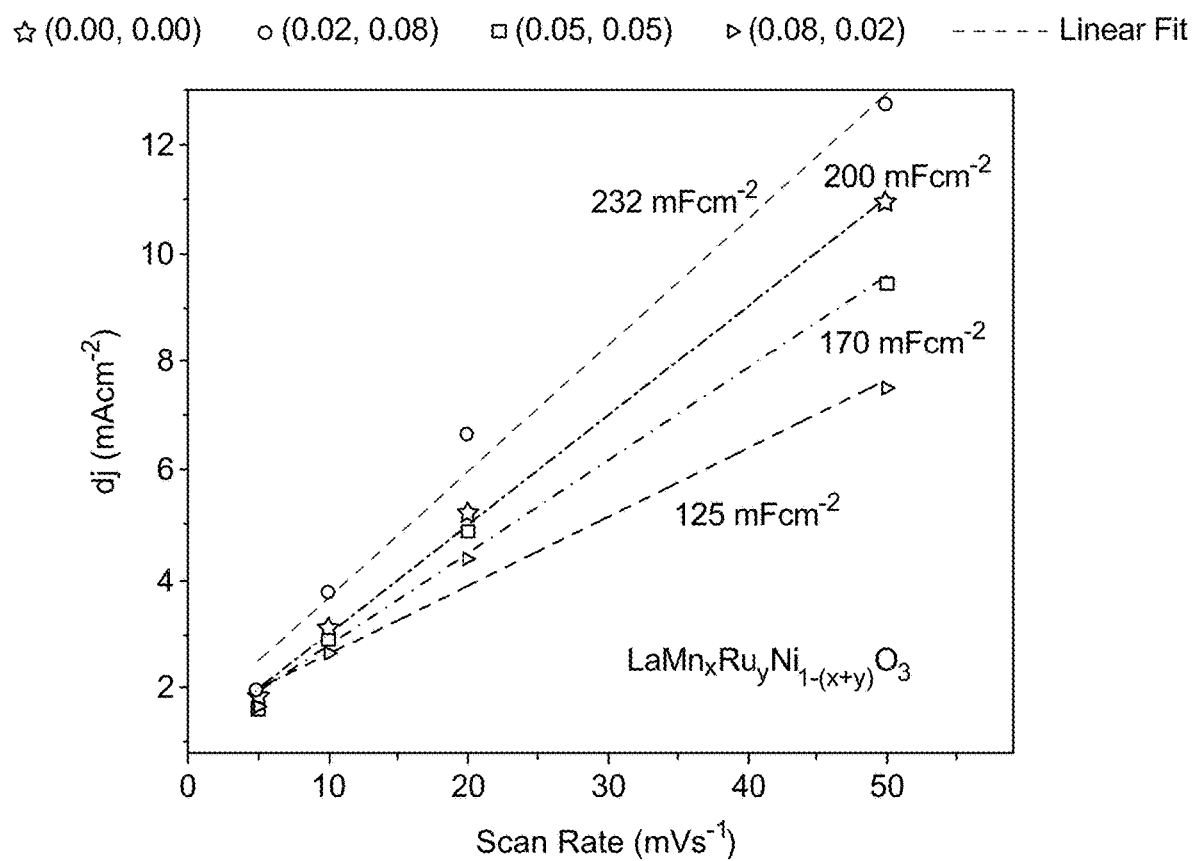
FIG. 9 illustrates an estimation of electrochemical double-layer capacitance ($C_{dl}$) of the perovskite $LaMn_xRu_yNi_{1-(x+y)}O_3$ electrode with (x, y)=(0.00, 0.00), (0.02, 0.08), (0.05, 0.05), and (0.08, 0.02), by plotting current density variation against scan rate to fit a linear regression curve, according to certain embodiments.

Electrochemical double-layer capacitance (Cdl) values of $LaMn_xRu_yNi_{1-(x+y)}O_3$ compositions were determined from the slope of the capacitive current versus scan rate plots within the non-Faradaic potential window. The results are presented in FIG. 9. Among the tested compositions, the sample with the highest Ru-to-Mn ratio exhibited the maximum Cdl value of 232 $mF \cdot cm^{-2}$, indicating the presence of a highly accessible electrochemical surface area. The elevated value is attributed to the optimized incorporation of ruthenium and manganese dopants, which contributes to increased surface roughness and enhanced exposure of electrochemically active sites for charge storage and transfer processes. In contrast, samples with lower Ru/Mn ratios F/g for (x=0.02, y=0.08), 545.53 F/g for (x=0.05, y=0.05), and 501/18 F/g for (x=0.08, y=0.02).

The enhanced performance observed for $LaMn_xRu_yNi_{1-(x+y)}O_3$ (x=0.02, y=0.08) was attributed to a higher number of redox-active sites, increased oxygen vacancy concentration within the crystal lattice, and larger lattice parameters as confirmed by X-ray diffraction peak shifts. Additionally, reduced agglomeration in the material facilitated improved ionic mobility and electrolyte access, further contributing to enhanced specific capacitance and charge transport properties.

Figure 10F:
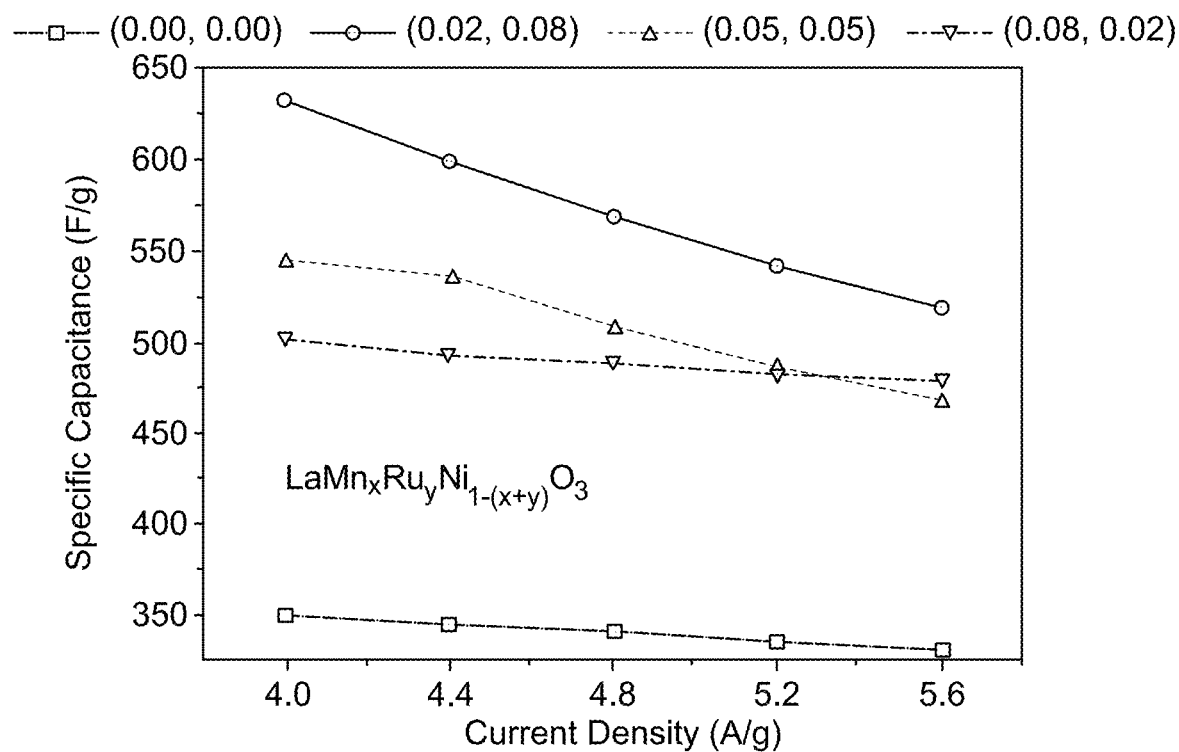
FIG. 10F illustrates the variation of specific capacitance with current density for the perovskite $LaMn_xRu_yNi_{1-(x+y)}O_3$ electrodes, according to certain embodiments.

As shown in FIG. 10F, $LaMn_xRu_yNi_{1-(x+y)}O_3$ (x=0.02, y=0.08) exhibited the highest specific capacitance across all tested current densities. These results are consistent with those obtained from CV measurements. The observed IR drop was lower for this composition compared to others and decreased progressively with decreasing current density, reflecting extended ion exchange time and improved charge transfer kinetics at lower current rates.

The GCD discharge curves as shown in FIGS. 10A-10E exhibited a subtle plateau region in the voltage range of 0.42 to 0.52 V. The plateau is indicative of Faradaic reactions occurring at the electrode-electrolyte interface and further supports the pseudocapacitive behaviour of the materials [See: N. Joseph and A. C. Bose, "Metallic $MoS_2$ grown on porous $g$-$C_3N_4$ as an efficient electrode material for supercapattery application," Electrochimica Acta, vol. 301, pp. 401-410, 2019, incorporated herein by reference in its entirety].

The galvanostatic charge-discharge (GCD) profiles serve as a basis for determining multiple electrochemical parameters, including specific capacitance, energy density, and power density, from the charge-discharge curves. As illustrated in FIG. 10F, the specific capacitance of all synthesized $LaMn_xRu_yNi_{1-(x+y)}O_3$ compositions was evaluated across varying current densities. A decreasing trend in specific capacitance with increasing current density was observed. The aforementioned decline is attributed to the limitation of electrochemical interactions primarily to the external surface of the perovskite oxide at higher current densities. Consequently, the accessibility of electrochemically active sites for electrolyte ions becomes restricted, thereby reducing specific capacitance.

TABLE 3

Electrochemical parameters of LaMn$x$Ru$y$Ni1-(x-i-y)O3
($x$, $y$) = (0, 0), (0.02, 0.08), (0.05, 0.05), (0.08, 0.02)

| $LaMn_xRu_yNi_{1-(x+y)}O_3$ | Current density | Specific capacitance (F/g) | Power density (W/kg) | Energy density (Wh/kg) |
|---|---|---|---|---|
| $x = 0.00, y = 0.00$ | 4 | 349.10 | 1132.40 | 14.66 |
| $x = 0.02, y = 0.08$ | 4 | 632.72 | 1139.28 | 26.58 |
| $x = 0.05, y = 0.05$ | 4 | 545.53 | 1100.46 | 22.91 |
| $x = 0.08, y = 0.02$ | 4 | 501.18 | 1100.01 | 21.08 |

Figure 11A:
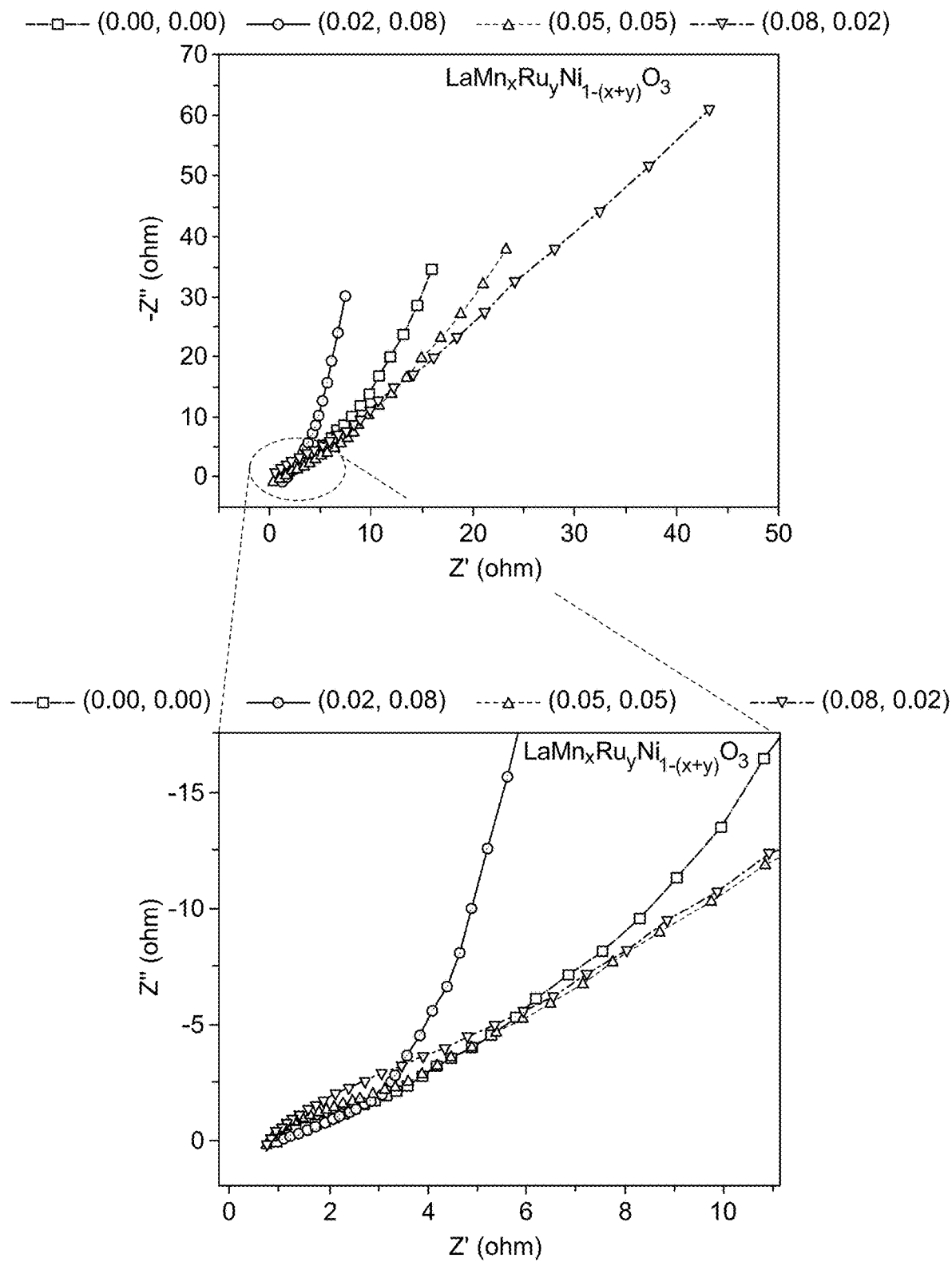
FIG. 11A illustrates Nyquist plots derived from electrochemical impedance spectroscopy for the perovskite $LaMn_xRu_yNi_{1-(x+y)}O_3$ electrodes, showing the variation in charge transfer resistance and diffusive impedance across (x, y)=(0, 0), (0.02, 0.08), (0.05, 0.05), and (0.08, 0.02), according to certain embodiments.

Electrochemical impedance spectroscopy was conducted to evaluate the electrochemical behaviour of the synthesized $LaMn_xRu_yNi_{1-(x+y)}O_3$ compositions. The results were analysed using Nyquist plots, as illustrated in FIG. 11A. The impedance measurements were performed across a frequency range of 0.1 Hz to 100 MHz. The Nyquist plot, representing the relationship between the real (Z') and imaginary (Z") components of impedance, enables assessment of frequency-dependent behavior of the electrodes and provides insights into reaction kinetics and ion transport phenomena [See: J. Hu and coworkers, "A universal electrochemical activation enabling lattice oxygen activation in nickel-based catalyst for efficient water oxidation," Chemical Engineering Journal, vol. 430, p. 132736, 2022, incorporated herein by reference in its entirety].

The Nyquist plot is generally characterized by two distinct regions, a high-frequency region and a low-frequency region. The intercept of the semicircle on the real axis (Z') in the high-frequency domain corresponds to the ionic resistance (Rs), representing the intrinsic resistance encountered by electrolyte ions at the electrode-electrolyte interface. The diameter of the semicircle in the high-frequency region denotes the charge transfer resistance ($R_{ct}$) [See: H. Ashassi-Sorkhabi, A. Kazempour, J. Mostafaei, and E. Asghari, "Impact of ultrasound frequency on the corrosion resistance of electroless nickel-phosphorus-nanodiamond plating," Chemical Review and Letters, vol. 5, no. 3, pp. 187-192, 2022 and H. Ashassi-Sorkhabi, J. Mostafaei, A. Kazempour, and E. Asghari, "Ultrasonic-assisted deposition of Ni—P—$Al_2O_3$ coating for practical protection of mild steel: Influence of ultrasound frequency on the corrosion behavior of the coating," Chemical Review and Letters, vol. 5, no. 2, pp. 127-132, 2022, incorporated herein by reference in its entirety]. A larger semicircle is indicative of higher resistance dominance, whereas a smaller semicircle suggests capacitance-dominated behaviour. The linear portion in the low-frequency region reflects the Warburg impedance, which is related to ion diffusion through the porous electrode material. Further, EIS parameters of $LaMn_xRu_yNi_{1-(x+y)}O_3$ are listed in Table 4.

The Nyquist plots demonstrate that $LaMn_xRu_yNi_{1-(x+y)}O_3$ with a compositional ratio of x=0.02 and y=0.08 exhibits the smallest semicircle diameter, indicating the lowest charge transfer resistance among all synthesized compositions. The steep slope at the low-frequency region further confirms capacitive dominance, as evidenced by the nearly vertical trajectory of the plot approaching the imaginary axis (Z"), which is characteristic of ideal capacitive behaviour [See: M. Y. Perdana and coworkers, "Understanding the Behavior of Supercapacitor Materials via Electrochemical Impedance Spectroscopy: A Review," The Chemical Record, vol. 24, no. 5, p. e202400007, 2024 and E. Cevik and A. Bozkurt, "Redox active polymer metal chelates for use inflexible symmetrical supercapacitors: Cobalt-containing poly (acrylic acid) polymer electrolytes," Journal of Energy Chemistry, vol. 55, pp. 145-153, 2021, incorporated herein by reference in its entirety]. The electrochemical response of $LaMn_xRu_yNi_{1-(x+y)}O_3$ (x=0.02, y=0.08) demonstrates improved ion accessibility and superior reaction kinetics.

Figure 11B:
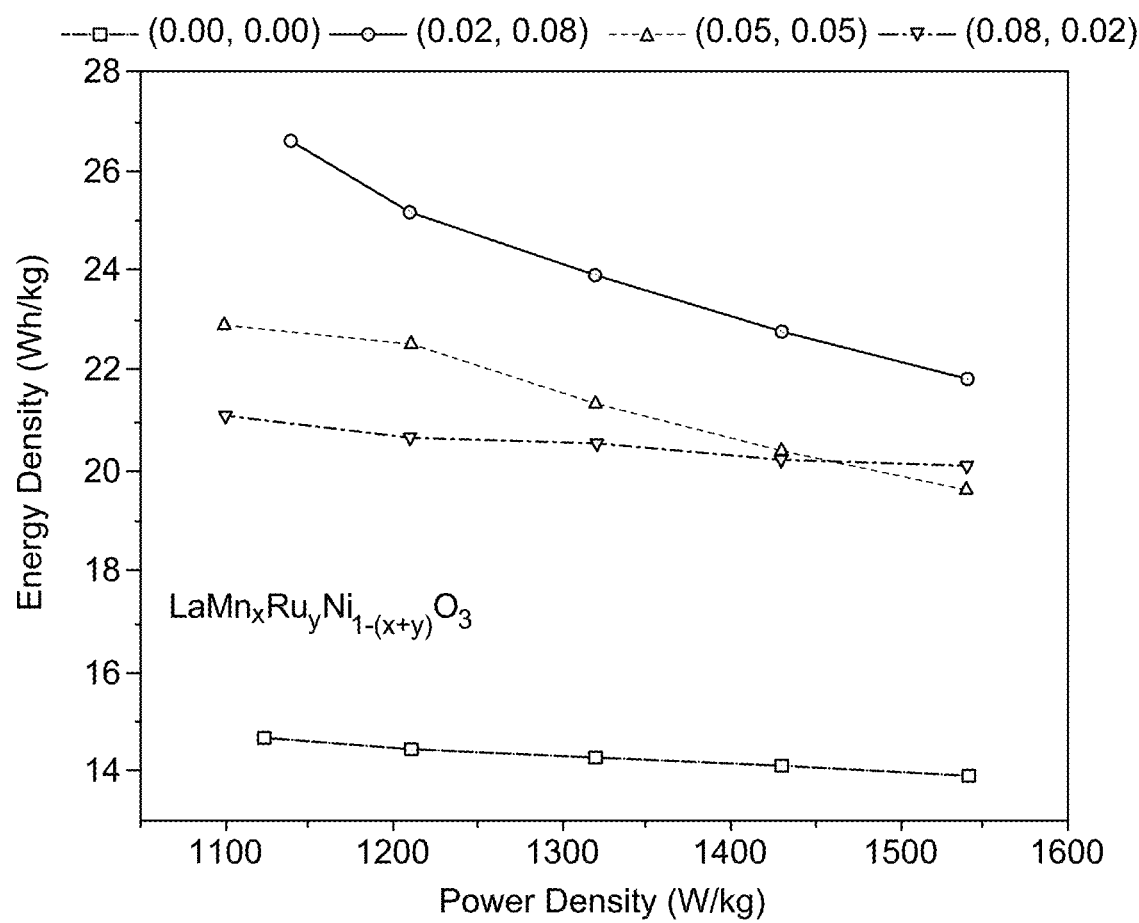
FIG. 11B illustrates the Ragone plot comparing the energy density and power density of the perovskite $LaMn_xRu_yNi_{1-(x+y)}O_3$ electrode, indicating high energy-power balance of the (x=0.02, y=0.08) composition, according to certain embodiments.

FIG. 11B depicts the Ragone plot for various $LaMn_xRu_yNi_{1-(x+y)}O_3$ compositions, including (x=0.00, y=0.00), (x=0.02, y=0.08), (x=0.05, y=0.05), and (x=0.08, y=0.02), illustrating the correlation between energy density and power density.

TABLE 4

EIS parameters of $LaMn_xRu_yNi_{1-(x+y)}O_3$

| $LaMn_xRu_yNi_{1-(x+y)}O_3$ | Series resistance (Rs) (Ω) | Charge transfer resistance (Rct) (Ω) |
|---|---|---|
| $x = 0.00, y = 0.00$ | 0.93 | 1.92 |
| $x = 0.02, y = 0.08$ | 0.82 | 1.60 |
| $x = 0.05, y = 0.05$ | 0.72 | 1.66 |
| $x = 0.08, y = 0.02$ | 0.85 | 1.8 |

In order to evaluate the practical applicability of the Mn—Ru co-doped perovskite oxide compositions, an asymmetric two-electrode device was fabricated. The configuration included $LaMn_xRu_yNi_{1-(x+y)}O_3$ as the anode material and activated carbon as the cathode material. The combination was selected to optimize both energy and power density, leveraging the high surface area and electrical conductivity of activated carbon to complement the pseudocapacitive behaviour of the perovskite oxide. Both electrode materials were deposited on copper foil substrates to ensure favourable electrical conductivity and compatibility with the electrolyte environment.

Figure 12A:
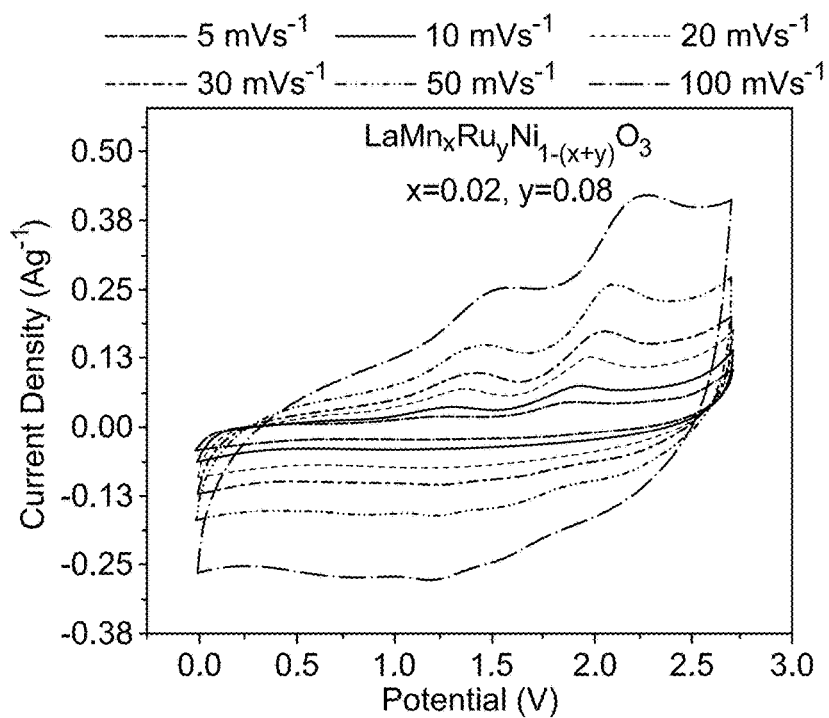
FIG. 12A illustrates cyclic voltammetry curves of an asymmetric supercapacitor with an anode coated with the perovskite $LaMn_xRu_yNi_{1-(x+y)}O_3$ electrode and a cathode coated with activated carbon, according to certain embodiments.

FIG. 12A illustrates the cyclic voltammetry curves of the fabricated device, recorded within an extended potential window of 0-2.7 V. The electrochemical measurements were conducted in a 1-methyl-1-propylpiperidinium bis(trifluoromethylsulfonyl)imide (MPB) electrolyte, selected for its superior ionic mobility and stable electrochemical window. The CV profile and associated redox peaks confirm that charge storage is primarily governed by pseudocapacitive behaviour.

Figure 12B:
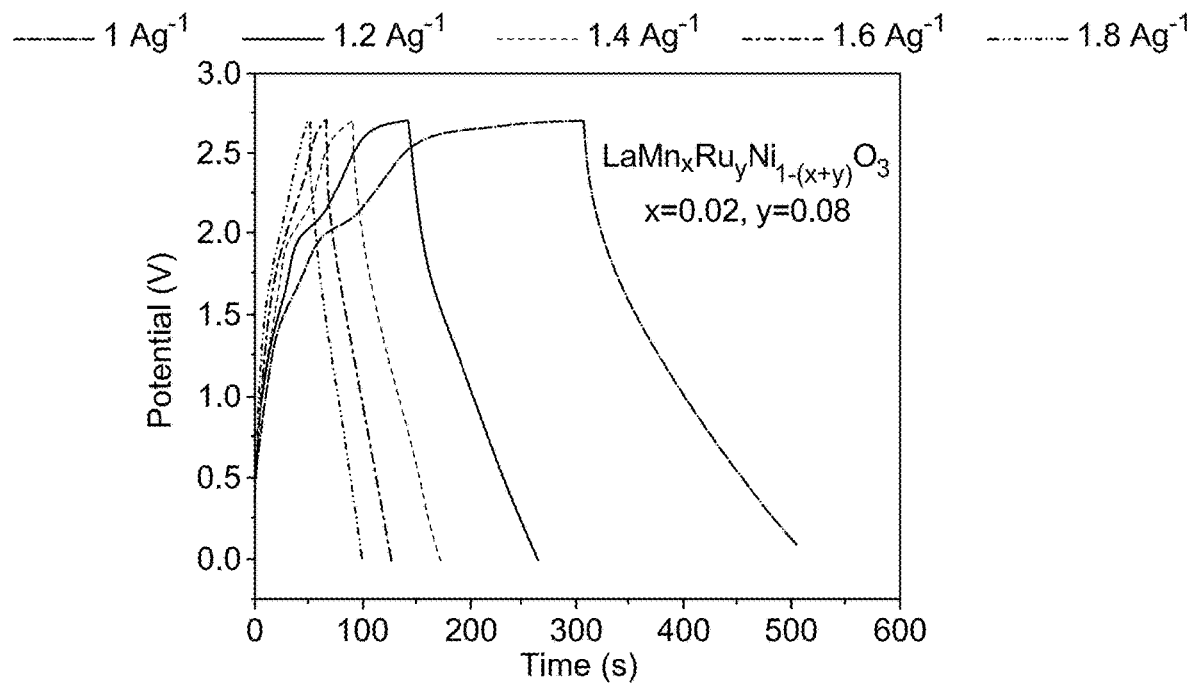
FIG. 12B illustrates the GCD curves of the asymmetric supercapacitor at various current densities, according to certain embodiments.

FIG. 12B displays the galvanostatic charge-discharge curves of the asymmetric device under various current densities. The curves reveal high stability and a minimal IR drop, characteristic of efficient charge transfer processes. The specific capacitance of the optimized $LaMn_{0.02}Ru_{0.08}Ni_{0.9}O_3$ activated carbon device was determined to be 81.48 F/g at a current density of 1 A/g. The device also exhibited an energy density of 82.5 Wh/kg and a power density of 1350 W/kg, confirming the suitability of the material for high-performance energy storage applications.

Figure 12C:
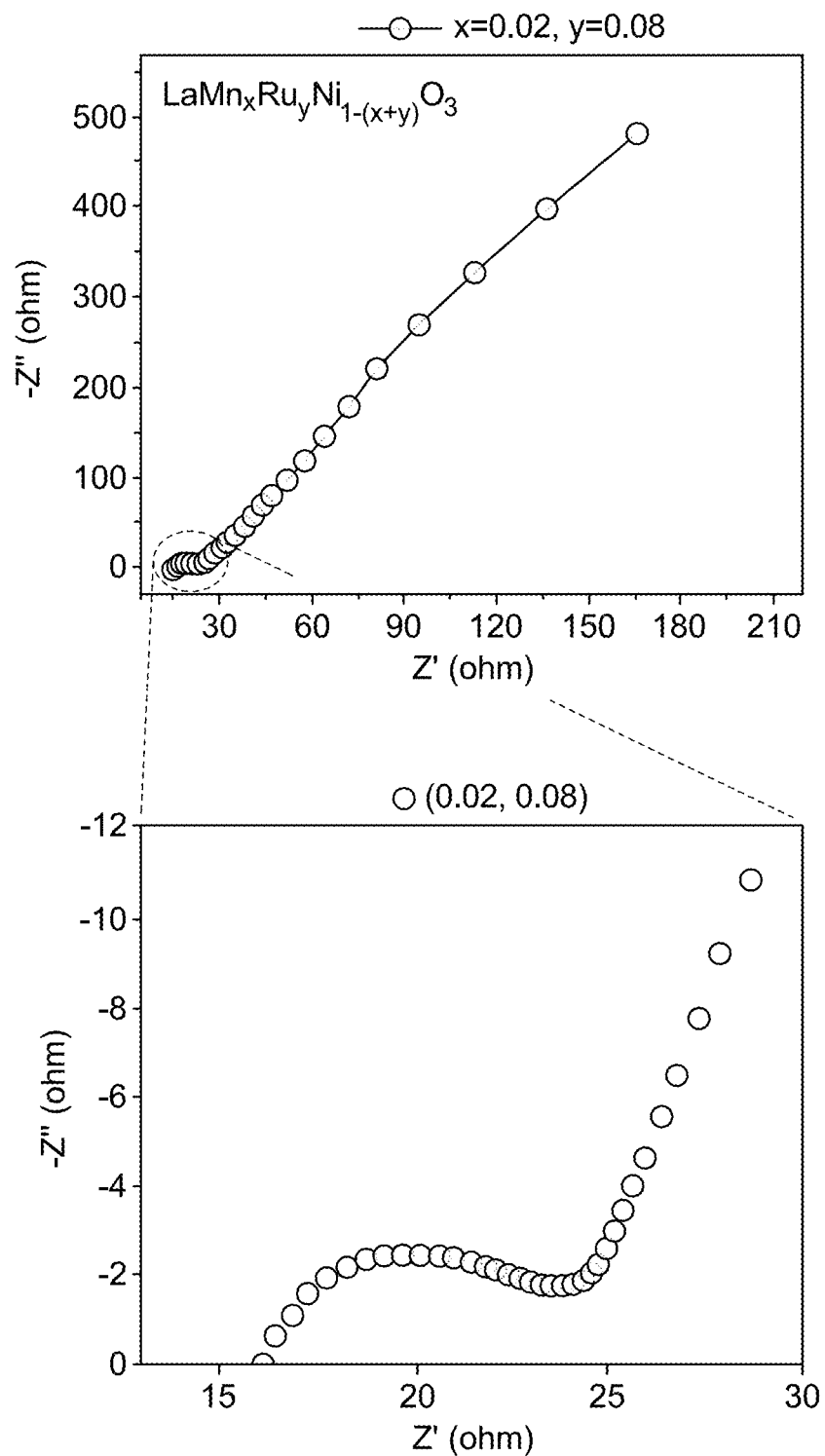
FIG. 12C illustrates the Nyquist plot of the asymmetric supercapacitor, according to certain embodiments.

Electrochemical impedance spectroscopy was also conducted, and the resulting Nyquist plot is provided in FIG. 12C. The vertical profile in the low-frequency region and the narrow semicircle in the high-frequency domain further support the capacitive nature and low resistance losses of the device. The charge transfer resistance was measured at 9.2Ω, and the series resistance was calculated to be 16Ω.

Figure 12D:
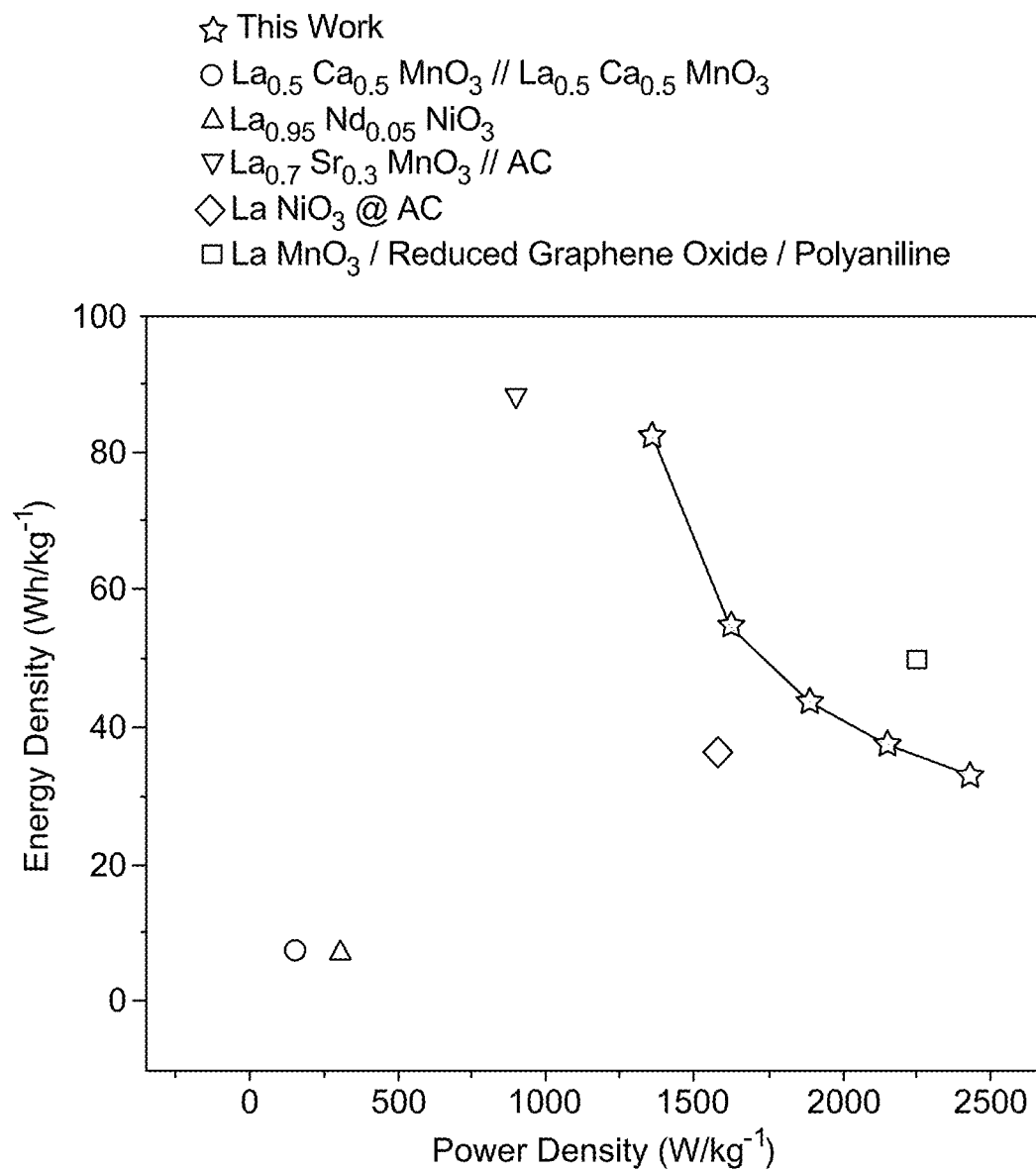
FIG. 12D illustrates a Ragone plot comparing electrochemical performance of the asymmetric supercapacitor with literature-reported supercapacitor systems, according to certain embodiments.

FIG. 12D presents the Ragone plot comparing the performance of the synthesized device with previously reported supercapacitor systems. As further supported by the comparative data provided in Table 5, the $LaMn_{0.02}Ru_{0.08}Ni_{0.9}O_3$-based device demonstrates significant improvement in both energy and power densities. The performance results highlight the potential of Mn—Ru co-doped $LaNiO_3$ perovskite materials as promising candidates for next-generation asymmetric supercapacitors.

of 82.5 Wh/kg, and power density of 1350 W/kg, thereby validating the efficacy of the synthesized compound in practical energy storage systems. The disclosed methodology and composition offer a scalable and cost-effective strategy for the fabrication of high-performance pseudocapacitive materials and are expected to facilitate further advancement in the development of next-generation asymmetric supercapacitor electrodes.

Numerous modifications and variations of the present disclosure are possible in light of the above teachings. It is therefore to be understood that within the scope of the appended claims, the invention may be practiced otherwise than as specifically described herein.

The invention claimed is:

1. A perovskite having a formula:

$$LaMn_xRu_yNi_{1-(x+y)}O_3,$$

wherein x is from 0.02 to 0.08 and y is from 0.08 to 0.02.

2. The perovskite of claim 1, having a hexagonal host crystal structure based on a hexagonal $LaNiO_3$ perovskite crystal,
wherein Mn and Ru are doped at a plurality of Ni sites in the hexagonal host crystal structure.

3. The perovskite of claim 1, in the form of particles having an average crystallite size of 10 to 15 nm.

4. The perovskite of claim 1, wherein x is from 0.01 to 0.03 and y is from 0.07 to 0.09 and the perovskite is in the form of porous non-agglomerated particles.

5. The perovskite of claim 1, in the form of spherical nanoparticles.

6. The perovskite of claim 1, exhibiting a Mn oxidation state of +3 and a Ru oxidation state of +3.

TABLE 5

Comparison of $LaMn_xRu_yNi_{1-(x+y)}O_3$ (x, y) = (0.02, 0.08), with existing art.

| Electrode material | Electrolyte | Capacitance (F/g) | Energy density | Power density | Reference |
|---|---|---|---|---|---|
| $La_{0.7}Sr_{0.3}MnO_3$//AC | 1M $Na_2SO_4$ | 197 | 88.7 | 900 | [*1] |
| $La_{0.85}Sr_{0.15}MnO_3$//$La_{0.85}$ | 1M KOH | 18 | 3.6 | 120 | [*2] |
| $La_{0.5}Ca_{0.5}MnO_3$//$La_{0.5}Ca_{0.5}Mn$ | 1M KOH | 21.7 | 7.6 | 160 | [*3] |
| $La_2CuCoO_6$ | 2M KOH | 259.4 | — | — | [*4] |
| $La_{0.95}Nd_{0.05}NiO_3$ | N/A | 32.24 | 5.32 | 339.45 | [*5] |
| $LaMn_{0.02}Ru_{0.08}Ni_{0.9}O_3$//AC | MPB | 81.48 | 82.5 | 1350 | Present |

*1 R. Dubey and V. Guruviah, "Review of carbon-based electrode materials for supercapacitor energy storage," Ionics, vol. 25, pp. 1419-1445, 2019, incorporated herein by reference in its entirety;
*2 X. Lang, H. Mo, X. Hu, and H. Tian, "Supercapacitor performance of perovskite La1−xSrxMnO3," Dalton transactions, vol. 46, no. 40, pp. 13720-13730, 2017, incorporated herein by reference in its entirety;
*3 H. Mo and coworkers, "Influence of calcium doping on performance of LaMnO3 supercapacitors," Ceramics International, vol. 44, no. 8, pp. 9733-9741, 2018, incorporated herein by reference in its entirety;
*4 J. Singh and A. Kumar, "Investigation of structural, morphological and electrochemical properties of mesoporous La2CuCoO6 rods fabricated by facile hydrothermal route," International Journal of Minerals, Metallurgy and Materials, vol. 27, no. 7, pp. 987-995, 2020, incorporated herein by reference in its entirety;
*5 A. Qayyum, M. O. ur Rehman, F. Ahmad, M. A. Khan, S. M. Ramay, and S. Atiq, "Performance optimization of Nd-doped LaNiO3 as an electrode material in supercapacitors," Solid State Ionics, vol. 395, p. 116227, 2023, incorporated herein by reference in its entirety.

To conclude, the disclosed electrode compositions address the limitations associated with previously reported hybrid nanostructure materials by achieving significantly enhanced electrochemical performance metrics, including specific capacitance, energy density, and power density. The observed performance improvements are attributed to the optimized Mn—Ru substitution at the B-site of the perovskite lattice, resulting in increased surface area, structural porosity, and enhanced redox activity. The fabricated asymmetric supercapacitor device incorporating $LaMn_{0.02}Ru_{0.08}Ni_{0.9}O_3$ as the active electrode material exhibited a specific capacitance of 81.48 F/g, energy density 7. The perovskite of claim 1, in the form of particles, wherein the particles contain a plurality of alkyne groups and hydroxyl groups on the surface.

8. The perovskite of claim 1, obtained by a process comprising:
forming an aqueous salt solution comprising lanthanum nitrate, manganese nitrate, ruthenium nitrate, nickel nitrate, and citric acid,
wherein lanthanum nitrate, manganese nitrate, ruthenium nitrate, nickel nitrate has a molar ratio corresponding to 1:x:y:1−(x+y);

heating the salt solution followed by adding ethylene glycol and adjusting pH by ammonia to form a sol;

heating the sol to form a gel;

drying the gel by heating, followed by grinding to form a powder; and calcinating the powder to form the perovskite having the formula $LaMn_xRu_yNi_{1-(x+y)}O_3$.

9. A $LaMn_xRu_yNi_{1-(x+y)}O_3$ electrode, comprising:

a nickel foam; and a perovskite coating, having a formula of $LaMn_xRu_yNi_{1-(x+y)}O_3$, wherein x is from 0.02 to 0.08 and y is from 0.08 to 0.02, and wherein the perovskite coating is present on a surface of the nickel foam.

10. The $LaMn_xRu_yNi_{1-(x+y)}O_3$ electrode of claim 9, exhibiting a peak potential of 0.110 to 0.125 V in a cyclic voltammetry test having a three-electrode set up comprising the $LaMn_xRu_yNi_{1-(x+y)}O_3$ electrode, a platinum counter electrode and a Ag/AgCl reference electrode.

11. The $LaMn_xRu_yNi_{1-(x+y)}O_3$ electrode of claim 10, exhibiting a specific capacitance of 700 to 1000 F/g in the cyclic voltammetry test.

12. The $LaMn_xRu_yNi_{1-(x+y)}O_3$ electrode of claim 11, wherein the specific capacitance comprises a capacitive-controlled capacitance and a diffusion-controlled capacitance, and the capacitive-controlled capacitance is at a percentage of 10 to 37%, and the diffusion-controlled capacitance is at a percentage of 63 to 95%, based on a total of the capacitive-controlled capacitance and the diffusion-controlled capacitance.

13. The $LaMn_xRu_yNi_{1-(x+y)}O_3$ electrode of claim 10, exhibiting a double-layer capacitance of 120 to 250 mF/cm$^2$ in the cyclic voltammetry test.

14. The $LaMn_xRu_yNi_{1-(x+y)}O_3$ electrode of claim 9, exhibiting a specific capacitance of 340 to 550 F/g, an energy density of 15 to 30 Wh/kg and a power density of 1100 to 1200 W/kg in a galvanostatic charge/discharge test having a three-electrode set up comprising the $LaMn_xRu_yNi_{1-(x+y)}O_3$ electrode, a platinum counter electrode, and a Ag/AgCl reference electrode.

15. The $LaMn_xRu_yNi_{1-(x+y)}O_3$ electrode of claim 9, exhibiting a series resistance of 0.7 to 1.0Ω and a charge transfer resistance of 1.5 to 2.0Ω in an electrochemical impedance analysis.

16. An asymmetric supercapacitor, comprising:

an anode, having a layer of a perovskite coated on an anode copper foil substrate, wherein the perovskite has a formula of $LaMn_xRu_yNi_{1-(x+y)}O_3$, where x is from 0.02 to 0.08 and y is from 0.08 to 0.02;

a cathode, having a layer of an activated carbon coated on a cathode copper foil substrate; and an electrolyte, comprising 1-Methyl-1-propylpiperidinium bis(trifluoromethylsulfonyl) imide, wherein the anode and the cathode are separated by a membrane containing the electrolyte.

17. The asymmetric supercapacitor of claim 16, exhibiting a specific capacitance of 80 to 100 F/g.

18. The asymmetric supercapacitor of claim 16, exhibiting an energy density of 80 to 100 Wh/kg.

19. The asymmetric supercapacitor of claim 16, exhibiting a power density of 1300 to 1500 W/kg.

* * * * *